(12) United States Patent
Jojic et al.

(10) Patent No.: US 7,940,264 B2
(45) Date of Patent: May 10, 2011

(54) GENERATIVE MODELS FOR CONSTRUCTING PANORAMAS FROM AN IMAGE SEQUENCE

(75) Inventors: Nebojsa Jojic, Redmond, WA (US); Brendan J. Frey, Mississauga (CA)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/794,765

(22) Filed: Jun. 6, 2010

(65) Prior Publication Data
US 2010/0238266 A1 Sep. 23, 2010

Related U.S. Application Data

(60) Continuation of application No. 11/534,649, filed on Sep. 23, 2006, now Pat. No. 7,750,904, which is a division of application No. 10/294,211, filed on Nov. 14, 2002, now Pat. No. 7,113,185.

(51) Int. Cl.
*G06T 17/00* (2006.01)
(52) U.S. Cl. ........ 345/420; 345/423; 345/426; 345/582; 345/895; 345/592; 382/103; 382/159; 382/173; 382/254; 382/284; 348/36; 715/716
(58) Field of Classification Search .................. 345/420, 345/423, 582, 589, 592, 426; 382/103, 159, 382/173, 254, 284
See application file for complete search history.

(56) References Cited

U.S. PATENT DOCUMENTS

| | | | | |
|---|---|---|---|---|
| 5,969,755 | A * | 10/1999 | Courtney | 348/143 |
| 6,205,260 | B1 * | 3/2001 | Crinon et al. | 382/284 |
| 6,259,828 | B1 * | 7/2001 | Crinon et al. | 382/305 |
| 6,487,323 | B1 * | 11/2002 | Bonnet et al. | 382/276 |
| 7,046,732 | B1 * | 5/2006 | Slowe et al. | 375/240.16 |
| 7,084,877 | B1 * | 8/2006 | Panusopone et al. | 345/474 |

* cited by examiner

*Primary Examiner* — Kimbinh T Nguyen
(74) *Attorney, Agent, or Firm* — Lyon & Harr, LLP; Mark A. Watson

(57) ABSTRACT

A simplified general model and an associated estimation algorithm is provided for modeling visual data such as a video sequence. Specifically, images or frames in a video sequence are represented as collections of flat moving objects that change their appearance and shape over time, and can occlude each other over time. A statistical generative model is defined for generating such visual data where parameters such as appearance bit maps and noise, shape bit-maps and variability in shape, etc., are known. Further, when unknown, these parameters are estimated from visual data without prior pre-processing by using a maximization algorithm. By parameter estimation and inference in the model, visual data is segmented into components which facilitates sophisticated applications in video or image editing, such as, for example, object removal or insertion, tracking and visual surveillance, video browsing, photo organization, video compositing, etc.

20 Claims, 19 Drawing Sheets

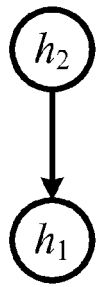
FIG. 5A      FIG. 5B      FIG. 5C
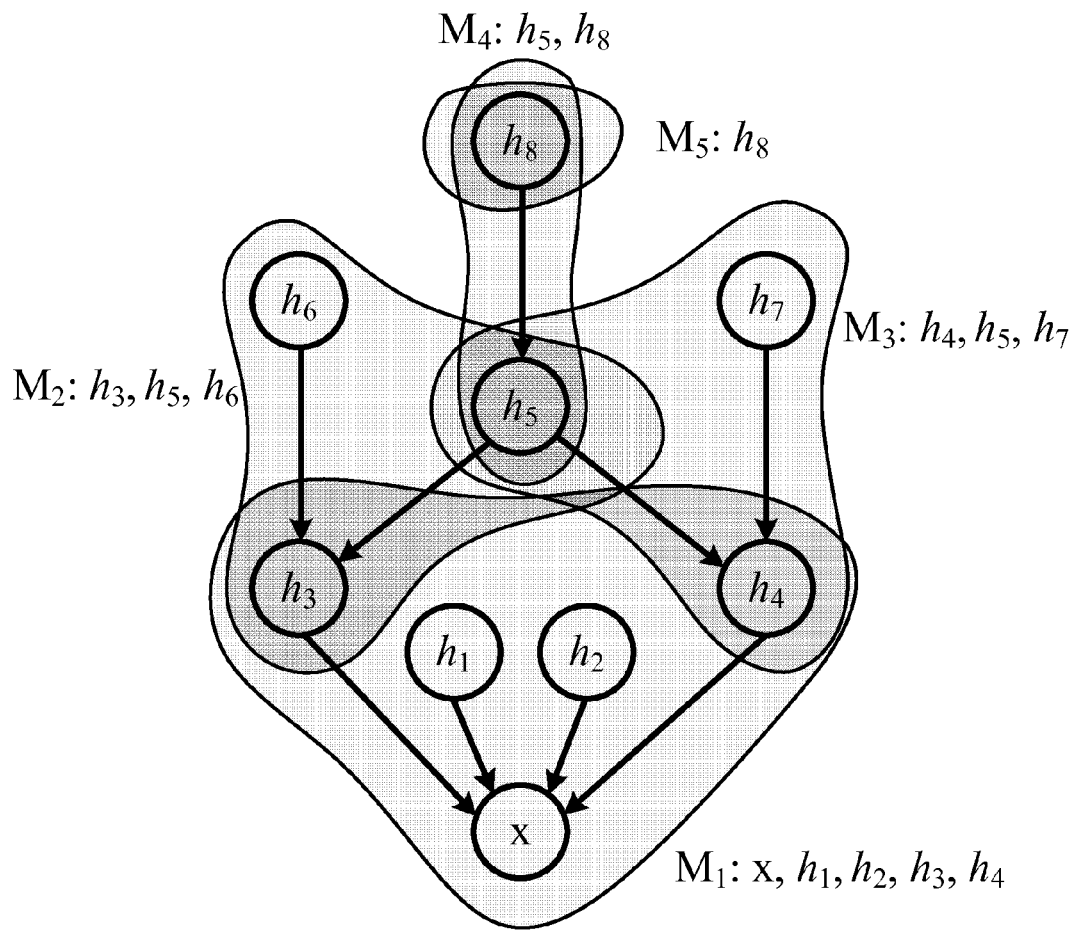
FIG. 5D

GENERATIVE MODELS FOR CONSTRUCTING PANORAMAS FROM AN IMAGE SEQUENCE

CROSS REFERENCE TO RELATED APPLICATIONS

This application is Continuation of U.S. patent application Ser. No. 11/534,649, filed on Nov. 23, 2006, by Jojic, et al., and entitled "MODELING VARIABLE ILLUMINATION IN AN IMAGE SEQUENCE", which was a Divisional of U.S. patent application Ser. No. 10/294,211, filed on Nov. 14, 2002, by Jojic, et al., and entitled "A SYSTEM AND METHOD FOR AUTOMATICALLY LEARNING FLEXIBLE SPRITES IN VIDEO LAYERS," now U.S. Pat. No. 7,113,185, and this application claims the benefit of the aforementioned prior applications under Title 35, U.S. Code, §120.

BACKGROUND

1. Technical Field

The invention is related to a system for learning layers of "flexible sprites" from a video sequence, and in particular, to a system and method for automatic decomposition of a video sequence for learning probabilistic 2-dimensional appearance maps and masks of moving occluding objects of dynamic geometry in the video sequence.

2. Related Art

Automatic modeling and analysis of video images using a layered representation has been addressed by several conventional schemes. In general, the basic idea is to isolate or identify a particular object or objects within a sequence of images, then to decompose that video sequence into a number of layers, with each layer representing either an object or a background image over the entire video sequence. Such layered objects are commonly referred to as "sprites." However, learning "sprites" from a video sequence is a difficult task because there are typically an unknown number of objects in the video sequence, and those objects typically have unknown shapes and sizes, and they must be distinguished from the background, other sprites, sensor noise, lighting noise, and significant amounts of deformation.

In addition, many conventional schemes for identifying sprites or objects within a video sequence make use of specialized models for identifying particular types of objects, such as, for example, a car, a truck, a human head, a ball, an airplane, etc. Models designed for identifying one particular type of sprite within a video sequence are typically ineffective for identifying other types of sprites.

For example, one conventional scheme which is typical of the art addresses object tracking through a video sequence by using a dynamic layer representation to estimate layered objects against a background in the video sequence. This scheme uses a parametric shape prior as the basis for computing the segmentation of objects from the video sequence. However, this scheme is generally limited by the simplicity of the parametric shape priors used to identify layers of objects within the video sequence. In particular, this scheme makes use of simple parametric shape priors that are useful for identifying objects of generally simple geometry, such as moving vehicles against a fixed background. Unfortunately, this scheme is generally unsuited for segmenting or identifying more complex objects or sprites because it does not incorporate more complicated segmentation priors for identification of objects such as moving articulated human bodies. Further, the scheme is also limited in that it needs to make use of parametric shape priors which are at least generally representative of the type of objects to be segmented or identified within the video sequence.

In addition, in analyzing or processing data, the task of clustering raw data such as video or images frames and speech spectrograms is often complicated by the presence of random, but well-understood transformations in the data. Examples of these transformations include object motion and camera motion in video sequences and pitch modulation in spectrograms.

A variety of conventional, yet sophisticated, techniques for pattern analysis and pattern classification have been used in attempt to address this problem. However, such conventional techniques have mostly assumed that the data is already normalized (e.g., that the patterns are centered in the images) or nearly normalized. Linear approximations to the transformation manifold have been used to significantly improve the performance of feedforward discriminative classifiers such as nearest neighbors and multilayer perceptrons.

Linear generative models (factor analyzers, mixtures of factor analyzers) have also been modified using linear approximations to the transformation manifold to build in some degree of transformation invariance. A multi-resolution approach has been used to extend the usefulness of linear approximations, but this approach is susceptible to local minima—e.g. a pie may be confused for a face at low resolution. For significant levels of transformation, linear approximations are far from exact and better results have been obtained by explicitly considering transformed versions of the input. This approach has been used to design "convolutional neural networks" that are invariant to translations of parts of the input.

Further, it has been shown with respect to "transformed mixtures of Gaussians" and "transformed hidden Markov models" that an expectation-maximization (EM) algorithm in a discrete latent variable model can be used to jointly normalize data (e.g., center images, pitch-normalize spectrograms) and to learn a mixture model of the normalized data. The only input to such an algorithm is the data, a list of possible transformations, and the number of clusters to find. However, conventional methods for performing such computations typically involve an exhaustive computation of the posterior probabilities over transformations that make scaling up to large feature vectors and large sets of transformations intractable.

Therefore, what is needed is a system and method for automatically and dynamically decomposing a video sequence into a number of layers, with each layer representing either an object or a background image, over each frame of the video sequence. Such a system and method should be capable of identifying sprites or objects of any geometry, including those with dynamic or changing geometries through a sequence of images without the need to use object specific models. Further, such a system and method should be capable of reliably identifying sprites having unknown shapes and sizes which must be distinguished from the background, other sprites, sensor noise, lighting noise, and significant amounts of deformation. Finally, such a system and method should be capable of processing large data sets in real time, or near-real time.

SUMMARY

A simple and efficient way to model and automatically analyze video or image sequences is through the use of a layered representation in which a 3-dimensional scene is decomposed into a set of 2-dimensional objects in layers i.e., "sprites," thereby significantly simplifying the geometry of the scene. However, unsupervised learning of sprites from an image sequence is a difficult task, since the sprites typically have unknown shapes and sizes and must be distinguished from the background, other sprites, sensor noise, lighting noise, and significant amounts of deformation.

A generative model, as described herein, is used for learning the appearances of multiple objects in multiple layers (i.e., sprites), over an entire video or image sequence. In contrast to conventional schemes for learning the appearances of objects in videos, the approach described is very general, so that sprites of any size, shape, or geometry can be learned without the use of sprite-specific shape priors or models. Further, the only inputs required for learning the sprites within the image sequence are the video sequence itself, the number of layers desired, and the number of sprites to be learned. However, in one embodiment, both the number of layers and the number of sprites is automatically determined by optimizing a sum of the log likelihood of the data and a measure of model complexity to automatically determine an optimal number of layers and sprite classes. In addition, unlike most conventional schemes, the generative model described herein is also applicable to unordered collections of images for generating sprites from those images. Finally, the generative model described herein is capable of processing images of moderate resolution in real time or near-real time.

In general, the modeling and analysis of an image sequence is accomplished by the system and method described herein by using a "generative model" for automatically learning layered sprites from a sequence of images. In addition, the concept of "flexible sprites" is introduced to address the idea that these sprites can deform from frame to frame. Specifically, "flexible sprites" represent objects or "sprites" whose geometry is dynamically changeable from frame to frame in an image sequence. Consequently, the generative model represents images or frames of the video sequence as collections of flat moving objects that change their appearance and shape over time, i.e., "flexible sprites." Further, these flexible sprites may also occlude each other over time, such as when one object partially or completely passes in front of, or behind, another object from one image frame to the next.

Learning flexible sprites from an image sequence involves automatically decomposing a video sequence for learning probabilistic 2-dimensional appearance maps and masks of moving occluding objects in the video sequence. A simplified general model, e.g., a "generative model for layered vision," and an associated estimation algorithm is provided for modeling visual data such as images or frames in a video or other image sequence.

This generative model explains each input image in the image sequence as a layered composition of flexible sprites. A variational expectation maximization algorithm is used to learn a mixture of sprites from the image sequence. For each input image, probabilistic inference is used to infer sprite class, translation, and mask values and pixel intensities (including obstructed pixels) in each layer. Exact inference is intractable; however, the generative model described herein uses a variational inference technique to efficiently process images. Visual data for modeling the flexible sprites within the image sequence is generated where parameters such as appearance bit maps and noise, shape bit-maps and variability in shape, etc., are known. Further, when unknown, these parameters are reliably estimated from visual data by the generative model without prior pre-processing by using a maximization algorithm.

Thus, by parameter estimation and inference in the model, visual data is segmented into components, i.e., "sprites" which facilitate sophisticated applications in video or image editing. For example, once learned, the flexible sprite model is useful for a number of purposes, including, for example, video summarization, point-and-click video stabilization, and point-and-click object removal or insertion into a video sequence. Other uses include tracking and visual surveillance of objects in a video sequence, video browsing, photo organization, video compositing, etc.

In particular, the generative imaging model described herein uses an unsupervised learning process to learn probabilistic representations of "flexible sprites." It should be noted that particular instances of the "flexible sprites," i.e., the sprite as it is represented by a single image frame, are referred to herein as "rigid sprites." In one embodiment, a rigid sprite is described by a raster-scan vector of grayscale pixel intensities and a raster-scan vector of mask values. Note that in another embodiment, the sprites are in color. As should be appreciated by those skilled in the art, the extension to color sprites is straightforward, with additional color or intensity values being described by vectors in the same manner as in the grayscale case. However, for purposes of explanation and understanding, the grayscale case will be described herein.

Clearly, when the sprites are learned from a video sequence using the unsupervised learning procedures described herein, the size of the object is not known in advance. Consequently, to account for an arbitrary object size, the images corresponding to the aforementioned vectors are the same size as the input image. A mask value of 1 indicates the pixel belongs to the sprite, whereas a mask value of 0 indicates the pixel does not belong to the sprite.

Each vector of observed pixel intensities is explained by combining a vector of background pixel intensities with an instantiated sprite. In addition, it should be noted that this background may also contain other layered sprites that have already been combined with the background. In making this combination, sprite pixels that are determined to be fully transparent are erased, while background pixels that are occluded by the sprite are similarly erased. Further, it should be noted that in a closely related embodiment, a term is added to each vector for describing noise, such as sensor noise, interference noise, etc. Further, because objects such as, for example, windows and shadows, may be transparent or semi-transparent, the aforementioned mask values are real numbers in [0, 1], with 0 representing fully transparent, and 1 representing fully non-transparent. This basic model is extended to allow each sprite to undergo simple geometric transformations (translation, rotation, etc.) so that it can appear with different geometry in different frames of the image sequence. In general, these transformations are represented by a discrete set of possible transformations.

Given the sprites and the background, an image is formed by composing a translated sprite appearance map with a background appearance map, and using a translated mask and its inverse. Both the sprite mask and the sprite appearance map are transformed before being composed with the background. This composition uses sprites and maps that were learned in an unsupervised fashion from a sequence a frames, as described in further detail below.

The aforementioned transformation preserves the number of pixels, i.e., the number of pixels before the transformation is the same and the number of pixels after the transformation. Further, in one embodiment, to allow the sprite to overlap with the boundary of the input image without wrapping around to the other side, a "window layer" is used. This window layer allows the background model to be "filled in" by padding the borders of the original image sequence with zeros and using a three-layer model where a front layer acts as a window that lets everything in the central region through. During learning, the algorithm uses a portion of the background that is inferred from each frame to improve the estimate of a background "panorama."

Multiple, occluding objects throughout an image sequence are modeled using layers of flexible sprites. The layers are combined using the sprite masks. In general, layers are indexed, with a first or bottom layer representing the background layer, and each subsequent layer through the last layer representing layered sprites. Again, as noted above, each sprite has an associated sprite appearance map and sprite mask for each layer. Given these layers, an observable image is constructed by adding together the sprites in all layers, and masking each sprite by the product of inverse masks for the sprites in later layers.

Because the appearance of each sprite may vary from frame to frame, as noted above, a probabilistic representation, i.e., the "flexible sprite," is used for modeling objects in the image sequence. Flexible sprites may have different instantiations from frame to frame, but all of these instantiations are typical under the probability model that defines the particular flexible sprite. To allow for multiple objects, a mixture of Gaussians is used for a prior distribution over the appearance and mask for a particular sprite class. In determining a joint probability distribution, it is assumed that the sprite class, sprite transformation, sprite appearance map and sprite mask at each layer are chosen independently of the sprites in other layers.

As noted above, the number of sprites, the number of layers, and the image sequence is all that must be provided in order to learn the sprites from the image sequence. However, as noted above, in one embodiment, both the number of layers and the number of sprites is automatically determined by optimizing a sum of the log likelihood of the data and a measure of model complexity to automatically determine an optimal number of layers and sprite classes. In either case, given this information, probabilistic inference and learning are used to compute a single set of model parameters that represent the entire video sequence. These parameters include the prior probabilities of the sprite classes, the means and variances of the sprite appearance maps, the means and variances of the sprite masks, and observation noise variances.

The aforementioned parameters are initialized using the means and variances of the pixels in the video sequence. Then, an expectation-maximization ("EM") algorithm is used to learn the flexible sprite models, so that the video sequence has high marginal probability under the model. In general, as is well known to those skilled in the art, an EM algorithm is used to approximate a probability function. EM is typically used to compute maximum likelihood estimates given incomplete samples. In the expectation step (the "E-Step"), the model parameters are assumed to be correct, and for each input image, probabilistic inference is used to fill in the values of the unobserved variables, e.g., the sprite class, sprite transformation, sprite appearance and sprite mask at each layer. In the maximization step (the "M-Step"), the model parameters are adjusted to increase the joint probability of the observations and the filled in unobserved variables. These two steps are then repeated until convergence is achieved.

In fact, for each input image, the E-Step fills in the unobserved variables with a distribution over plausible configurations (the posterior distribution), and not just over individual configurations. This is an important aspect of the EM algorithm. Initially, the parameters are a very poor representation of the data. So, any single configuration of the unobserved variables (e.g., the most probable configuration under the posterior) will very likely be the wrong configuration. The exact EM algorithm uses the exact posterior in the E-Step and maximizes the joint probability with respect to the model parameters in the M-Step. The exact EM algorithm consistently increases the marginal probability of the data, performing maximum likelihood estimation.

However, in some cases, the joint probability cannot be directly maximized. In this case, a generalized expectation-maximization (GEM) algorithm uses the exact posterior in the E-Step, but just partially maximizes the joint probability in the M-Step, e.g., using a nonlinear optimizer. The GEM algorithm also consistently increases the marginal probability of the data. More generally, not only is an exact M-Step not possible, but computing the exact posterior is intractable. Thus, generalized EM is used to learn the model parameters from an image sequence video sequence. The GEM algorithm permits the use of an approximation to the exact posterior in the E-Step, and a partial optimization in the M-Step. The GEM algorithm consistently increases a lower bound on the marginal probability of the data. As with EM algorithms, GEM algorithms are also well known to those skilled in the art.

In view of the preceding discussion, it is clear that the generative model for layered vision described herein is advantageous for use in decomposing sequences of images into a background and a number of layered flexible sprites. The flexible sprites and background can then be manipulated as desired, such as adding or removing sprites, manipulating the speed, size, or general appearance of particular sprites, combining sprites, or even combining sprites from otherwise separate image sequences, or inserting sprites from one image sequence into another image sequence or image background. In addition to the just described benefits, other advantages of the generative model for layered vision described herein will become apparent from the detailed description which follows hereinafter when taken in conjunction with the accompanying drawing figures.

DESCRIPTION OF THE DRAWINGS

The specific features, aspects, and advantages of the generative model for layered vision will become better understood with regard to the following description, appended claims, and accompanying drawings where:

FIG. 5A illustrates a simple exemplary graphical model with one hidden variable.

FIG. 5B illustrates a structured model of the hidden variable of FIG. 5A.

FIG. 5C illustrates a composed model generated from the models of FIGS. 5A and 5B.

FIG. 5D illustrates an exemplary complex graphical model built from five modules.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
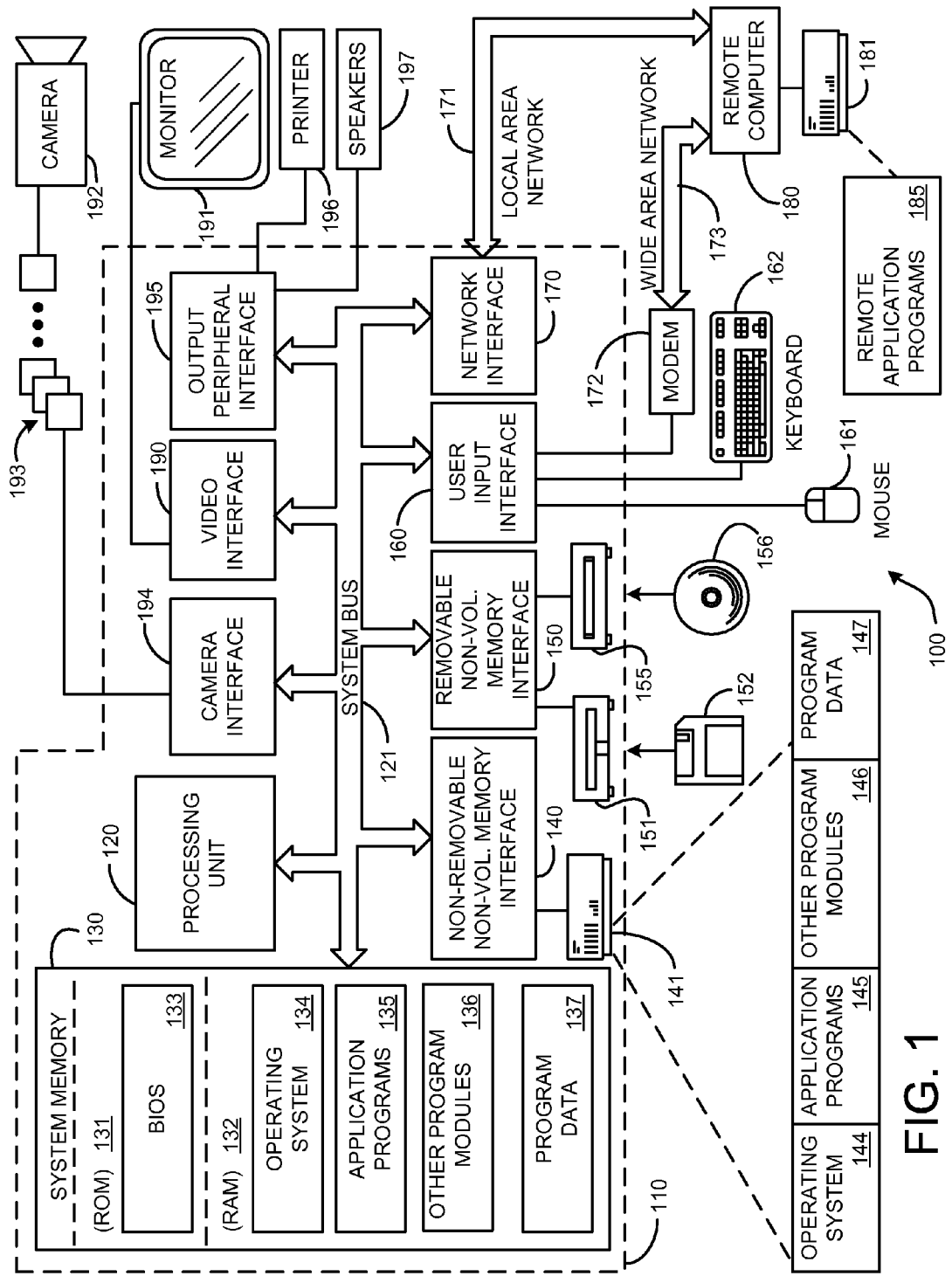
FIG. 1 is a general system diagram depicting a general-purpose computing device constituting an exemplary system for learning generative models and flexible sprites from input images.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The aforementioned term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the creation and use of a generative model for decomposition of image sequences into a group of layered 2-dimensional appearance maps and masks of moving occluding objects. In other words, the following discussion provides details regarding use of the generative model for automatically learning layers of "flexible sprites" from an image sequence.

2.0 Introduction

A simple and efficient way to model and automatically analyze video or image sequences is through the use of a layered representation in which a 3-dimensional scene is decomposed into a set of 2-dimensional objects in layers i.e., "sprites," thereby significantly simplifying the geometry of the scene. However, unsupervised learning of sprites from an image sequence is a difficult task, since the sprites typically have unknown shapes and sizes and must be distinguished from the background, other sprites, sensor noise, lighting noise, and significant amounts of deformation.

A generative model, as described herein, is used for learning the appearances of multiple objects in multiple layers (i.e., sprites), over an entire video or image sequence. In contrast to conventional schemes for learning the appearances of objects in videos, the approach described is very general. Further, the only inputs required for learning the sprites within the image sequence are the video sequence itself, the number of layers desired, and the number of sprites to be learned. However, in one embodiment, both the number of layers and the number of sprites is automatically determined by optimizing a sum of the log likelihood of the data and a measure of model complexity to automatically determine an optimal number of layers and sprite classes. In addition, unlike most conventional schemes, the generative model described herein is also applicable to unordered collections of images for generating sprites from those images.

In general, the modeling and analysis of an image sequence is accomplished by the system and method described herein by using a "generative model" for automatically learning layered sprites from a sequence of images. In addition, the concept of "flexible sprites" is introduced to address the idea that these sprites can deform from frame to frame. Specifically, "flexible sprites" represent objects or "sprites" whose geometry is dynamically changeable from frame to frame in an image sequence. Consequently, the generative model represents images or frames of the video sequence as collections of flat moving objects that change their appearance and shape over time, i.e., "flexible sprites." Further, these flexible sprites may also occlude each other over time, such as when one object partially or completely passes in front of, or behind, another object from one image frame to the next.

Learning flexible sprites from an image sequence involves automatically decomposing a video sequence for learning probabilistic 2-dimensional appearance maps and masks of moving occluding objects in the video sequence. A simplified general model, e.g., a "generative model for layered vision," and an associated estimation algorithm is provided for modeling visual data such as images or frames in a video or other image sequence.

This generative model explains each input image in the image sequence as a layered composition of flexible sprites. A variational generalized expectation maximization algorithm is used to learn a mixture of sprites from the image sequence. For each input image, probabilistic inference is used to infer sprite class, translation, and mask values and pixel intensities (including obstructed pixels) in each layer. Exact inference is intractable; however, the generative model described herein uses a variational inference technique to efficiently process images. Visual data for modeling the flexible sprites within the image sequence is generated where parameters such as appearance bit maps and noise, shape bit-maps and variability in shape, etc., are known. Further, when unknown, these parameters are reliably estimated from visual data by the generative model without prior pre-processing by using a maximization algorithm.

Thus, by parameter estimation and inference in the model, visual data is segmented into components, i.e., "sprites" which facilitate sophisticated applications in video or image editing. For example, once learned, the flexible sprite model is useful for a number of purposes, including, for example, video summarization, point-and-click video stabilization, and point-and-click object removal or insertion into a video sequence. Other uses include video browsing, photo organization, video compositing, etc. Still other uses include tracking and visual surveillance of objects in a video sequence. For example, in one embodiment, a sprite mask for each frame is inferred and used to automatically track a deformable object. Note that such tracking is reliable enough to allow for tracking of barely visible shadows of sprites within an image frame.

2.1 System Overview:

The generative imaging model described herein uses an unsupervised learning process to learn probabilistic representations of "flexible sprites." It should be noted that particular instances of the "flexible sprites," i.e., the sprite as it is represented by a single image frame, are referred to herein as "rigid sprites." In one embodiment, a rigid sprite is described by a raster-scan vector of grayscale pixel intensities and a raster-scan vector of mask values. Note that in another embodiment, the sprites are in color. As should be appreciated by those skilled in the art, the extension to color sprites is straightforward, with additional color or intensity values being described by vectors in the same manner as in the grayscale case. However, for purposes of explanation and understanding, the grayscale case will be described herein.

Clearly, when the sprites are learned from a video sequence using the unsupervised learning procedures described herein, the size of the object is not known in advance. Consequently, to account for an arbitrary object size, the images corresponding to the aforementioned vectors are the same size as the input image. A mask value of 1 indicates the pixel belongs to the sprite, whereas a mask value of 0 indicates the pixel does not belong to the sprite.

Each vector of observed pixel intensities is explained by combining a vector of background pixel intensities with an instantiated sprite. In addition, it should be noted that this background may also contain other sprites, as described below. In making this combination, sprite pixels that are determined to be fully transparent are erased, while background pixels that are occluded by the sprite are similarly erased. Further, it should be noted that in a closely related embodiment, a term is added to each vector for describing noise, such as sensor noise, interference noise, etc. Further, because objects such as, for example, windows and shadows, may be transparent or semi-transparent, the aforementioned mask values are real numbers in [0, 1], with 0 representing fully transparent, and 1 representing fully non-transparent. This basic model is extended to allow each sprite to undergo simple geometric transformations (translation, rotation, etc.) so that it can appear with different geometry in different frames of the image sequence. In general, these transformations are represented by a discrete set of possible transformations.

Given the sprites and the background, an image is formed by composing a translated sprite appearance map with a background appearance map, and using a translated mask and its inverse. Both the sprite mask and the sprite appearance map are transformed before being composed with the background. This composition uses sprites and maps that were learned in an unsupervised fashion from a sequence a frames, as described in further detail below.

The aforementioned transformation preserves the number of pixels, i.e., the number of pixels before the transformation is the same and the number of pixels after the transformation. Further, in one embodiment, to allow the sprite to overlap with the boundary of the input image without wrapping around to the other side, a "window layer" is used. This window layer allows the background model to be "filled in" by padding the borders of the original image sequence with zeros and using a three-layer model where a front layer acts as a window that lets everything in the central region through. During learning, the algorithm uses a portion of the background that is inferred from each frame to improve the estimate of a background "panorama."

Multiple, occluding objects throughout an image sequence are modeled using layers of flexible sprites. The layers are combined using the sprite masks. In general, layers are indexed, with a first or bottom layer representing the background layer, and each subsequent layer through the last layer representing layered sprites. Again, as noted above, each sprite has an associated sprite appearance map and sprite mask for each layer. Given these layers, an observable image is constructed by adding together the sprites in all layers, and masking each sprite by the product of inverse masks for the sprites in later layers.

Because the appearance of each sprite may vary from frame to frame, as noted above, a probabilistic representation, i.e., the "flexible sprite," is used for modeling objects in the image sequence. Flexible sprites may have different instantiations from frame to frame, but all of these instantiations are typical under the probability model that defines the particular flexible sprite. To allow for multiple objects, a mixture of Gaussians is used for a prior distribution over the appearance and mask for a particular sprite class. In determining a joint probability distribution, it is assumed that the sprite class, sprite transformation, sprite appearance map and sprite mask at each layer are chosen independently of the sprites in other layers.

As noted above, the number of sprites, the number of layers, and the image sequence is all that must be provided in order to learn the sprites from the image sequence. However, as noted above, in one embodiment, both the number of layers and the number of sprites is automatically determined by optimizing a sum of the log likelihood of the data and a measure of model complexity to automatically determine an optimal number of layers and sprite classes. In either case, given this information, probabilistic inference and learning are used to compute a single set of model parameters that represent the entire video sequence. These parameters include the prior probabilities of the sprite classes, the means and variances of the sprite appearance maps, the means and variances of the sprite masks, and observation noise variances.

The aforementioned parameters are initialized using the means and variances of the pixels in the video sequence. Then, an expectation-maximization ("EM") algorithm is used to learn the flexible sprite models, so that the video sequence has high marginal probability under the model. In general, as is well known to those skilled in the art, an EM algorithm is used to approximate a probability function. EM is typically used to compute maximum likelihood estimates given incomplete samples. In the expectation step (the "E-Step"), the model parameters are assumed to be correct, and for each input image, probabilistic inference is used to fill in the values of the unobserved variables, e.g., the sprite class, sprite transformation, sprite appearance and sprite mask at each layer. In the maximization step (the "M-Step"), the model parameters are adjusted to increase the joint probability of the observations and the filled in unobserved variables. These two steps are then repeated until convergence is achieved.

In fact, for each input image, the E-Step fills in the unobserved variables with a distribution over plausible configurations (the posterior distribution), and not just over individual configurations. This is an important aspect of the EM algorithm. Initially, the parameters are a very poor representation of the data. So, any single configuration of the unobserved variables (e.g., the most probable configuration under the posterior) will very likely be the wrong configuration. The exact EM algorithm uses the exact posterior in the E-Step and maximizes the joint probability with respect to the model parameters in the M-Step. The exact EM algorithm consistently increases the marginal probability of the data, performing maximum likelihood estimation.

However, in some cases, the joint probability cannot be directly maximized. In this case, a generalized expectation-maximization (GEM) algorithm uses the exact posterior in the E-Step, but just partially maximizes the joint probability in the M-Step, e.g., using a nonlinear optimizer. The GEM algorithm also consistently increases the marginal probability of the data. More generally, not only is an exact M-Step not possible, but computing the exact posterior is intractable. Thus, generalized EM is used to learn the model parameters from an image sequence video sequence. The GEM algorithm permits the use of an approximation to the exact posterior in the E-Step, and a partial optimization in the M-Step. The GEM algorithm consistently increases a lower bound on the marginal probability of the data. As with EM algorithms, GEM algorithms are also well known to those skilled in the art.

The aforementioned concepts are described in detail in the following sections, with a discussion regarding variational approximation methods and inferential FFT methods for dramatically accelerating the learning of the flexible sprite models provided in specific detail below in Section 5.0.

Figure 2:
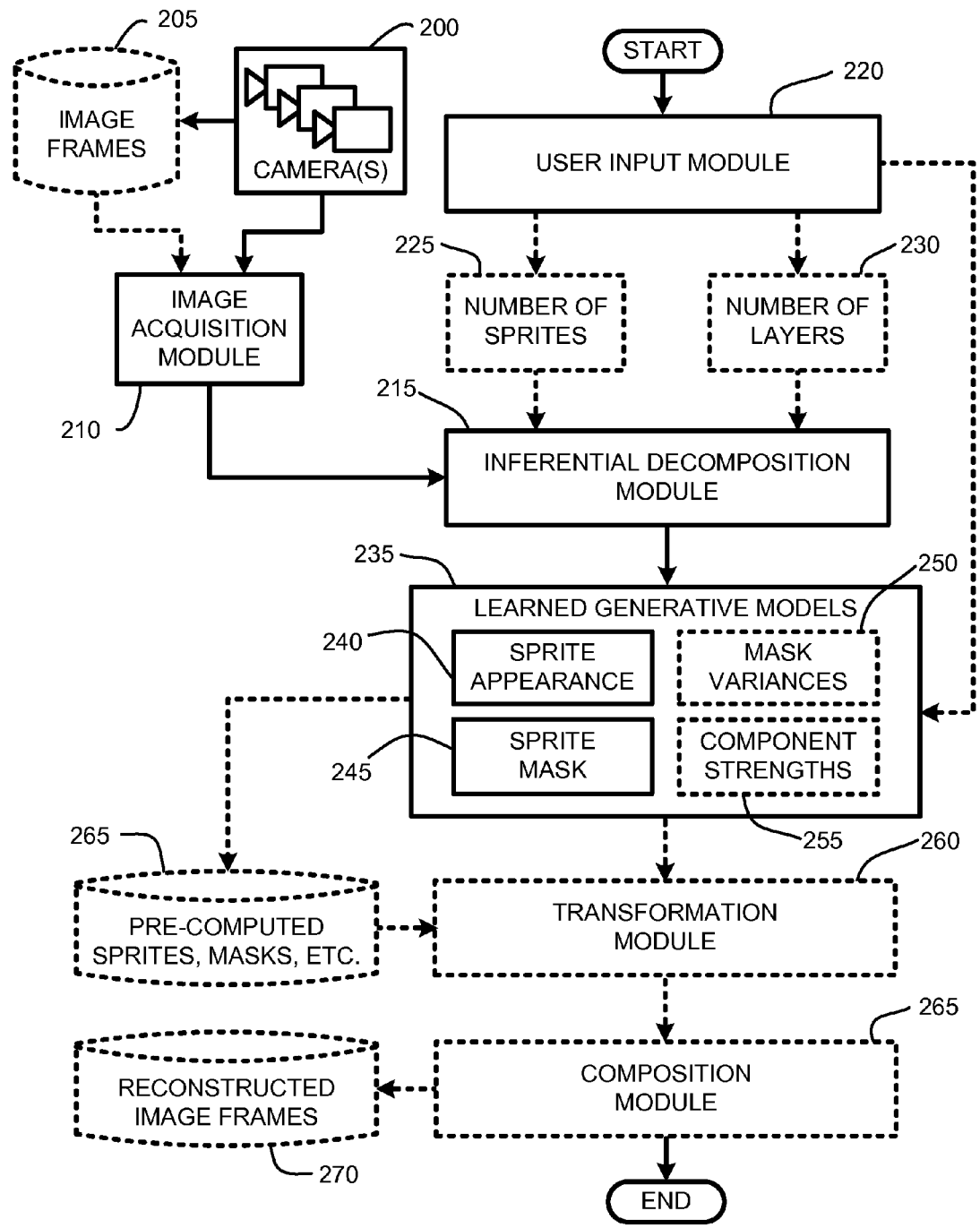
FIG. 2 illustrates an exemplary architectural diagram showing exemplary program modules for learning flexible sprites from a set of images.

2.2 System Architecture:

The processes summarized above are illustrated by the general system diagram of FIG. 2. In particular, the system diagram of FIG. 2 illustrates the interrelationships between program modules for learning flexible sprites in image layers. It should be noted that the boxes and interconnections between boxes that are represented by broken or dashed lines in FIG. 2 represent alternate embodiments of deghosting methods described herein, and that any or all of these alternate embodiments, as described below, may be used in combination with other alternate embodiments that are described throughout this document.

In particular, as illustrated by FIG. 2, a system and method for learning flexible sprites processes a sequence of one or more images for learning multiple layers of multiple flexible sprites throughout the image sequence. To begin one or more cameras 200 provides one or more sequential image frames 205 directly to an image acquisition module 210. Alternately, the image frames 205 are first stored to an image database or file on a computer readable medium, which in turn provides the images to the image acquisition 210 module when processing of the image sequence is desired.

In either case, the image acquisition module 210 then provides the image frames 205 to an inferential decomposition module 215. In addition, in one embodiment, a desired number of flexible sprites 225 (i.e., the number of sprite classes) and a desired number of layers 235 are input to the inferential decomposition module 215 via a user interface module 220. For example, in a conventional image sequence comprised of a single person walking through a scene, with no other elements to consider, a user input of two sprite classes and two layers would serve to allow the identification of the image background as the first sprite class, and the person as the second sprite class. In an alternate embodiment, the inferential decomposition module 215 automatically determines an optimal number of layers and an optimal number of sprites by optimizing a sum of the log likelihood of the data and a measure of model complexity. This embodiment is discussed in detail below in Section 3.1.4.

Given the number of sprites 225, the number of layers 230, and the image frames 205, the inferential decomposition module 215 then begins an iterative generalized expectation maximization process for learning a generative model 235 from the input image frames 205 for each sprite. In general, as described in greater detail below, this iterative generalized expectation maximization process operates by using a variational probabilistic inference to infer sprite class, translation, and mask values and pixel intensities (including obstructed pixels) in each layer.

In general, the iterative generalized expectation maximization process performed by the inferential decomposition module 215 serves to decompose the input image frames into individual components consisting of sprite appearances 240 and sprite masks 245, further, mask variances 255 and component strengths 255 are also inferred in alternate embodiments. In combination, these components form a unique learned generative model 235 for each flexible sprite.

The sprite appearance 240 (i.e., the flexible sprite) is basically a probabilistic 2-dimensional appearance map representing an object identified throughout the image sequence. In other words, the sprite appearance is basically the mean appearance of an object identified in the image frames 205 as a flexible sprite. Similarly, the sprite masks 245 are basically maps of which pixels in the image frames 205 are represented the flexible sprite. For example, given a mask the same size as the input images 205 for each sprite, a mask value of 1 indicates that a particular pixel in the mask belongs to the sprite, while a mask value of 0 indicates the pixel does not belong to the sprite.

In a related embodiment, as described in further detail below, the value of the mask is varied between 0 and 1 to allow for transparent or semi-transparent sprites. In yet another related embodiment, individual sprite masks 245 are adjustable via the user interface 220, such that the transparency of any particular sprite can be adjusted as desired.

In addition, in one embodiment, mask variances 250 and component strengths 255 are determined by the inferential decomposition module 215 for each learned generative model 235. In general, the mask variances 250 allow deformation of the sprite. For example, given an image sequence of a clothed walking person, these mask variances 250 capture the variability due to the walking (i.e., leg and arm positions) and the cloth motion, as well as possible aliasing effects on the person or clothes, due for example, to movement of a patterned shirt. The component strengths 255 are basically weights which are assigned to the probability density functions of each component of the generative model.

In one embodiment, once the generative model 235 has been learned for each sprite, the generative models are provided to a transformation model where each sprite is transformed for each image frame, as described in detail below, and provided to a composition module 265 for use in reconstructing the decomposed image frames. In one embodiment, one or more of these stored generative models are then provided to the transformation module 260 as with the newly generative models 235. In another embodiment, the reconstructed image frames are stored to a file or database 270 for later viewing or processing.

In another embodiment, one or more learned generative models 235 are stored in a file or database 265 of pre-computed sprites, sprite masks, etc. As described below, pre-computed stored generative models 265 may be used for a number of purposes. For example, given an input image sequence of a person walking across a field, with a person sprite and a background sprite being learned for the generative model 235, additional sprites can be added to a reconstructed image created by the composition module 265. For example, assuming that a generative model representing a flying bird has been previously inferred and stored to a file or database 265, that single generative model of a flying bird can be used to add one or more flying birds to the scene of the person walking across the field. Further, as described in detail below, any or all of these sprites can be composed in any desired order, such as, for example, with birds flying either in front of or behind the person, or both in front of and behind the person in a composited image sequence.

3.0 Operation Overview

Note that for purposes of explanation and understanding, the following discussion describes grayscale sprites; however, sprites can be bi-level, grayscale, color, or any combination of bi-level, grayscale, color images.

Figure 3:
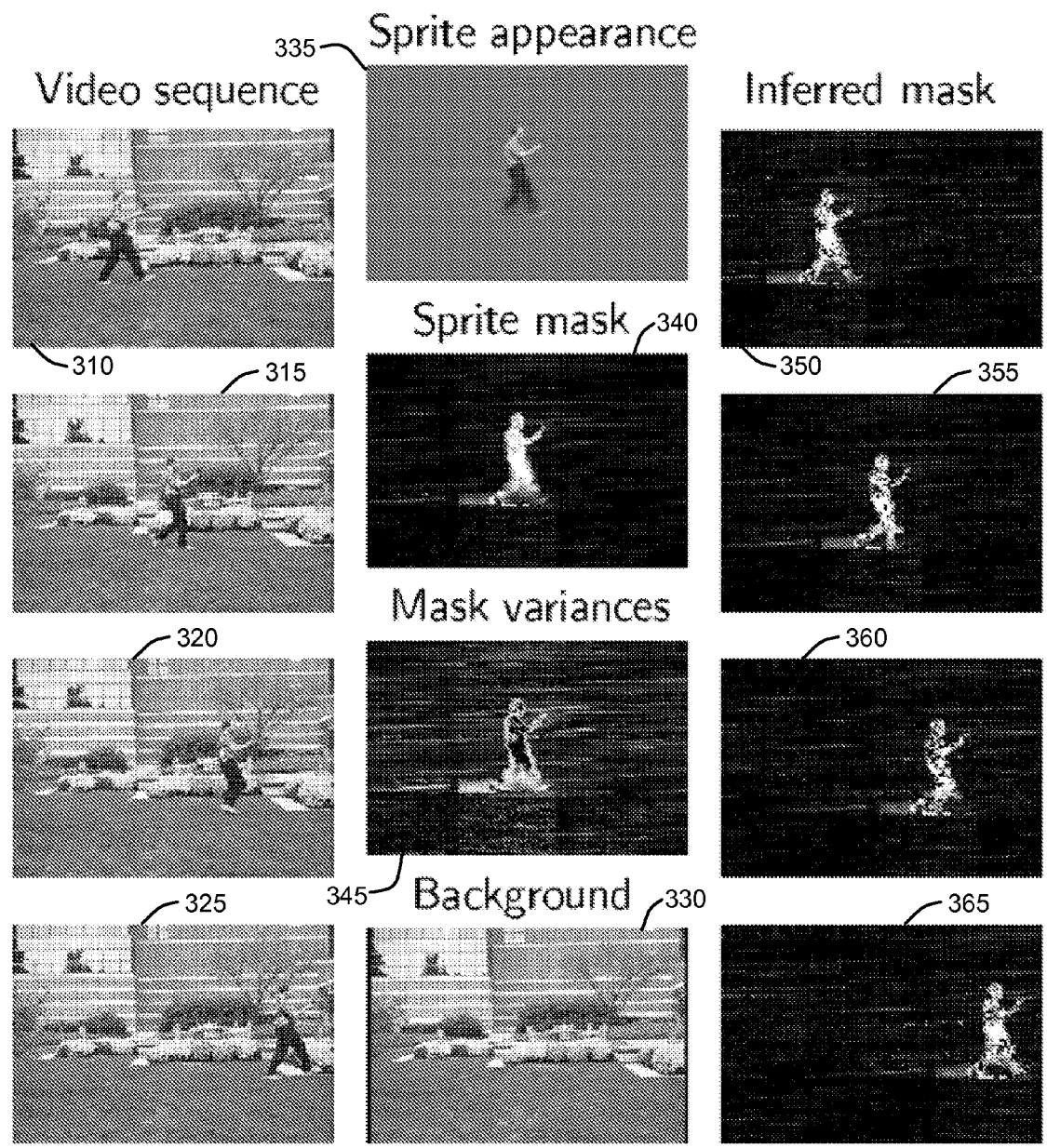
FIG. 3 illustrates a sequence of image frames which have been automatically decomposed by a generative model as described herein.

As noted above, the system and method described herein automatically learns probabilistic 2-dimensional appearance maps and masks of moving, occluding, geometrically dynamic objects. In other words, the system and method described herein automatically learns layers of "flexible sprites." The model explains each input image as a layered composition of flexible sprites. A variational expectation maximization algorithm is used to learn a mixture of sprites from a video sequence. For each input image, probabilistic inference is used to infer the sprite class, translation, and mask values and pixel intensities (including obstructed pixels) in each layer. Further, because exact inference is intractable, a variational inference process is used to process images For example, FIG. 3 illustrates four frames from a video sequence 310, 315, 320, and 325, that have been automatically decomposed into a "flexible sprite" and a background model 330 as described herein. In particular, in defining the flexible sprite, a sprite appearance map 335 is determined along with a sprite mask 340 over the image.

3.1 Probability Models:

In general, if h is a vector of hidden variables in a probability model, and x is a vector of observed variables, the corresponding probability model typically defines the joint distribution over all variables, as illustrated by Equation 1:

$$p(x,h)=p(x|h)p(h) \qquad \text{Equation 1}$$

where p(h) can further decompose into a product of conditional probability distributions depending on the model structure. This structure is often described using a graphical model where edges indicate conditional dependence.

Figure 4:
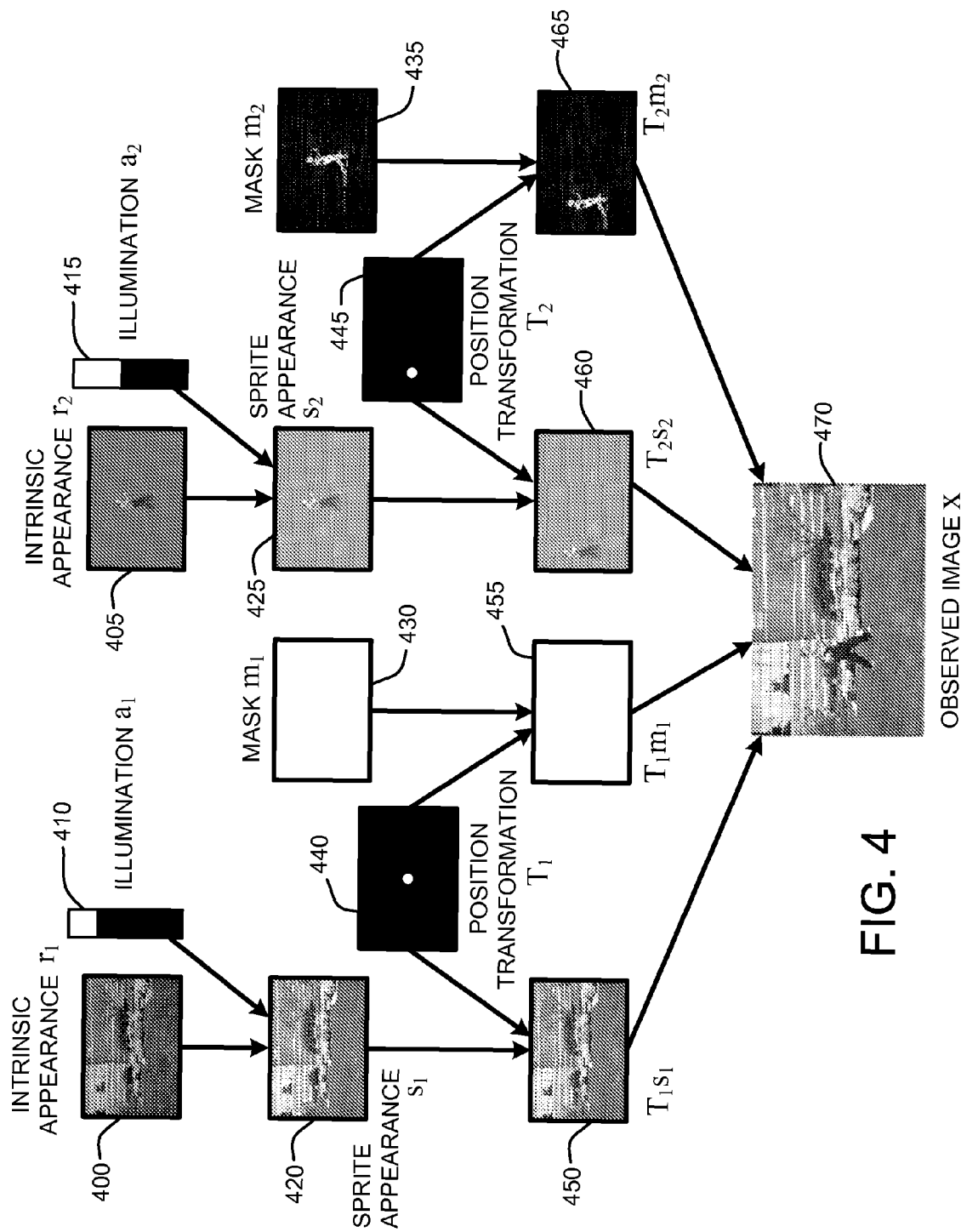
FIG. 4 illustrates an exemplary pictorial representation of a probabilistic layer structure for a probabilistic generative model as described herein.

For example, FIG. 4A illustrates an exemplary generative model of video sequences that involves several causes of variability modeled as a set of random variables in which each variable is conditioned on its parents. Only the final video frame is available, while all other variables are hidden. In this model, denoting the intrinsic (illumination insensitive) images $r_l$ (e.g., $r_1$ and $r_2$, 400 and 405, respectively), illumination constants $a_l$ (e.g., $a_1$ and $a_2$, 410 and 415, respectively), sprite appearances $s_l$ (e.g., $s_1$ and $s_2$, 420 and 425, respectively), masks $m_l$ (e.g., $m_1$ and $m_2$, 430 and 435, respectively) and sprite transformations $T_l$ (e.g., $T_1$ and $T_2$, 440 and 445, respectively), the factorization is provided by Equation 2 as:

$$p(x, \{r_l, a_l, s_l, m_l, T_l\}_{l=1}^L) = \quad \text{Equation 2}$$
$$p(x \mid \{s_l, m_l, T_l\}_{l=1}^L) \prod_l p(m_l) p(s_l \mid r_l, a_l) p(r_l) p(a_l) p(T_l)$$

Probability models are typically parameterized by a vector of parameters $\psi$, which is sometimes emphasized by using the notation $p(x,h|\psi)$. For instance, the hidden intrinsic appearance $r_2$, 400, of the foreground object in FIG. 4A, can be modeled as a Gaussian distribution with a diagonal covariance matrix:

$$p(r_2, \psi^k(\mu, \Phi)) = \mathcal{N}(r_2, \mu, \Phi) \quad \text{Equation 3}$$
$$= \exp\left[ -\frac{1}{2}(r_2 - \mu)'\Phi^{-1}(r_2 - \mu) - \frac{1}{2}\log|2\pi\Phi| \right]$$

where $\mu$ is a vector of mean pixel intensities and $\mathrm{diag}(\Phi)$ is a vector of variances on the diagonal of covariance matrix $\Phi$, where high values indicate high variance. The rest of the elements are assumed to be zero, since the sheer size of the matrix would make it difficult to learn this matrix from a limited amount of data. For example, given a clothed walking person, the variances capture the variability due to the walking and the motion of the clothes, as well as possible aliasing effects on the person or clothes, due for example, to movement of a patterned shirt. However, note that methods for incorporating pixel correlation into the model for addressing this issue are discussed in detail below.

The likelihood of the observed variables is a measure of the compatibility between the model or the data, and is computed by marginalization, $$p(x) = \int_h p(x,h) \quad \text{Equation 4}$$

For the model in FIG. 4A, the integration would be done with respect to hidden variables $h = \{r_l, a_l, m_l, T_l\}_{l=1}^L$. Because this integration cannot always be performed in a closed form, it is approximated as described in the following section.

3.1.1 Variational Inference:

The standard inference method based on Bayes rule is not always computationally feasible. Once some of the variables in a model are observed, the variables that did not have an edge between them might become coupled through the observed variable. This, and possible nonlinearities in the model, sometimes complicate the inference, and create the need for variational approximations as described below.

For example, as illustrated in FIG. 4A, although the model generates sprite transformations 450 and 465 independently and then combines their effects into an observed video frame, given the observed image frame 470, the sprite transformations are not independent. This leads to a combinatorial explosion in the number of possible combinations of the object transformations that need to be tested when computing an exact posterior. Furthermore, the layers of sprites are composed into the observed frame through a nonlinear process that involves multiplication of appearance maps with the transparency maps. Thus, even if both the appearance and transparency maps are modeled with simple and well-behaved probability distributions with analytic forms, such as the above-illustrated Gaussian distribution, the posterior distribution is not Gaussian, or of any other tractable form.

Consequently, variational methods are used to approximate the posterior distribution with a simplified form that leads to a tractable integration over hidden variables. As discussed below, this approximation renders the result of the integration strictly smaller than the real likelihood, and this provides guarantees on convergence of variational inference and learning algorithms.

Using the well-known Jensen's inequality, the log-likelihood of the observation can be bounded using an arbitrary probability distribution function function q(h):

$$\log p(x) = \log \int_h p(x, h) \quad \text{Equation 5}$$
$$= \log \int_h q(h) \frac{p(x, h)}{q(h)} \geq \int_h q(h) \log \frac{p(x, h)}{q(h)}$$
$$= E_{q(h)} \log p(x, h) - E_{q(h)} \log q(h)$$
$$= B$$

where $E_{q(h)}$ denotes expectation under the probability distribution q(h). The inequality is a direct consequence of the concavity of the log function, and the only requirement for q(h) is that it is a probability distribution, i.e., it integrates to one. The inequality becomes an equality when the auxiliary distribution q(h) is equal to the posterior p(h|x):

$$\int_h p(h \mid x) \log \frac{p(x, h)}{p(h \mid x)} = \int_h p(h \mid x) \log p(x) = \log p(x) \quad \text{Equation 6}$$

This casts inference in a slightly different light, as from Equation 6, it can be considered as searching for the best auxiliary probability distribution q(h) in terms of the above bound.

Typically, such a search is not tractable and is thus limited on a subset Q of all possible functions q(h), parameterized by vector a $\phi$. This concept is emphasized below by the general notation q(h,$\phi$). If the true posterior p(h|x) is in Q, then maximizing the bound B with respect to $\phi$ will produce the exact posterior q(h,$\phi$)=p(h|x). Otherwise, when p(h|x)$\notin$Q, the optimization will yield a q(h) that is as close as possible to the true posterior in terms of the "Kullback-Leibler distance" (i.e., the "KL distance"):

$$D(q(h) \| p(h \mid x)) = -\int_h q(h) \log \frac{p(h \mid x)}{q(h)} \quad \text{Equation 7}$$

since the KL distance differs from the bound B only by an additive term independent of the parameters $\phi$, $D(p\|q) = -B - \log p(x)$. This is the core idea of variational inference: even when the computation of the exact posterior is intractable, it is possible to find a good approximation of it on a more tractable set of parameterized distributions. Note that the concept of the Kullback-Leibler distance is well known to those skilled in the art, and will not be discussed in detail herein. However, in general, the Kullback-Leibler distance can be considered as a kind of a distance between two probability densities, though it is not a real distance measure because it is not symmetric.

Apart from choosing a tractable parametric form for q, another useful approximation is a factorization of q. For example, given a model $p(x,h_1,h_2)=p(x|h_1,h_2)p(h_1)p(h_2)$, limiting the q function to be of the form $q(h)=q(h_1)q(h_2)$ decomposes the bound B into a sum, $$B = E_{q(h_1)q(h_2)} \frac{\log p(x \mid h_1, h_2)}{q(h_1)q(h_2)} \quad \text{Equation 8}$$

$$= E_{q(h_1)q(h_2)} \log p(x \mid h_1, h_2) + E_{q(h_1)} \log p(h_1) +$$

$$E_{q(h_2)} \log p(h_2) - E_{q(h_1)} \log q(h_1) - E_{q(h_2)} \log q(h_2)$$

where the expectation operator E performs integration over the probability distribution in the subscript, e.g., the first term is:

$$E_{q(h_1)q(h_2)} \log p(x|h_1,h_2) = \int_{h_1,h_2} q(h_1)q(h_2)\log p(x|h_1,h_2) \quad \text{Equation 9}$$

This term breaks into two consecutive integrations of log $p(x|h_1,h_2)$, which can often be evaluated in a computationally efficient manner, or even in a closed form. For example, for a Gaussian distribution on x whose mean is bilinear in $h_1$ and $h_2$, and has Gaussian $q(h_1)$ and $q(h_2)$, each of these integrations is over a quadratic function and thus can be computed in a closed form, while this would not be the case with a more general $q(h_1,h_2)$. Further, If $q(h_1)=q(h_1|\phi_1)$ and $q(h_2)=q(h_2|\phi_2)$ are parameterized by vectors $\phi_1$ and $\phi_2$, then performing these integrations will produce a functional form of the bound $B(\phi_1,\phi_2)$, which can then be optimized using an arbitrary optimization algorithm. In the bilinear example, the derivatives of the bound with respect to the variational parameters will produce bilinear equations, i.e., equations that are linear in each set of parameters $\phi_1$ and $\phi_2$, but that include products of the elements from the two sets. One way of solving such a system of equations is to iterate the following two steps until convergence:

$$\phi_1 \leftarrow \arg\max_{\phi_1} B(\phi_1,\phi_2) \quad \text{Equation 10}$$

$$\phi_2 \leftarrow \arg\max_{\phi_2} B(\phi_1,\phi_2) \quad \text{Equation 11}$$

In each step, one of the sets of parameters is kept fixed while other is chosen so as to optimize the bound. Thus in each step the bound is increased, which guarantees convergence to a local maximum. In this example, each step is very efficient as each step reduces to solving a set of linear equations, $$\frac{\partial B(\phi_1, \phi_2)}{\partial \phi_1} = 0.$$

However, being able to iteratively improve the bound in this fashion is also useful for modular design of complex models. Even when such an iterative block optimization is not the most efficient of all the options, it allows for building small graphical models as reusable modules, as described in Section 3.1.2.

3.1.2 Composing Complex Models from Simpler Modules:

In the example provided above in Section 3.1.1, it was shown that that when the posterior is factorized, the bound reduces to a sum of expectations. Under a simple condition, the groups of these expectations are equal to the bounds for submodels consisting of the grouped variables. Some expectations will be shared between submodels, and they serve as interfaces. However, within a set of variables without links to other submodels the bound can be studied independently from the rest of the model. As described below, this allows building more complex models from a number of independently designed modules.

Consider a simple probability model $p(x,h_1)=p(x|h_1)p(h_1)$ as illustrated by FIG. 5A. The bound on the likelihood of an observation for this probability model can be written as:

$$B(x) = E_{q(h_1)} \log p(x \mid h_1) + E_{q(h_1)} \frac{\log p(h_1)}{q(h_1)} \quad \text{Equation 12}$$

$$= E_{q(h_1)} \log p(x \mid h_1) + E_{q(h_1)} \log p(h_1) -$$

$$E_{q(h_1)} \log q(h_1)$$

A simple model of this form is usually either not expressive enough or the distribution over the hidden variables is too complex to model tractably without adding new hidden variables that provide structural rather than simply parametric constraints. More structure can be added into the model $p(h_1)$ by simply adding a new hidden variable $h_2$ as illustrated by FIG. 5B. With the addition of $h_2$, $p(h_1,h_2)=p(h_1|h_2)p(h_2)$ for which the bound form is known. Then the bound on log $p(x)$ for the new model represented by FIG. 5C, i.e., $p(x,h_1,h_2)=p(x|h_1)p(h_1|h_2)p(h_2)$ is given by:

$$B(x)=E_{q(h_1)}\log p(x|h_1)-E_{q(h_1)}\log q(h_1)+E_{q(h_1),q(h_2)}\log p(h_1|h_2)+E_{q(h_2)}\log p(h_2)-E_{q(h_2)}\log q(h_2) \quad \text{Equation 13}$$

Expectations $E_{q(h_1)} \log p(x|h_1)$ and $E_{q(h_1)} \log q(h_1)$ are the same as in the bound for the simpler model, while the other terms are inherited from the model $p(h_1, h_2)$.

However, while developing an inference algorithm for the model $p(h_1, h_2)=p(h_1|h_2)p(h_2)$, it would typically be assumed that $h_1$ is an observed variable generated from the hidden variable $h_2$. In that case, $h_1$ would have no posterior q, which is present in the above bound. If the probability model is meant to be used as a module in another network, an allowance should be made for "uncertain" measurements ($h_1$, in this case), where the uncertainty is given in the form of a probability distribution $q(h_1)$. Then, the divergence of the model and the measurement is bounded by:

$$E_{q(h_1)} \frac{\log p(h_1)}{q(h_1)} = E_{q(h_1)} \log \frac{\int_{h_2} p(h_1 \mid h_2)p(h_2)}{q(h_1)} \ge \quad \text{Equation 14}$$

$$E_{q(h_1),q(h_2)} \log \frac{p(h_1 \mid h_2)p(h_2)}{q(h_1)}$$

$$= E_{q(h_1),q(h_2)} \log p(h_1 \mid h_2) -$$

$$E_{q(h_1)} \log q(h_1) ++ E_{q(h_2)} \log p(h_2) -$$

$$E_{q(h_2)} \log q(h_2)$$

If the inference for modules $p(x|h_2)$ and $p(h_1|h_2)$ is derived in terms of the component expectations, Equations 12 and 14, the bound for the combined model can be obtained by simply replacing in Equation 12 the expectation over $$E_{q(h_1)} \log \frac{p(h_1)}{q(h_1)}$$

with the bound in Equation 14.

The form of the distribution $q(h_1)$ can be arbitrarily chosen, but it will have to have the same form in any model with which the module is used. If the module is to be applied directly to the observed data, $h_1$ in the example above, then $q(h_1)$ can be simply turned into a Dirac (impulse) function centered at the observation, which, for example, in a Gaussian q is achievable by setting the variances to zero.

Having explained the basic ideas relating to a simple model, the following discussion will apply these ideas to a more complex model that is broken into a number of modules as illustrated by FIG. 5D. In particular as illustrated by FIG. 5D, in each module, $M_1$, $M_2$, $M_3$, $M_4$, and $M_5$, three types of variables are considered: internal hidden variables, parent interface variables, and child interface variable. It is assumed that for the parent interface variables their modules will provide the probability distribution, and so the prior on these variables is not included in the design of an inference engine for the module. The internal variables are not shared with other modules. Finally the child interface variables are the generated variables from the module, i.e., the module's purpose is to define the probability distribution over the child variables which will be parents in other modules.

For example, in module $M_2$, the variable $h_6$ is the internal hidden variable, $h_5$ is a parent interface variable, and $h_3$ is the child interface variable. In general, module $M_m$ then contributes to the bound on the log likelihood of the model through an additive term:

$$S_m = E_{q(h_p)q(h_i)q(h_c)} \log \frac{p(h_c \mid h_i, h_p)p(h_i \mid h_p)}{q(h_i)q(h_c)} \quad \text{Equation 15}$$

The factorized posterior $q(h_p)q(h_i)q(h_c)$ assumes full factorization of the interface variables, but the internal variables need not be assumed independent from each other in the posterior. Thus, the contribution to the bound on the log likelihood of each of the modules, $M_1$, $M_2$, $M_3$, $M_4$, and $M_5$ of the model of FIG. 5D will take the following form:

$$S_1 = E_{q(h_3)q(h_4)q(h_1,h_2)q(x)} \log \frac{p(x \mid h_1, h_2, h_3, h_4)p(h_1)p(h_2)}{q(x)q(h_1)q(h_2)} \quad \text{Equation 16}$$

$$S_2 = E_{q(h_5)q(h_6)q(h_3)} \log \frac{p(h_3 \mid h_5, h_6)p(h_6)}{q(h_6)q(h_3)} \quad \text{Equation 17}$$

$$S_3 = E_{q(h_5)q(h_7)q(h_4)} \log \frac{p(h_4 \mid h_7, h_5)p(h_7)}{q(h_7)q(h_4)} \quad \text{Equation 18}$$

$$S_4 = E_{q(h_8)q(h_5)} \log \frac{p(h_5 \mid h_8)}{q(h_5)} \quad \text{Equation 19}$$

$$S_5 = E_{q(h_8)} \log \frac{p(h_8)}{q(h_8)} \quad \text{Equation 20}$$

If the variable x is observed, then $q(x)$ is a Dirac function, so it can be omitted in the term in Equation 16, and just evaluated for the observed x. The bound for the full model is computed by summing all terms under the assumption that the posterior is factored as $q(h_1)q(h_2)q(h_2)q(h_3)q(h_4)q(h_5)q(h_6)$ $q(h_7)q(h_8)$. If the observation x is uncertain, then the sum $S = \Sigma S_m$ is a measure of similarity between the model and the approximated distribution over the hidden variables, since, $$S = \sum S_m \quad \text{Equation 21}$$

$$= -D(p(x, \{h_k\}_{k=1}^{8}) \| q(x)q(h_1, h_2) \prod_{k=3}^{8} q(h_k)),$$

where $$B(x = a) = S \text{ when } q(x) = \delta(x - a) \quad \text{Equation 22}$$

Distance $D(p\|q)$ denotes the Kullback-Liebler distance or divergence of distributions p and q. Similarly, all terms $S_m$ define similarity or negative divergence between the distribution defined by the local q functions and the probability distribution of the module's variables conditioned on the parent interface variable (for example, see Equation 15). Assuming that $q(h_k) = q(h_k \mid \phi_k)$ is parameterized by parameters $\phi_k$ as before, the approximate inference in the model is performed by iteratively increasing the measure S with respect to one or more of the parameters $\phi_k$ until convergence.

The designer of each individual module provides the procedure for computing the appropriate expectations given the interface q functions. These are to be used in the joint optimization of the posterior over the interface variables. Typically, the form of the q function is chosen so that integrating out the hidden variables in Equation 15 can be done in a closed form and it results in a function $S(\phi_p, \phi_i, \phi_c)$ of a convenient form. For instance, for Gaussian q distributions, this function will often be quadratic in variational parameters. Then, each module can supply either this quadratic parametric cost, and/or its derivatives $\partial S/\partial \phi_p$, $\partial S/\partial \phi_i$, $\partial S/\partial \phi_c$, to the integration routine that adds costs from different modules that share a variable of interest and then optimizes the sum. For example, to improve the agreement of the model and the posterior $q(h_5)$ in FIG. 5D, it is necessary to optimize the sum $S_2+S_3+S_4$ with respect to $\phi_5$. This is accomplished by first fixing the rest of the posterior to whatever is the current best estimate, and integrating out the other hidden variables in $S_2$, $S_3$, and $S_4$ resulting in the parametric costs $S_2(\phi_5, \phi_6, \phi_3)$, $S_3(\phi_5, \phi_7, \phi_4)$, and $S_4(\phi_8, \phi_5)$, and then solving the equation:

$$\frac{\partial S_2}{\partial \phi_5} + \frac{\partial S_3}{\partial \phi_5} + \frac{\partial S_4}{\partial \phi_5} = 0 \quad \text{Equation 23}$$

Note that by keeping the posterior fixed, the values of the hidden variables are not tied to their MAP estimates (unless the appropriate q function is Dirac), but rather the parameters $\phi_3$, $\phi_4$, $\phi_6$, $\phi_7$, and $\phi_8$, are kept fixed, thereby fixing a distribution over the hidden variables $h_3$, $h_4$, $h_6$, $h_7$, and $h_8$. Each of the modules should be able to take appropriate $\phi$ parameters as the input and output the as $\partial S/\partial \phi_5$ as a function of $\phi_5$, which as noted above, will often be a linear function when q functions are Gaussian. The aforementioned integration routine can then find the solution to Equation 23.

Figure 6A:
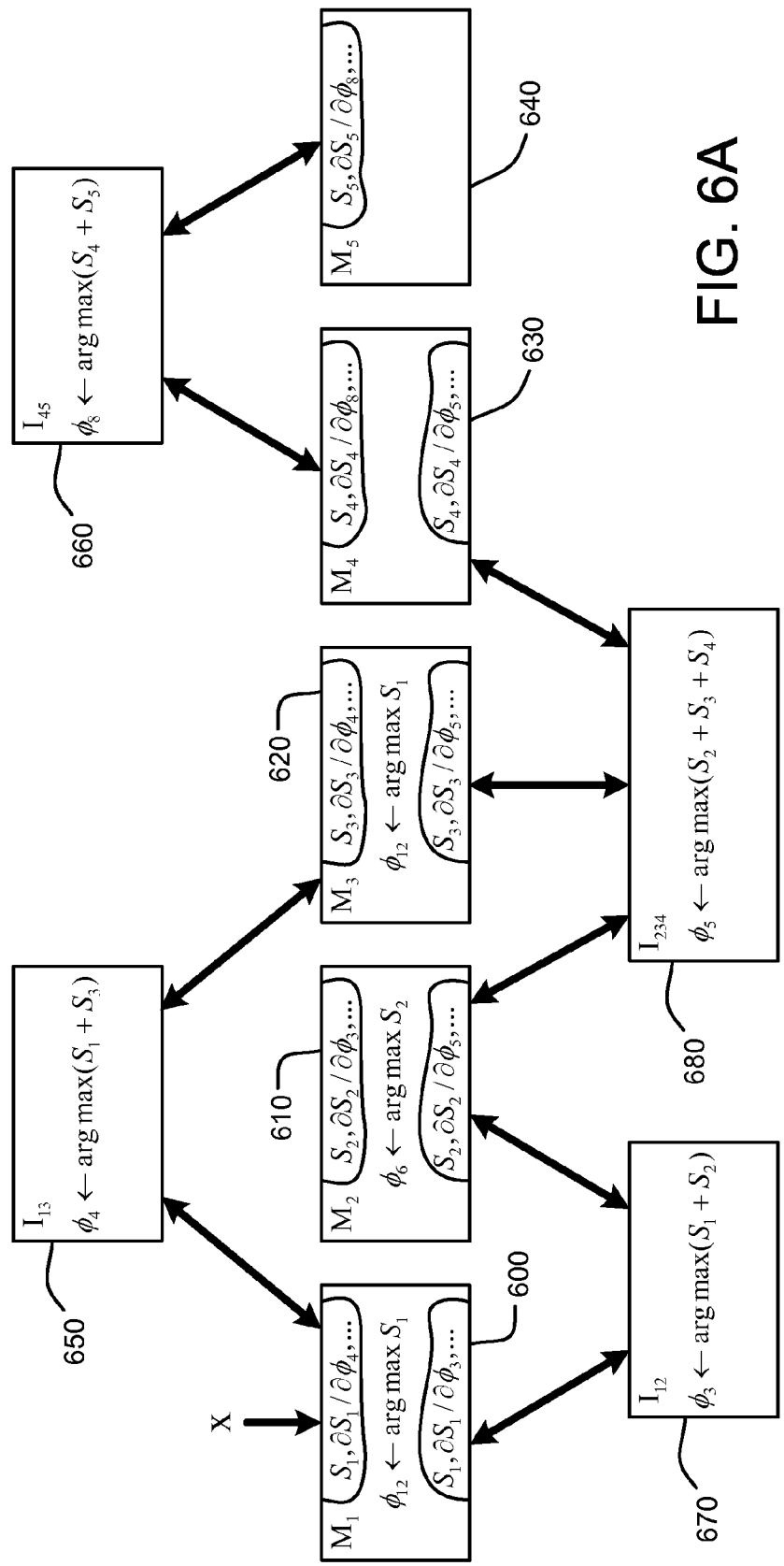
FIG. 6A illustrates one possible implementation of a modular variational inference engine for evaluating the model of FIG. 5D.

Alternatively, if the functional forms of $S_2(\phi_5, \phi_6, \phi_3)$, $S_3(\phi_5, \phi_7, \phi_4)$, and $S_4(\phi_8, \phi_5)$, are more complex, the integration routine employs a standard optimization algorithm and iteratively calls each of the modules to provide new values and derivatives of the local cost functions as illustrated by FIG. 6A. In particular, FIG. 6A illustrates one possible implementation of a modular variational inference engine for the model represented by FIG. 5D. Each module $M_m$, 600, 610, 620, 630 and 640, is designed independently and provides a routine for re-estimating its internal state, i.e., the variational parameters defining the distribution over the internal variables, and integration routines that provide evaluation of the module bound and its derivatives (usually just the first, but possibly including higher order derivatives).

The integration routines are called by integration modules denoted by I, 650, 660, 670 and 680, which employ standard optimization routines to update the variational parameters that determine the distribution over the interface variables. The variational parameters are updated iteratively in an arbitrary order until convergence. Further, in order to increase system performance, the updates that do not directly affect each other can be done in parallel. Each update increases the bound on the likelihood under the combined model, which guarantees convergence to a local maximum of the composite model's bound on the likelihood of the observation x.

If the variable for which the posterior is estimated is internal, as with $h_6$ as shown in FIG. 5D, then the optimization of its posterior can be done completely independently from other modules, 600, 610, 620, 630 and 640, using only the current estimate of the posterior over the parent and child interface variables. Note that the internal variables can have a complex structure and that the posterior over them need not be fully factored. In fact, if it is computationally tractable, it is possible to use a full posterior over these variables, which was emphasized, for example, with respect to FIG. 5D by including two hidden variables in module $M_1$ 600 as shown in FIG. 6A. These two hidden variables are independent in the generative model, but given the observation x they become coupled. Further, the modular framework does not prevent modeling of the full posterior $q(h_1, h_2)$, parameterized by a single set of parameters $\phi_{12}$.

In order to optimize all variational parameters, the whole process can be iterated by optimizing for one set of parameters at the time. For example, while solving for the parameters $\phi_5$, $\phi_{12}$ can also be independently solved, as $h_1$ and $h_2$ are outside the Markov blanket of $h_5$, and thus the change in their values does not directly effect the improvement of the bound with respect to the posterior $\phi_5$. After improving the bound with respect to the posterior parameters $\phi_5$, and $\phi_{12}$, the bound can further be improved by optimizing another set of parameters, for example, $\phi_6$, $\phi_7$, and $\phi_8$. After that, $\phi_3$ and $\phi_4$ can then be optimized by keeping the new values for the other parameters fixed. At this point, the sequence of optimizations is simply repeated until the bound B(x) can no longer be improved. Since the bound is increased in each step, this iterative procedure for performing inference is guaranteed to converge to a local maximum of the bound.

In an alternate embodiment, the optimization is accomplished in a different manner. In particular, instead of optimizing one set of parameters while keeping the others fixed, the bound is simply improved with respect to a set of parameters without necessarily finding the optimal values. The is justified based on an assumption that the surrounding posteriors are going to later change anyway, so it may be better to do whatever is the computationally cheapest way to significantly increase the bound and then move on to the other parts of the posterior to see what effect it caused, i.e., how can the bound further be improved with respect to other parameters. For example, this would make sense when the integration module for parameters $\phi_5$ needs to find the solution iteratively by gradient descent. Once the descent slows down, instead of continuing to the local maximum, the optimization can be stopped, the parameters fixed and the next set of optimizations invoked. In subsequent iterations, $M_5$ will be revisited and $\phi_5$ optimized with new variational parameters $\phi_3$, $\phi_4$, $\phi_6$, $\phi_7$, and $\phi_8$ in bound terms $S_2(\phi_5, \phi_6, \phi_3)$, $S_3(\phi_5, \phi_7, \phi_4)$, and $S_4(\phi_8, \phi_5)$, in Equation 23.

Referring back to FIG. 6A, this figure illustrates an exemplary software architecture in which the inference engine can be designed in a modular fashion. The individual modules $M_m$, 600, 610, 620, 630 and 640, can be designed independently from the application and the complex graphical module in which they will be used. To do that, the designer needs to expose interface functions that evaluate the local bound, or the level of agreement between the model and the local posterior, $S_m$, and possibly its derivatives with respect to the interface variables' variational parameters $\phi_k$. Also, for each interface variable, the designer needs to use the same posterior form that other modules will use for the same variable, but needs not know anything else about these modules. For instance, an appearance model could produce an image that will be used as a parent in some other module. If both modules use a Gaussian form of the posterior over this image, the appearance module does not care how this image will be used in other modules. Similarly, other modules do not care about the hidden structure of the model that produced the appearance.

The information that will be shared among the connecting modules will be expressed in the form of the variational parameters $\phi$ of the posterior over the interface variables, in this case the mean and variance of the image. Assuming that the interface posteriors are supplied, the modules $M_m$, 600, 610, 620, 630 and 640, can internally update the variational parameters that determine the distribution over the internal variables, e.g., parameters $\phi_{12}$ of the distribution $q(h_1, h_2)$. In FIG. 6A, in each module the interface functions are listed as well as the internal procedure that updates the internal state. If necessary, the modules can also allow reading of its state.

In order to integrate the modules, 600, 610, 620, 630 and 640, in the design of the inference engine for the full graphical model, the designer creates integration modules I, 650, 660, 670, and 680, each in charge of updating the posterior over the interface variable that is used in multiple modules. In the exemplary model provided by FIG. 5D, the integration modules are in charge of variables $h_3$, $h_4$, $h_5$ and $h_8$. The integration modules are indexed by the indices of the modules that they integrate. An integration module optimizes the variational parameters for the interface variables by calling the appropriate component modules $M_m$ that evaluate the local bounds and its derivatives. The sum of the local bounds is optimized in the integration module using a standard optimization technique, e.g., gradient descent or conjugate gradients. As mentioned above, the bound is often quadratic in variational parameters, and the optimization then reduces to solving a system of linear equations obtained directly by summing the derivatives supplied by the component modules $M_m$, 600, 610, 620, 630 and 640.

The integration module then sends the update back to the connected modules, which use this in evaluation of the bound for other integration modules and updating their own internal states. The updates can be performed in any order, iteratively visiting all modules several times until convergence. As noted previously, some updates can also be performed in parallel, as long as they do not affect each other directly. For example, the internal state $\phi_7$ of $M_3$ should not be updated while $I_{13}$ is updating the distribution over $h_4$, as $I_{13}$ is using the function $S_3$ in which the $h_7$ has been integrated out, i.e., $\phi_7$ is fixed. In one embodiment, an event handler is used to regulate this process, instead of using a programmed schedule.

In summary, one way to achieve modularity in designing complex models is to define interface distributions q and derive all the terms in the bound. Then, the inference in complex models can be achieved by adding the appropriate terms from various models to form the bound to be optimized. Since all of these terms are usually differentiable, it is also possible to add the derivatives over the appropriate expectations and equate the sum to zero in order to find the optimal variational parameters. The modularity extends to the learning process described below in Section 3.1.3, as well, since model parameter estimation is typically performed by optimizing a sum of the bounds for all observations. In addition, this approach enables independent building of components for a modular software platform, in which a single optimization engine is supplied with bound terms and their gradients for various components. Each component can be developed independently from others providing that the bound is computed for the expected likelihood under the appropriate interface distribution q.

3.1.3 Learning with Variational Inference:

Consider the bound on the log likelihood of a whole set of instances of an observed variable, $$X = \{x_n\}_{n=1}^N.$$

Assuming that all of these instances are independent but representative of a probability model $p(x,h|\psi)$ with hidden variables h and model parameters $\psi$, the joint likelihood of all observations is given by Equation 24 as:

$$p(\{x_n\}_{n=1}^N | \psi) = \prod_n p(x_n | \psi) = \prod_n \int_{h_n} p(x_n, h_n | \psi) \quad \text{Equation 24}$$

Thus, a bound can now be formed on the joint log likelihood as described in the previous section:

$$\log p(\{x_n\}_{n=1}^N) \geq \sum_n \int_{h_n} q(h_n, \phi_n) \log \frac{p(x_n, h_n | \psi)}{q(h_n | \phi_n)} = \quad \text{Equation 25}$$

$$\sum_n B_n(\psi, \phi_n) = B$$

where $B_n$ denotes the bound and $h_n$ the hidden variables for the n-th observation on the $x_n$.

This form is very convenient for optimization, since the terms $B_n$ can be optimized with respect to $\phi_n$ independently from each other. However, since $B_n$ depends both on the model parameters and the posterior parameters, it is usually not possible to solve for the parameters analytically, and an iterative procedure is necessary, e.g.:

1. Initialize parameters randomly

2. Keeping $\psi$ fixed, solve $$\frac{\partial B_n}{\partial \phi_n} = 0$$

for all n, where $$B_n = \sum_n \int_{h_n} q(h_n, \phi_n) \log \frac{p(x_n, h_n | \psi)}{q(h_n | \phi_n)}$$

3. Keeping $\phi_n$ fixed, solve $$\frac{\partial \Sigma_n B_n}{\partial \psi} = 0$$

4. Iterate

This reduces to a classical expectation maximization ("EM") algorithm when q has the form of the exact posterior and it becomes a variational version of EM if an approximate posterior is used. However, since the goal is to increase the bound in each step, so that at least local maximum is found, there are other similar algorithms, typically referred to as "generalized EM," or "GEM," which are useful in this case. For example, in one embodiment, instead of solving for all $\phi_n$ in the first expectation step (the "E-Step"), the focus is instead only on several data samples for which it is most likely that the inference should change after the change of the model parameters in the previous step. Similarly, in another embodiment, the parameters $\phi$ and $\psi$ are further broken down into subsets in an arbitrary fashion, and in each iteration only certain subsets are optimized.

Figure 6B:
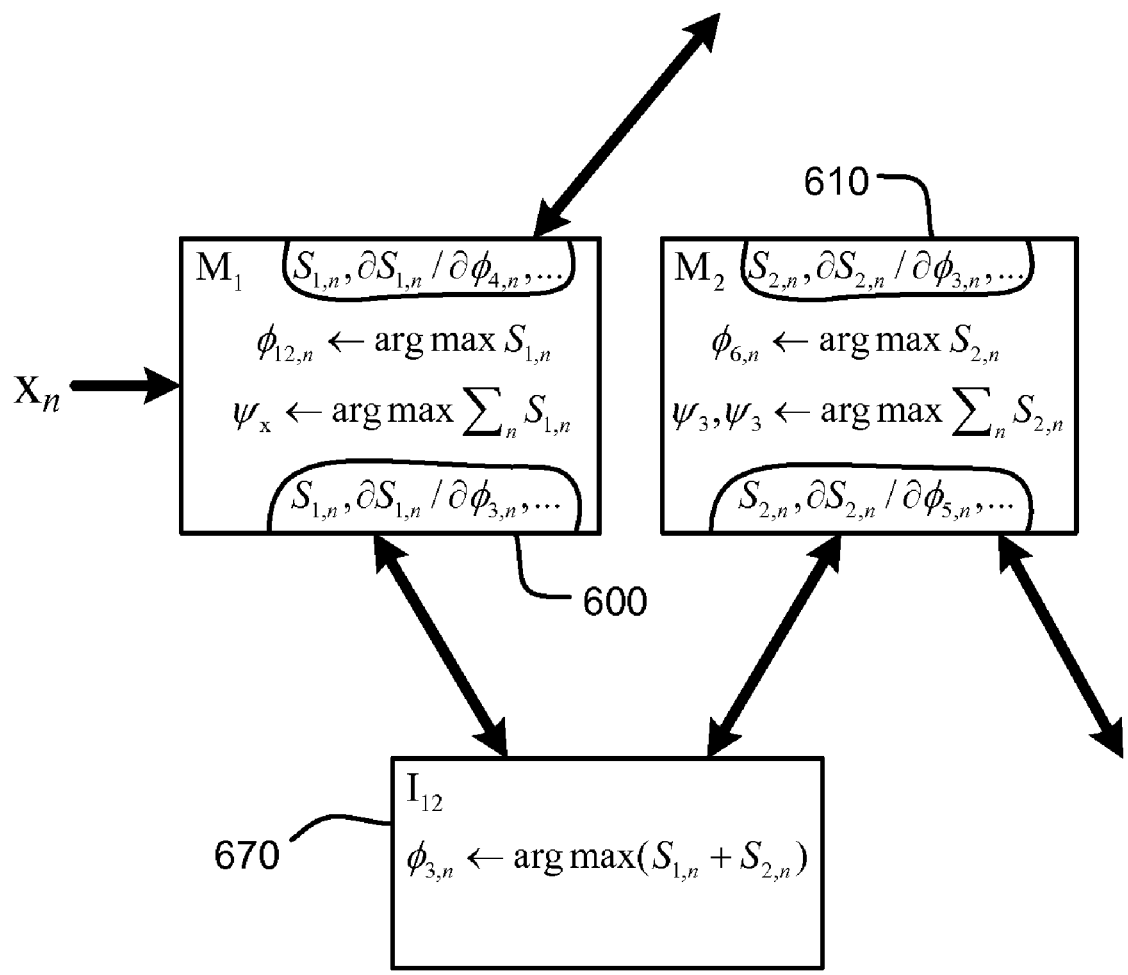
FIG. 6B illustrates a portion of the variational inference engine of FIG. 6A.

In one embodiment, parameter estimation is accomplished within the modular framework described in the previous section. FIG. 6B illustrates a part of the inference engine of FIG. 6A, with added routines for model parameter optimization. Model parameters are indexed by the variable whose conditional distribution they define, $p(h_k|pa(h_k)|\psi_k)$, for example, $p(h_3|h_5, h_6, \psi_6)$. Model parameters affect the bound terms for all observations x, so the data point index n is added to the quantities that change with it. The model parameter update routines depend only on the posterior over the variables within a component module, and thus the integration module does not need to perform any model parameter optimization. The integration module simply serves to communicate the posterior distributions for individual observations among the component modules.

The discussion provided in Section 3.1.2 regarding the flexibility in the regime of updates applies equally to the case of learning, which is best appreciated by erasing the difference between model parameters and model variables. Instead of implicitly assuming that the same model parameters apply to all instances of variables, while the variational parameters are different, it can be explicitly stated that the model parameters are hidden variables with Dirac distributions connected to all instances n of the appropriate random variables. For example, $\psi_k$ connects to all instances of $h_{k,n}$, so that the conditional distribution over $h_{k,n}$ is $p(h_{k,n}|pa(h_{k,n}), \psi_k)$, where $pa(h_k)$ denotes the parents of h.

Assuming the Dirac prior over parameters means that the optimization will produce a single value, rather than the distribution over parameters. When updating $\psi_k$, the variational parameters of the distribution over variables $h_k$ and $pa(h_k)$ need to be kept fixed, and can again be updated only once the model update is done. However, the rest of the variational parameters can be updated. Also, the sequence in which these updates are done is arbitrary. For instance, several iterations of updates that affect variational parameters can be done for one module, followed by updating the parameters for that module and then in a similar fashion updating another part of the network and so on. The whole process is then iterated until convergence.

For example, as noted above, FIG. 6B illustrates a part of the variational inference engine provided in FIG. 6A, with the additional functions for updating the model parameters. A sequence of data points (images, or image features) $x_n$ is processed as described in Section 3.1.2 to estimate the variational inference parameters $\phi_{12,n}$, $\phi_{3,n}$, etc., however, they are memorized by each module so that the model parameters $\psi$ can be updated by optimizing the sum of the local bounds for all data points. Again, the updates can be done in an arbitrary order that is guaranteed to always improve the total bound. One such regime is to perform inference by iterative message passing as described in Section 3.1.2, and then to update all model parameters, after which the whole procedure is repeated until convergence. Alternatively, local iterations are performed to improve both the local variational and model parameters after which other parts of the model are optimized. Again, the whole procedure needs to be iterated until no changes are detectable in any of the modules.

3.1.4 Determining the Number of Layers and Classes and the Dimensionality of the Factors As noted above, in one embodiment, the number of layers and classes are automatically determined. Generally, determining the number of layers and classes is a difficult problem. Existing techniques such as evidence-based Bayesian model selection and minimum description length (MDL) can be applied to the layered model described herein, to determine the number of layers, the number of classes and a dimensionality of factors in the classes.

For example, let P(X|L,C,D) be the likelihood of the data ($\{X=x_t\}$ for all observed instances t), given by training a model with L layers and C classes, and dimensionality D of the factors y. To apply Bayesian model selection, prior distributions on L, C and D are specified. Let this distribution be P(L,C,D). While any of a number of well known conventional techniques for computing or estimating prior distributions may be used, one suitable choice that favors having an average number of layers $B_1$, an average number of classes $B_2$, and an average dimensionality $B_3$ is a joint Poisson distribution, where:

$$P(L,C,D)=[B_1^L \exp(-B_1)/L!][B_2^C \exp(-B_2)/C!][B_3^D \exp(-B_3)/D!]$$

Given this Poisson distribution, the evidence is given by the posterior probability of L, C and D: P(L,C,D|X). Bayesian model selection is accomplished by picking L, C and D so that P(L,C,D|X) is maximized. With respect to L, C, and D, P(L,C,D) is proportional to P(L,C,D|X), so instead the modified evidence, P(L,C,D,X), is maximized, which is equal to:

$$E(L,C,D)=P(X|L,C,D)P(L,C,D)$$

In fact, computing P(X|L,C,D) is intractable in the layers model described above. However, the approximate algorithm described in this patent application can be used to bound P(X|L,C,D) by a function F(L,C,D), where:

$$F(L,C,D) \leq P(X|L,C,D)$$

Using F(L,C,D) as a surrogate for P(X|L,C,D), provides the following bound on the evidence:

$$F(L,C,D)P(L,C,D) \leq E(L,C,D)$$

Model selection then proceeds as follows. For L=1, C=1 and D=1, the bound F(L,C,D) is computed, and the prior distribution P(L,C,D) (e.g., a joint Poisson distribution) is used to compute the lower bound on E(L,C,D). Next, C is increased by one and the new bound on the evidence is computed. If the new bound is higher, the change to C is accepted. Next, L is increased by one and the new bound on the evidence is computed. Again, if the bound is higher, the change to L is accepted. Next, D is increased by one and the new bound on the evidence is computed. Again, if the bound is higher, the change to D is accepted. This procedure is repeated until changes to L, C, and D are no longer accepted. This search procedure can be carried out in any number of ways corresponding to established search techniques, including changing the order in which C, L and D are changed, and changing more than one variable at a time.

One issue with model selection is that local minima may be found during the above search process. To minimize the impact of local minima, the model parameters and variational parameters found during the previous model evaluation are used to initialize the parameters used for the next model evaluation. For example, when increasing the number of classes, C, from 1 to 2, the parameters of class 2 are initialized to be copies of the parameters from class 1. This ensures that both the likelihood P(X|L,C,D), and the likelihood bound F(L,C,D), can only improve.

3.2 Appearance Models:

This section addresses several modeling issues, including mixtures of Gaussians, factor analysis, texture models using Markov random fields ("MRF"), and general mixture models.

3.2.1 Mixtures of Gaussians (c→h):

Given a discrete variable c and a continuous variable s, the probability distribution of Equation 26 captures multiple object appearances of the form given in Equation 3:

$$p(s,c)=p(c)\mathcal{N}(s;\mu_c^s,\Phi_c^s) \qquad \text{Equation 26}$$

Under the uncertainty in s expressed by Gaussian $q(s)=\mathcal{N}(s;\eta^s,\Gamma^s)$, the bound consists of the following expectations:

$$E_{q(s)}\log p(s) \geq B(s) = \qquad \text{Equation 27}$$

$$E_{q(c,s)}\log p(s|c)+E_{q(c)}\log p(c)-E_{q(c)}\log q(c)$$

$$E_{q(c,s)}\log p(s|c) = -\frac{1}{2}\sum_c q(c)\left[\begin{array}{c}(\eta^s-\mu_c^s)'\Phi_c^{s-1}(\eta^s-\mu_c^s)' + \\ tr(\Phi_c^{s-1}\Gamma^s)+\log|2\pi\Phi_c^s|\end{array}\right]$$

$$E_{q(c)}\log q(c) = \sum_c q(c)\log q(c)$$

As described in the previous section, the above expectations are all that is needed to perform inference and learning. However, to illustrate the process, the following example for implementing the inference and learning rules is provided. In particular, optimizing the values q(c) for c=1, ..., C, subject only to $\Sigma_c q(c)=1$, it is observed that:

$$q(c) = \alpha N(x;\mu_c,\Phi_c)e^{-\frac{1}{2}tr(\Phi_c^{s-1}\Gamma^s)} \qquad \text{Equation 28}$$

where $\alpha$ is a normalization constant.

After finding class responsibilities $q(c_n)=p(c_n|x_n)$, the class responsibilities are kept fixed, and bound $B=\tau_n B(s_n)$ is improved with respect to model parameters:

$$\hat{\mu}_c = \frac{1}{NC}\sum_{n=1}^{N}\sum_{c=1}^{C} q_n(c)\eta_n^s \qquad \text{Equation 29}$$

-continued $$\hat{p}(c) = \frac{1}{N} \sum_{n=1}^{N} q_n(c)$$

$$\hat{\Phi}_c = \frac{1}{NC} \sum_{n=1}^{N} \sum_{c=1}^{C} q_n(c)[(\eta_n^s - \mu)(\eta_n^s - \mu)' + \Gamma_n^s]$$

Learning the model parameters θ is then achieved by iterating inference, Equations 28 and 29 until convergence. If the variables $s_n$ are directly observed, then set $\eta_n^s = s_n$ and set $\Gamma_n^s = 0$. However, if the model is used as a component of a complex model, then both q(s) and q(c) are optimized on the sum of Equation 27 and the expectations from the other modules.

3.2.2 Factor Analysis (y→s):

With respect to factor analysis, the joint distribution in this case is given by Equation 30 as:

$$p(s,y) = \mathcal{N}(y;0,I) \mathcal{N}(s;\mu^s + \Lambda^s y, \Phi^s) \qquad \text{Equation 30}$$

where y represents the coordinates of an image in a much lower D-dimensional subspace of the N-th dimensional space of all N-pixel images. The N×D loading matrix $\Lambda^s$ contains the major components of variability in s.

The exact posterior has a Gaussian form $q(y) = \mathcal{N}(y; \eta^y, \Gamma^y)$, and as in previous case, a Gaussian q(s) is used. The bound is given by Equation 31 as follows:

$$B = E_{q(y)q(s)}[\log p(s|y)] + E_{q(y)}[\log p(y)] - E_{q(y)}[\log q(y)] \qquad \text{Equation 31}$$

Since log p(s|y), log p(y), and log q(y) are quadratic in y and s, the above terms are easily derived as follows:

$$E_{q(y)}\log p(s|y) = -\frac{1}{2}(\eta^s - \mu^s - \Lambda^s \eta^y)'\Phi^{s-1}(\eta^s - \mu^s - \Lambda^s \eta^y) - \frac{1}{2}tr[\Phi^{s-1}\Lambda^s\Gamma^s\Lambda^{s'}] - \frac{1}{2}tr(\Phi^{s-1}\Gamma^s) - \frac{1}{2}\log|2\pi\Phi^s| \qquad \text{Equation 32}$$

$$E_{q(y)}\log p(y) = -\frac{1}{2}\left[\eta^{y'}\eta^y + tr(\Gamma^y) - \log(|2\pi I|)\right] \qquad \text{Equation 33}$$

$$E_{q(y)}\log q(y) = -\frac{1}{2}\log|2\pi e I| \qquad \text{Equation 34}$$

3.2.3 Texture Models: Markov Random Fields ("MRF"):

The two models illustrated above are capable of capturing the mean appearance of an object and the pixel variances for various parts of the object. In addition, factor analysis can also capture some global correlation among the pixels through the use of a factor loading matrix. However, there are other statistical appearance models that explore local pixel correlations, such as Markov random fields. It is also possible to build models on the sub-band decomposition of each image to better capture the properties of natural images. Any such models can be developed so that they can replace the appearance models described herein.

3.2.4 General Mixture Model (c→h):

In view of the preceding discussion, given any probability model p(h, $\theta^h$) with parameters $\theta^h$, a mixture model is created by allowing C sets of parameters indexed by c, used with probability p(c), $p(h,c) = p(c)p(h,\theta_c^h)$. The bound contains the following expectations:

$$B = E_{q(c),q(h)}[\log p(h, \theta_c^h)] + E_{q(c)}[\log p(c)] - E_{q(c)}[\log q(c)] \qquad \text{Equation 35}$$

$$E_{q(c),q(h)}[\log p(h, \theta_c^h)] = \sum_c q(c)E_{q(h)}[\log p(h, \theta_c^h)] \qquad \text{Equation 36}$$

$$E_{q(c)}[\log p(c)] = \sum_c q(c)[\log p(c)] \qquad \text{Equation 37}$$

$$-E_{q(c)}[\log q(c)] = -\sum_c q(c)[\log p(c)] \qquad \text{Equation 38}$$

The preceding discussion showed that a mixture of Gaussians is an example of this case, but just as simply, a factor analysis or a texture model can be mixed.

3.3 Transformation Models:

An object appearance z is often observed only through a transformed image s:

$$p(s,T,z) = p(T)p(z)p(s|z,T); p(s|z,T) = \mathcal{N}(s,Tz,\Phi^s) \qquad \text{Equation 39}$$

3.3.1 Discretizing a Transformation Manifold:

Thus, in this case, p(T) is a discrete distribution over the finite set of possible transformations T, for example, $\mathcal{T} = \{T|T = \text{Shift}(n), 0 \leq n \leq \text{ImageSize}\}$. A transformation operator T can be expressed in a matrix form where matrix T now indicates how the pixels from the input vector are linearly combined into pixels in the transformed image. In no way does this limit the modeled transformations to be linear. In fact, the coordinate change can be non-linear, as the linear nature of matrix computations only applies to the pixel interpolation. Using the modular design described above in Section 3.1.2, variational versions of existing models can easily be built as illustrated by the following equations:

$$B = E_{q(s,z,T)}\log p(s|z,T) + E_{q(T)}\log q(T) - E_{q(z)}\log q(z) + E_{q(T)}\log p(T) \qquad \text{Equation 40}$$

$$E_{q(s,z,T)}\log p(s|z,T) = -\frac{1}{2}\sum_T q(T)\begin{bmatrix}(\eta^s - T\eta^z)'\Phi^{s-1}(\eta^s - T\eta^z) + \\ tr(\Phi^{s-1}\Gamma^s) + \\ tr(\Phi^{s-1}T\Gamma^z T') + \\ \log|2\pi\Phi^s|\end{bmatrix} \qquad \text{Equation 41}$$

$$E_{q(z)}\log q(z) = -\frac{1}{2}\log|2\pi e \Gamma^z| \qquad \text{Equation 42}$$

$$E_{q(T)}\log p(T) = \sum_T q(T)\log p(T);$$

$$E_{q(T)}\log q(T) = \sum_T q(T)\log q(T); \qquad \text{Equation 43}$$

Note that T is treated as a discrete variable in q(T). All the terms in the bound are either linear or quadratic in variational the parameters $\eta^s$, $\Gamma^s$, q(T) and the model parameters $\mu^s$, $\Phi^s$. This makes optimization easy. In addition, in one embodiment, expressing the expectation over q(T) expressed in the form of correlations makes both learning and inference very fast.

3.3.2 Linearized Transformation Manifold:

Instead of specifying a number of possible transformations T, the transformation manifold is linearized by finding the derivatives of the image appearance with respect to the small transformations of interest and assuming that these derivatives span the local subspace of transformed images. As is known to those skilled in the art, this works for small transformations because natural images are relatively smooth, and this is extensively done in conventional vision processing, such as with conventional optical flow computation. In the general transformation model provided above, the added transformation subspace can be seen as adding structure into the matrix T through new hidden variables corresponding to the coordinates in the transformation manifold.

3.3.4 Transformation Estimation:

In one embodiment, conventional transformation estimation techniques are used for inference in generative models. Typically, this requires modeling the posterior over T as extreme unimodal distribution, i.e., $q(T)=\delta(T_{opt})$, so that the appropriate bound term reduces to a traditional quadratic cost optimized in the conventional motion-estimation literature as known to those skilled in the art.

3.4 Uniform Illumination Model:

A uniform illumination model is provided to model sprite and background illumination. For example, such modeling allows an illumination to be added, removed, or dynamically composited with sprites or background models in a sequence of images. In particular, in this illumination model, a Gaussian intrinsic appearance r is multiplied by a scalar illumination factor, also modeled by a Gaussian, and then corrupted with noise to form the adjusted image s. The joint probability distribution is given by Equation 44 as follows:

$$p(s,r,a) = \mathcal{N}(r;\mu^r,\Phi^r)\mathcal{N}(a;\mu^a,\sigma^{a^2})\mathcal{N}(s;ar,\Phi^s) \quad \text{Equation 44}$$

The exact inference is not possible in a closed form due to the nonlinearity. However, the posterior can be approximated with a product $q(r,a)=\mathcal{N}(r; \eta^r, \Gamma^r)q(a,\eta^a,\theta^{a^2})$ and derive the bound:

$$B(s) = E_{q(s,r,a)} \log p(s|a,r) + E_{q(r)} \log p(r) + E_{q(a)} \log p(a) - E_{q(r)} \log q(r) - E_{q(a)} \log q(a) \quad \text{Equation 45}$$

where only the first term needs to be derived, the rest are Gaussian cross-entropies.

$$E_{q(s,r,a)} \log p(s|a,r) = -\frac{1}{2}(\eta^s - \eta^a \eta^r)' \Phi^s (\eta^s - \eta^a \eta^r) - \frac{1}{2}tr[\Phi^{s^{-1}}\Gamma^s] - \frac{1}{2}tr[\vartheta^{a^2}\Phi^{s^{-1}}\Gamma^r] - \frac{1}{2}\log|2\pi\Phi^s| \quad \text{Equation 46}$$

Note that this model captures large changes in the overall level of ambient light received by an object. Further, a linear subspace model, such as that provided by Equation 30 can capture the directions of a point light source model. This observation is well known to those skilled in the art of eigen- or Fisher-faces, where the first several components usually model the illumination direction.

Figure 7A:
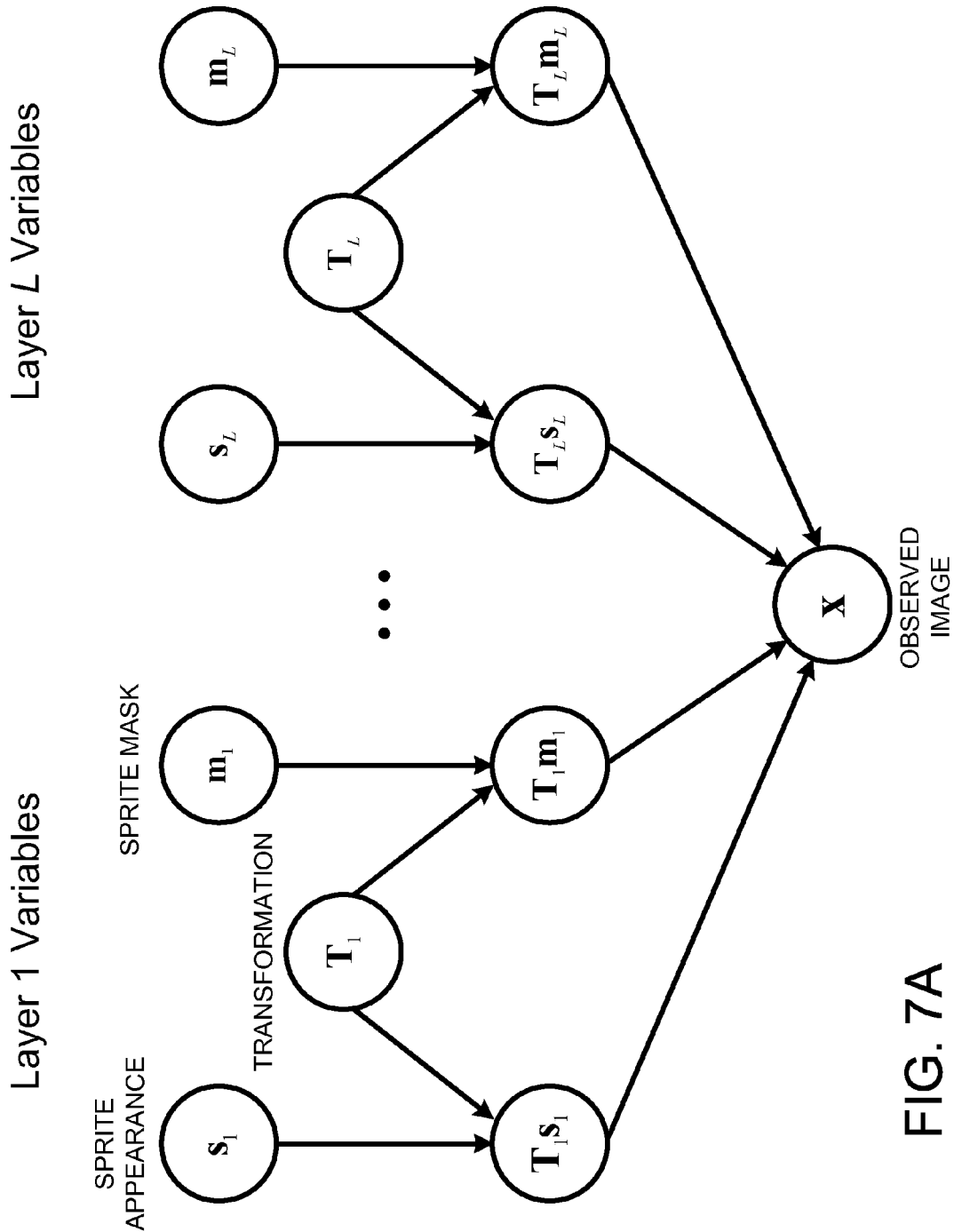
FIG. 7A illustrates a probabilistic layer structure for a generative model as described herein.
Figure 7B:
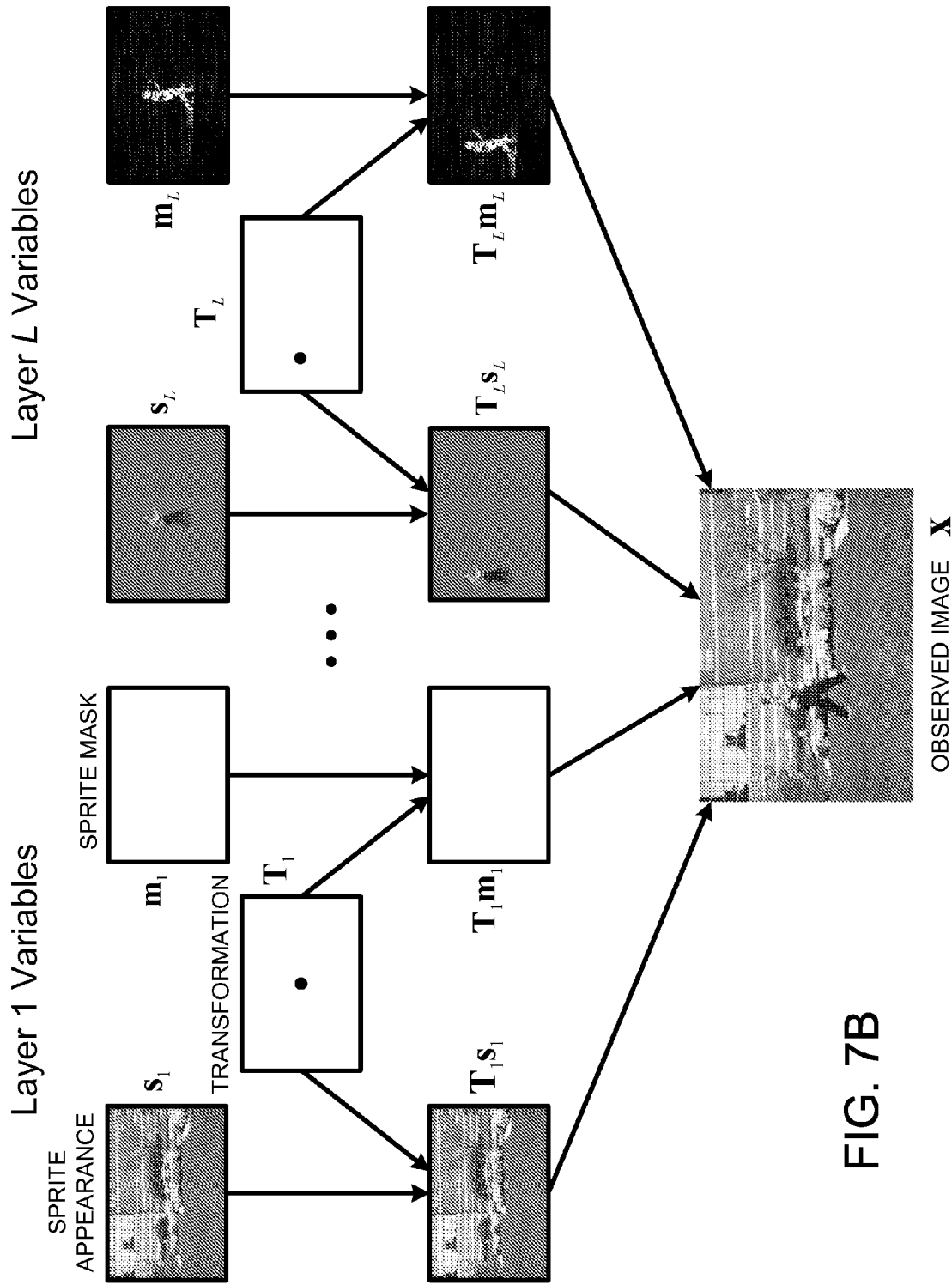
FIG. 7B illustrates a pictorial representation of the probabilistic layer structure of FIG. 7A.

3.5 Transparency and Occlusion Model:

This section describes probabilistic layer equations in which the observed image is composed of L sprites with unknown appearances $s_l$ and masks $m_l$. Each layer (l) is subject to a transformation $T_l$, and then the layers are combined so that the frontal layers occlude the background layers according to the following recursion:

$$z_L = T_L m_L * T_L s_L + T_L \bar{m}_L * \begin{pmatrix} T_{L-1} * T_{L-1} s_{L-1} + T_{L-1}\bar{m}_{L-1} * \\ \begin{pmatrix} T_{L-2} m_{L-2} * T_{L-2} s_{L-2} + \\ T_{L-2}\bar{m}_{L-2} * \ldots (T_1 m_1 * T_1 s_1) \end{pmatrix} \end{pmatrix} \quad \text{Equation 47}$$

where $z_L$ denotes the joint appearance of all L layers, $\bar{m}=1-m$, and any of the appearance models described in Section 3.2 can be used to model p(s) and p(m) Further, the "*" in Equation 47 represents a point-wise multiplication of the pixels. For example, if x and y both represent images, then z=x*y is an image in which $z_{i,j}=x_{i,j} \cdot y_{i,j}$, or, in other words, where $z_n = x_n \cdot y_n$, where n represents the $n^{th}$ pixel in the images. Note that the probabilistic structure represented by Equation 47 is also illustrated by FIG. 7A. Further, FIG. 7B provides a pictorial representation of the same probabilistic structure. Interestingly, it has been observed that while it is important to model a distribution p(m) instead of estimating a single mask for all frames in an image sequence, even very simple distribution functions, such as a Gaussian work well. However, this observation is further corrupted by sensor noise, $$p(x|\{s_l, m_l, T_l\}_{l=1}^{L}) = N(x; z_L, \Phi^x).$$

Thus, the full joint probability distribution function is given by Equation 48 as follows:

$$p(x|\{s_l, m_l, T_l\}_{l=1}^{L}) = p(x|\{s_l, m_l, T_l\}) \prod_l p(T_l)p(m_l)p(s_l) \quad \text{Equation 48}$$

It is useful to re-group the terms in z by gathering together all terms that involve layer i, such that:

$$z_L = f_i + v_i * ((T_i m_i) * (T_i s_i) * (T_i \bar{m}_i) * b_i \quad \text{Equation 49}$$

where $f_i = z_{i+1,L}$ is the composite foreground, $b_i = z_{1,i-1}$ is the composite background and $v_i$ is the visibility for the i-th layer, and:

$$z_{j,k} = \sum_{l=j}^{k} \left( \prod_{n=l+1}^{k} T_n \bar{m}_n \right) * (T_l m_l)(T_l s_l); \quad v_i = \sum_{l=i+1}^{L} T \bar{m}_l \quad \text{Equation 50}$$

Note that the following recursive formulas hold:

$$v_i = v_{i+1} * T_{i+1} m_{i+1} \quad \text{Equation 51}$$

$$f_i = f_{i+1} + v_{i+1} * T_{i+1}(m_{i+1} * s_{i+1}) \quad \text{Equation 52}$$

$$b_i = (T_{i-1}\bar{m}_{i-1}) * b_{i-1} + T_{i-1}(m_{i-1} * s_{i-1}) \quad \text{Equation 53}$$

Thus, having defined the model, a fully factorized posterior approximation can now be introduced as follows:

$$p(\{s_l, m_l, T_l\}_{l=1}^{L}) \approx \prod_l q(T_l)q(c_l)q(m_l)q(s_l) \quad \text{Equation 54}$$

$$q(m_l) = \mathcal{N}(m_l; \eta_l^m, \Gamma_l^m) \quad \text{Equation 55}$$

$$q(s_l) = \mathcal{N}(s_l; \mu_l^s, \Gamma_l^s) \quad \text{Equation 56}$$

Further, the bound on the likelihood p(x) decomposes as:

$$B(x) = E_{q(\{c_l, T_l, s_l, m_l\})} \log p(x|\{c_l, s_l, m_l, T_l\}) + \sum_l [E_{q(s_l), q(m_l)} \log p(s_l, m_l) + E_{q(T)} \log p(T) - [E_{q(s_l)} \log q(s_l) - E_{q(m_l)} \log q(m_l) - E_{q(T)} \log p(T)] \quad \text{Equation 57}$$

$$E_{q(s_l)}[\log q(s_l)] = -\frac{1}{2}\log|2\pi e \Gamma_l^s| \quad \text{Equation 58}$$

-continued $$E_{q(m_l)}[\log q(m_l)] = -\frac{1}{2}\log|2\pi e \Gamma_l^m| \quad \text{Equation 59}$$

Note that this factorized approximation modularizes the network. In other words, an arbitrary model $p(s_l, m_l)$ can now simply be plugged in as will shown in the following sections, so long as the module has been developed for the uncertain observations, s and m, according to the Gaussian q form used in the layer model. The layer model's core is in the first term of the bound:

$$E_{q(T_l, S_l, m_l)} \quad \text{Equation 60}$$

$$\left[-\frac{1}{2}x'\Phi^{x-1}x + x'\Phi^{x-1}z_L - \frac{1}{2}z_l'\Phi^{x-1}z_l - \frac{1}{2}\log|2\pi\Phi^x|\right] =$$

$$-\frac{1}{2}x'\Phi^{x-1}x + x'\Phi^{x-1}E[z_L] -$$

$$\frac{1}{2}E[z_l'\Phi^{x-1}z_l] - \frac{1}{2}\log|2\pi\Phi^x|,$$

where: $E[z_L] = E[f_i] + E[v_i] *$ $$((E[T_i]\eta_i^m) * (E[T_i]\eta_i^s) + (E[T_i]\eta_i^m) * E[b_i])$$

$$E[z_{j,k}] = \sum_{l=j}^{k}\left(\prod_{n=l+1}^{k}E[T_n]\eta_n^m\right) * (E[T_l]\eta_l^s) * (E[T_l]\eta_l^s), \quad \text{Equation 61}$$

$$v_{j,k} = \prod_{l=j}^{k}E[T_l]\eta_l^m$$

$$E[z_L'\Phi^{x-1}z_L] = \quad \text{Equation 62}$$

$$E[f_i'\Phi^{x-1}f_i] + +2(E(v_i * f_i) * \sigma_x^{-2})'ET_i(\eta_i^m * \eta_i^s) +$$

$$2(E(v_i * f_i) * b_i * \sigma_x^{-2})'ET_i\eta_i^m +$$

$$2(Ev_i^2 * Eb_i * \sigma_x^{-2})'ET_i(\eta_i^m \eta_i^m - \gamma_i^m) * \eta_i^s +$$

$$(Ev_i^2 * \sigma_x^{-2})'ET_i(\eta_i^{m2} + \gamma_i^m) * (\eta_i^{s2} + \gamma_i^s) +$$

$$(Ev_i^2 * Eb_i^2 * \sigma_x^{-2})'ET_i(\eta_i^{m2} + \gamma_i^m)$$

and $\sigma^{x^2} = \text{diag}(\Phi^x)$ is the vector of observed pixel variances, which can be chosen to be uniform. The recursive formulas, Equations 51 to 53, help compute the expectations:

$$E[f_i'\Phi^{x-1}f_i] = E[f_{i+1}'\Phi^{x-1}f_{i+1}] + + \quad \text{Equation 63}$$

$$2(E(v_{i+1} * f_{i+1}) * \sigma_x^{-2})'ET_{i+1}(\eta_{i+1}^m * \eta_{i+1}^s) +$$

$$(Ev_{i+1}^2 * \sigma_x^{-2})'ET_{i+1}(\eta_{i+1}^{m2} + \gamma_{i+1}^m) * (\eta_{i+1}^{s2} + \gamma_{i+1}^s)$$

$$E[v_i * f_i] = E[v_{i+1} * f_{i+1}] * ET_{i+1}\eta_{i+1}^m + \quad \text{Equation 64}$$

$$Ev_{i+1}^2 * ET_{i+1}(\eta_{i+1}^m \eta_{i+1}^m - \gamma_{i+1}^m) * \eta_{i+1}^s$$

$$Eb_1^2 = Eb_{i-1}^2 * ET_{i-1}(\overline{\eta_{i-1}^{m^2}} + \gamma_{i-1}^m) + ET_{i-1}(\eta_{i-1}^{m2} + \gamma_{i-1}^m)) * \quad \text{Equation 65}$$

$$(\eta_{i-1}^{s2} + \gamma_{i-1}^s) + + 2Eb_{i-1} * ET_{i-1}(\eta_{i-1}^m \overline{\eta_{i-1}^m} - \gamma_{i-1}^m)\eta_{i-1}^s$$

In the above equations, expectation (E) is taken with respect to the random variables that affect the term. For example, $Eb_i$ involves integration over the transformations, sprite appearances and sprite masks $\{T_l, m_l, s_l\}_{l=1}^{i-1}$, for all layers up to $i-1$. $ET \cdot = \Sigma_T q(T) \cdot$ and the optimization involving the terms of the form $ETx \cdot = \Sigma_T q(T)$ and $y'ETx \cdot = \Sigma_T q(T)$ are efficiently done using FFTs when T's are translations. To model rotation, scale and translation efficiently, the coordinate system is alternated between a Cartesian coordinate system, where shifts are dealt with efficiently, and a log-polar coordinate system, where rotation and scale become shift operations. All terms in the bound are at most quadratic in variational parameters $q(T)$, $\eta_l^s$, $\Gamma_l^s$, $\eta_l^m$, and $\Gamma_l^m$, making inference by bound optimization simple. The same observation is valid for model parameters.

3.6 Composite Models and Flexible Layers:

In accordance with the discussion provided in Section 3.1, in one embodiment, two or more of the above-described modules are combined into a complex generative model, with variational inference and learning, as described herein being used to fit the parameters. In another embodiment, the already derived pieces of likelihood bounds for various modules are combined into the bound on the likelihood of the composite model, which is illustrated in this section in the case of the flexible layer model.

Figure 8A:
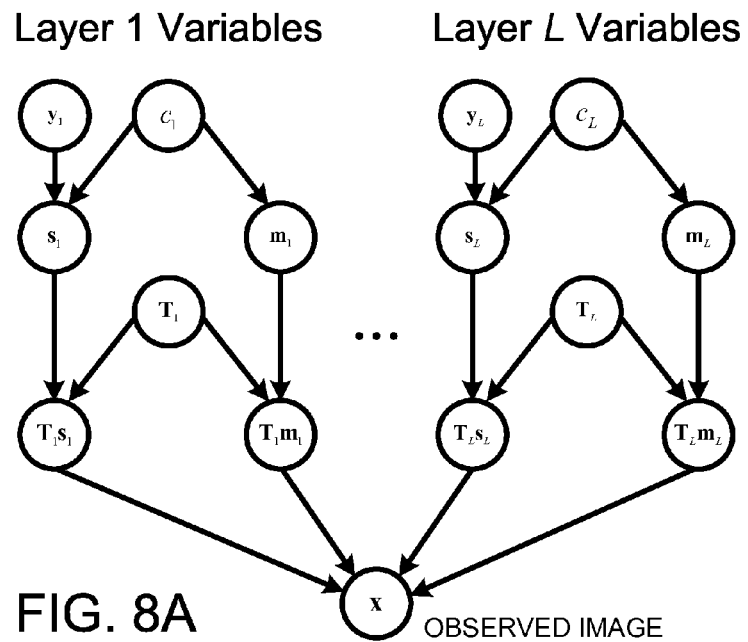
FIG. 8A illustrates an exemplary probabilistic structure of a generative model as described herein.

As illustrated by FIG. 8A, a generative model is comprised of a flexible layer model using object class variables $c_l$, appearance component strengths $y_l$, layer appearances $s_l$ (i.e., sprite appearances) and masks $m_l$. Further, composite models are created that are simply comprised of any combination of flexible layers, reflections as layers, or illuminated layers.

Figure 8B:
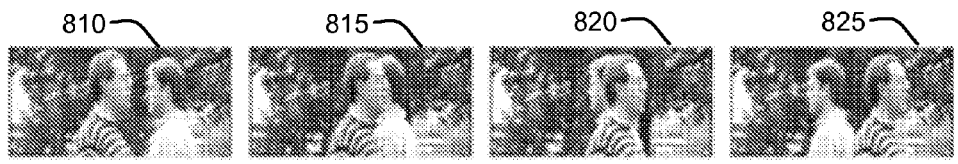
FIG. 8B illustrates a sampling of sequential image frames used to train the generative model illustrated by FIG. 8A.
Figure 8C:
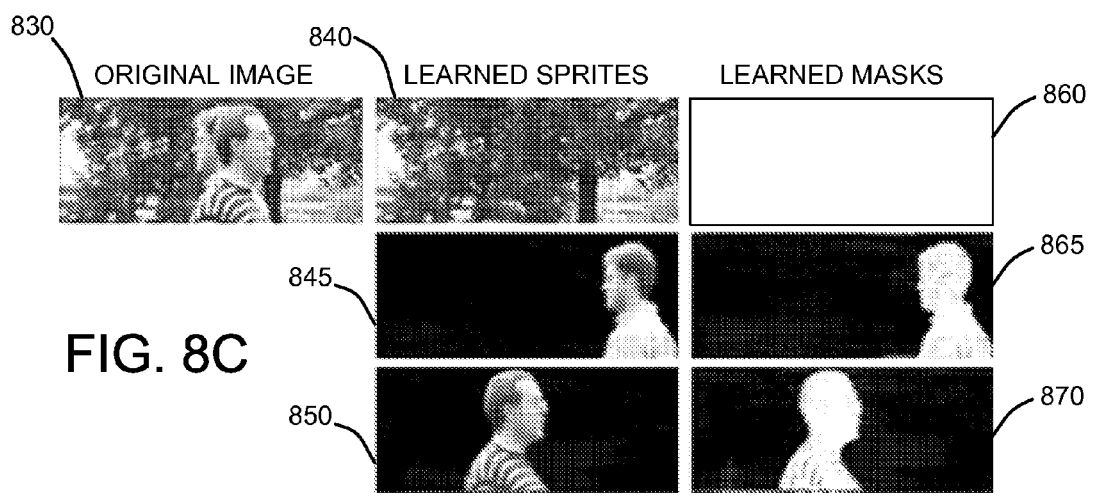
FIG. 8C illustrates the output of the generative model of FIG. 8A, given the sequential images sampled in FIG. 8B.

FIG. 8B illustrates a sampling of sequential image frames 810, 815, 820 and 825 used to train the generative model illustrated by FIG. 8A. In addition, FIG. 8C illustrates the output of the generative model, with the image in the upper left corner 830 representing one of the input images (810 through 825) of FIG. 8B, the images in the center column 840, 845, and 850 representing three learned sprites from the image sequence, i.e., each person 845 and 850 and a background 840, and the rightmost column illustrating the corresponding masks 860, 865 and 870 learned for each of the sprites in the center column.

As described above, each object is modeled in a layer $p(s_l, m_l)$ using the factor analysis and mixture models described in Section 3.2: $p(s_l, m_l, y_l, c_l) = p(m_l|c_l)p(s_l|y_l, c_l)p(y_l)p(c_l)$. Appearance is thus captured by a mixture of subspace models as provided by Equation 30, while the mask for a given class is modeled as a Gaussian $p(m_l|c_l) = \mathcal{N}(m_l; \mu_c^m, \Phi_c^m)$. Note that the same object model can be used in multiple layers, for example, modeling a flock of birds using single bird model. The complete joint distribution is given by Equation 66 as follows:

$$p(x, \{c_l, y_l, s_l, m_l, T_l\}_{l=1}^L) = \quad \text{Equation 66}$$

$$p(x, |\{s_l, m_l, T_l\})\prod_l p(m_l | c_l)p(s_l | y_l, c_l)p(y_l)p(c_l)p(T_l)$$

Under a fully factorized posterior $\pi q(T_l)q(c_l)q(y_l)q(m_l)q(s_l)$, the bound is:

$$B(x) = E\log p(x | \{s_l, m_l, T_l\}) + \quad \text{Equation 67}$$

$$\sum_l [E\log p(m_l | c_l) + E\log p(s_l | y_l, c_l) +$$

$$E\log p(y) + E\log p(c_l) + E\log p(T_l) + E\log q(m_l) +$$

$$E\log q(s_l) + E\log q(y_l) + E\log q(c_l) + E\log q(T_l)]$$

In fact, as suggested in the previous section, this bound can be obtained directly from the core layer model by replacing in Equation 57 $E_{q(s_l),q(m_l)} \log p(s_l, m_l)$ with the bound for the model $p(s_l, m_l, y_l, c_l)$. This is equivalent to the example in Section 3.1.2, where $h_1 = \{m_l, s_l, T_l\}_1^L$ and $h_2 = \{y_l, c_l\}_1^L$.

The model $p(s_l, m_l, y_l, c_l)$ is itself modular and all the terms in the bound, as illustrated by Equation 67, have been derived in the previous sections. The core layer term $E \log p(x|\{s_l, m_l,$ $T_l$}) was derived in a form that allows easy optimization of an i-th layer in Equation 46 and subsequent equations.

E log $p(s_l|y_l, c_l)$ is the first term in the Gaussian mixture bound in Equation 27, $$E\log p(m_l \mid c_l) = -\frac{1}{2}\sum_{c_l} q(c_l)$$

$$\left[(\eta_l^m - \mu_{cl}^m)'\Phi_c^{s^{-1}}(\eta_l^m - \mu_{cl}^m)' + tr(\Phi_c^{m^{-1}}\Gamma_l^m) + \log|2\pi\Phi_{cl}^m|\right]$$

Equation 68

E log $p(s_l|y_l,c_l)$ is a mixed version (Equation 35) of the factor analysis appearance term (Equation 32). The rest of the terms are given in Equations 33, 34, 36, 37, 43, 58, and 59.

For a set of images, or video frames $\{x_n\}$, the sum bound, $B=\Sigma_n B(x_n)$, can be optimized using GEM to jointly perform inference and object discovery. In the partial inference process, i.e., the generalized E-Step, for each observed frame $x_n$, some or all of the variational parameters are improved. These parameters are the aforementioned class responsibilities $q(c_l)$, the expected (e.g., the most likely) appearance $\eta_l^s$ of layer l, the diagonal covariance matrix $\Gamma_l^s$, the most likely shape (or the transparency map) $\eta_l^m$ of the object in layer l, the variances $\Gamma_l^m$, and the discrete distribution of the position/transformation $q(T_l)$.

The generalized M-Step will improve the bound keeping all the variational parameters fixed and varying only the model parameters, which include the prior p(c), mean appearances $\mu_c^s$ of the C classes, vectors $\Lambda_c^s$ spanning the C appearance subspaces, the uncertainties $\Phi_c^s$, and the means $\mu_c^m$ and variances $\Phi_c^m$ of the masks (shapes) of the C objects. The prior p(T) is kept uniform.

While not a requirement of the generative model, the recursive equations detailed in the previous sections make it computationally efficient to go through layers in order, alternating front to back and back to front passes. Other orders are possible, but less computationally efficient.

For L=1, the flexible model becomes a variational version of a transformation invariant model. However, by layering the model, L>1, the generative model approach described herein is capable of addressing multiple occluding objects in the scene.

For example, the versatility of the model is illustrated in FIG. 9A through 9G, where varying only the number of layers L, the number of classes C, and the dimensionality of the subspace (y) representation, D, the model becomes suitable to a variety of vision tasks, such as, for example, removal of electronics-induced distortions; removal of noise and background clutter; centering of objects represented by sprites; object tracking; learning slant-invariant linear subspace models of handwritten characters or digits for character or digit recognition; object removal or insertion into an image or image sequence in either the image foreground or background; camera/image stabilization; automatic creation of a panoramic version of a video or image sequence which is built from a dynamic scene; and learning dimensional lighting representations of an object appearing at different positions within a sequence of images. Note that these examples are discussed in further detail with respect to FIG. 9A through FIG. 9G below in Section 7.

Figure 10:
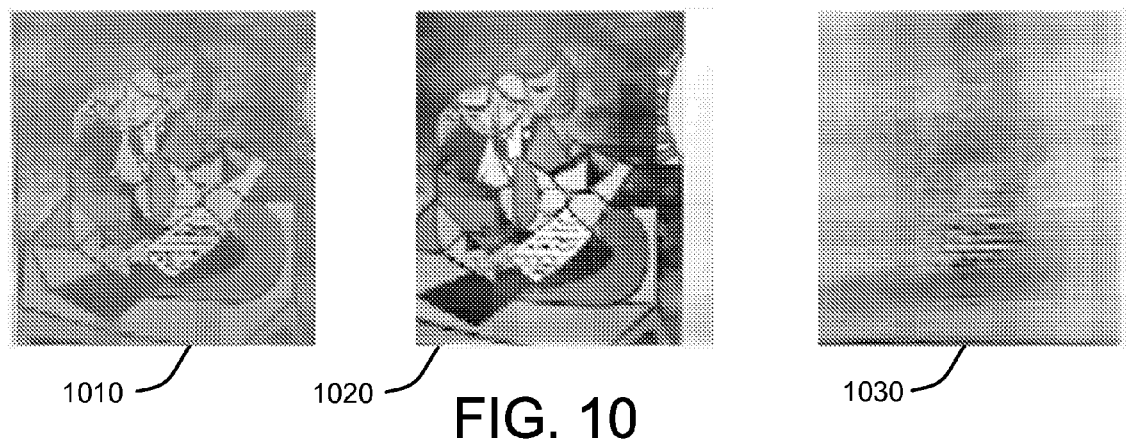
FIG. 10 illustrates that a flexible layer model is able to capture glass or other surface reflections as additive layers.
Figure 11:
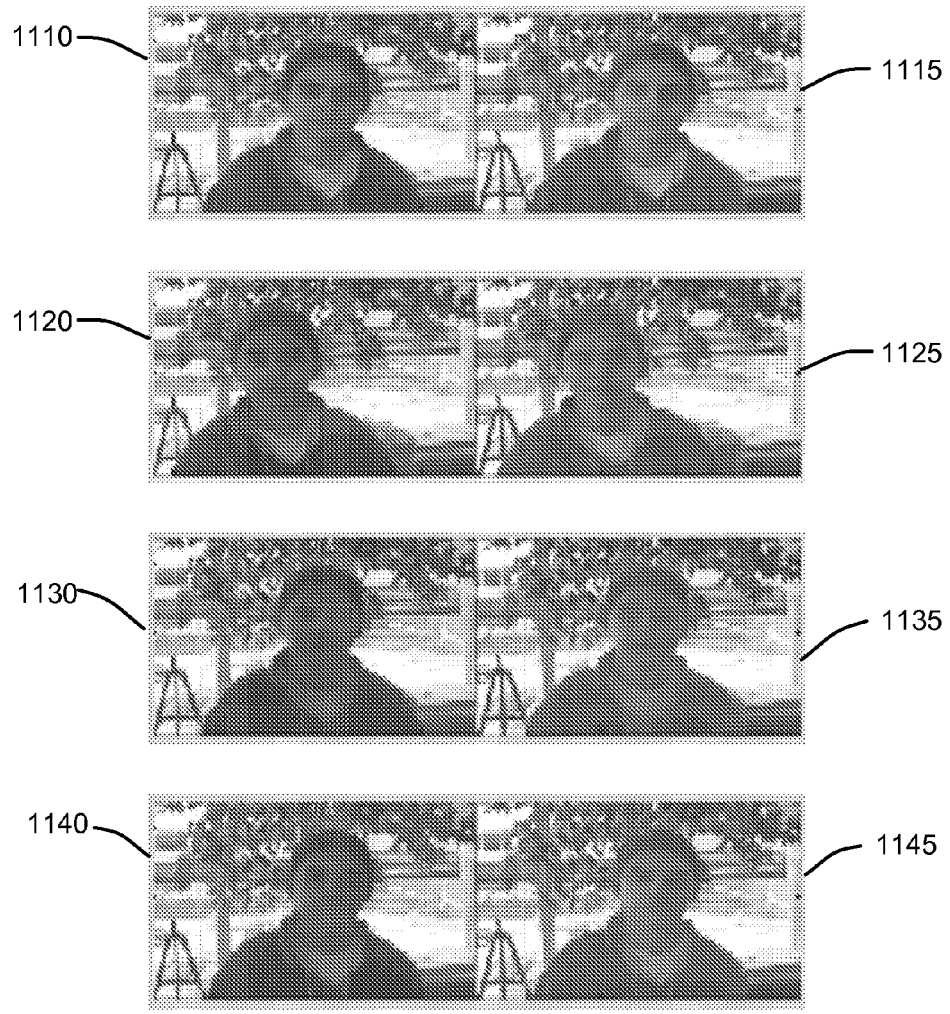
FIG. 11 illustrates illumination equalization of a sequence of images.

In still another embodiment, as illustrated by FIG. 10, reflections are easily modeled by layers of sprites by allowing the sprite masks to model partial transparencies, as described above. Further, as illustrated by FIG. 11, these layers are also used to model illumination, either globally, or by one or more point sources. Note that these examples are discussed in further detail with respect to FIG. 10 and FIG. 11, respectively, below in Section 7.

4.0 Flexible Sprites from a Generative Model:

The preceding discussion, as presented in Section 3, has described the underlying probabilistic structure of the generative model, along with a sampling of exemplary uses of the generative model. The preceding discussion also outlined a general algorithm for learning a model consisting of flexible sprites, and as such served to indicate the feasibility of the model and illustrate that there are a variety of optimization algorithms from the broad family of variational methods that can be used in the conjunction with this model and that would result in joint object recognition, segmentation and tracking. The following section provides a an example of a particular computationally efficient optimization algorithm that iteratively solves for model parameters, including sprite appearance and shape parameters, and performs joint tracking, segmentation, and classification of sprites.

4.1 Sprites in Motion:

As noted above, "flexible sprites" are dynamic from frame to frame.

However, in any particular frame, sprites are static. Consequently, the term "rigid sprite" is used to refer to a particular instance of a flexible sprite. The imaging model described herein composes particular instances of such sprites.

In particular, a rigid sprite is described by a raster-scan vector of grayscale pixel intensities s and a raster-scan vector of mask values m, or by additional color vectors in the color case. When the sprites are learned from a video or other image sequence, the size of the object is not typically known in advance. To account for arbitrary object size, the images corresponding to these vectors are the same size as the input image. A mask value of 1 indicates the pixel belongs to the sprite, whereas a mask value of 0 indicates the pixel does not belong to the sprite.

A vector of observed pixel intensities x is explained by combining a vector of background pixel intensities b, which may contain other sprites, as described in Section 3.2, with the instantiated sprite:

$$x = m*s + \overline{m}*b + \text{noise} \qquad \text{Equation 69}$$

where "*" indicates element-wise product, and $$\overline{m} = 1 - m \qquad \text{Equation 70}$$

is the inverse mask. The first term in Equation 69, m*s, serves to erase sprite pixels that are transparent, while the second term, $\overline{m}$*b, erases background pixels that are occluded by the sprite. The third term accounts for sensor noise, etc. In fact, the mask values are real numbers in [0, 1], to account for semitransparent "objects", such as, for example, windows and shadows. This basic model is extended to allow the sprite to undergo simple geometric transformations such as translation, rotation, etc., so that the sprite can appear with different geometry in different frames of the video sequence.

The transformations are represented by a discrete set of possible transformations. For example, single pixel translations in an M×N image, with wraparound, are represented using MN possible shifts. In particular, T is a transformation operator from the discrete set of transformation operators. For translations in an M×N image, T can take on M×N values. The transformed version of s is simply written as:

$$Ts \qquad \text{Equation 71}$$

Consequently, T can be thought of as a permutation matrix that rearranges the pixels in vector s. Notice that T is also a random variable.

In contrast to Equation 69, both the sprite mask and the sprite appearance map are transformed before being composed with the background:

$$x = Tm * Ts + \overline{Tm} * b + \text{noise} \qquad \text{Equation 72}$$

Figure 12:
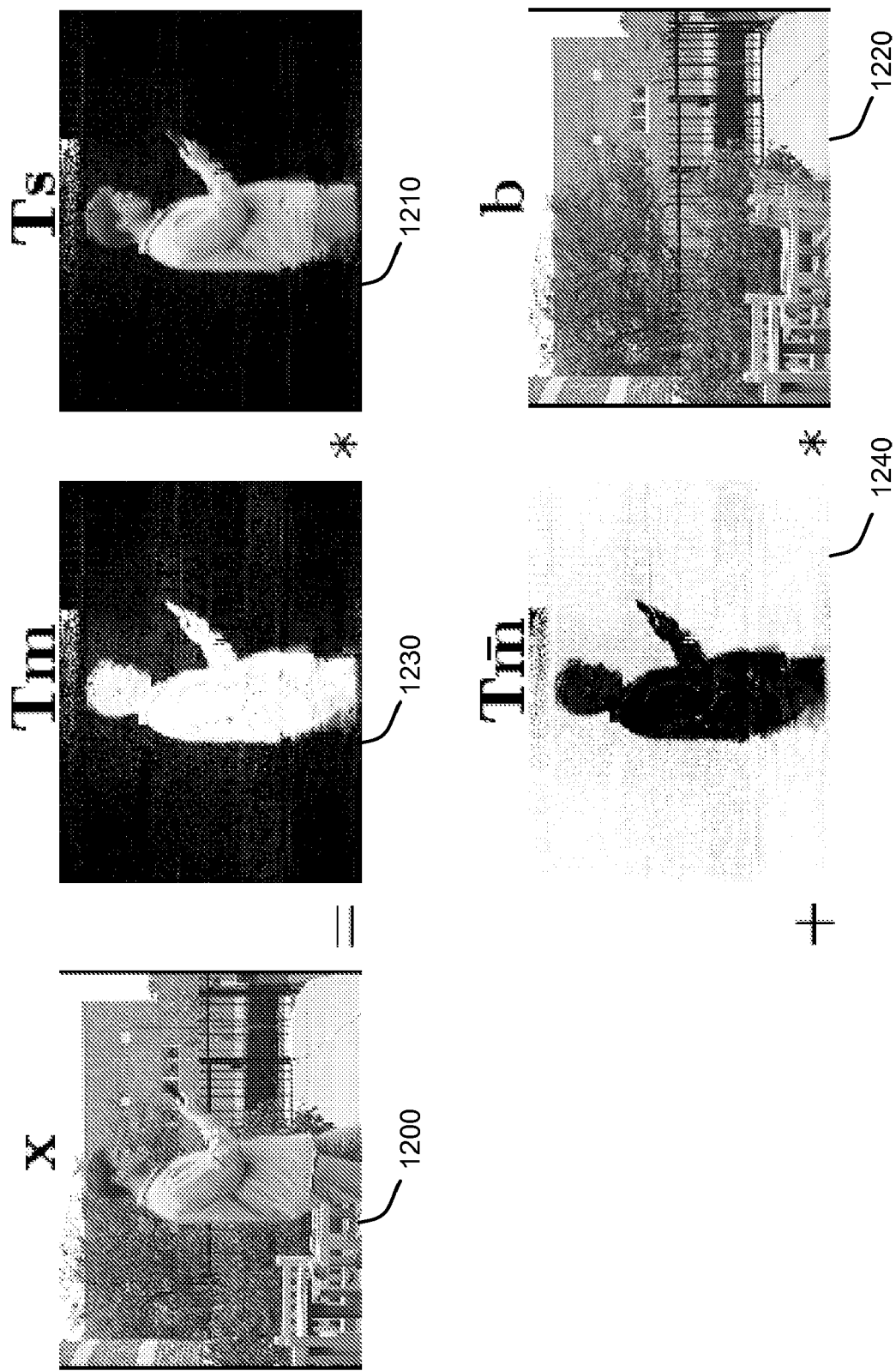
FIG. 12 illustrates how an image is formed or "reconstructed" by composing a translated sprite appearance map with a background appearance map, and using a translated mask and its inverse.

Equation 72 is graphically illustrated by FIG. 12. In particular, as illustrated by FIG. 12 an image 1200 is formed by composing a translated sprite appearance map 1210 with a background appearance map 1220, and using a translated mask 1230 and its inverse 1240, as given by Equation 72. These maps were learned in an unsupervised fashion from a sequence a frames like x, as described in Section 3.4.

As noted above, the transformation preserves the number of pixels, i.e., Ts is the same size as s. To allow the sprite to overlap with the boundary of the input image without wrapping around to the other side, a "window layer" is used. In general, this window layer allows the background model to be "filled in" by padding the borders of the original image sequence with zeros and using a three-layer model where a front layer acts as a window that lets everything in the central region through. The concept of a window layer is described in more detail with respect to a working embodiment described in Section 7.

4.2 Layers of Sprites:

As discussed in greater detail above in Section 3.5, multiple, occluding objects are modeled using layers of sprites. The layers are combined using the sprite masks, similar to the manner described above. In particular, layers are indexed by $l = 1, \ldots, L$, with layer L being the layer that is closest to the camera and layer 1 being the background layer. $s_l$ and $m_l$ are the sprite appearance map and sprite mask at layer l. $T_l$ is the transformation at layer l.

Extending Equation 72 by recursively replacing the background b with the output of the previous layer gives:

$$x = T_L m_L * T_L s_L + T_L \overline{m}_L * (T_{L-1} m_{L-1} * T_{L-1} s_{L-1} + \qquad \text{Equation 73}$$
$$T_{L-1} \overline{m}_{L-1} * (T_{L-2} m_{L-2} * T_{L-2} s_{L-2} + T_{L-2} \overline{m}_{L-2} *$$
$$\ldots (T_1 m_1 * T_1 s_1 + T_1 \overline{m}_1 * b))) + \text{noise}$$

Figure 13:
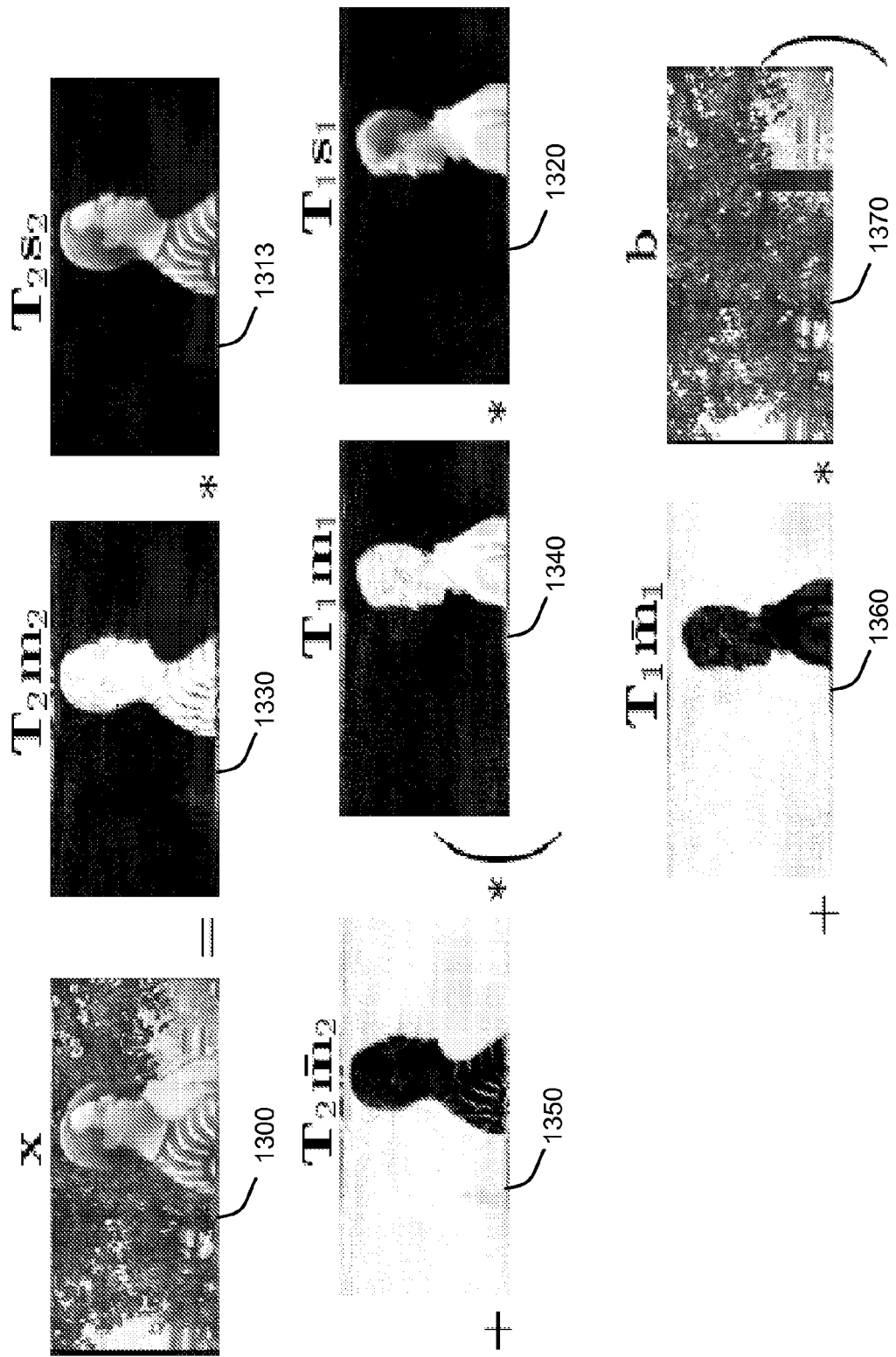
FIG. 13 illustrates how, given two moving layers of sprites, an image is formed by composing the layers of translated sprite appearance maps using translated sprite masks.

Equation 73 is graphically illustrated by FIG. 13. In particular, as illustrated by FIG. 13, given two moving layers of sprites, an image 1300 is formed by composing the layers of translated sprite appearance maps 1310 and 1320 using translated sprite masks 1330 and 1340, and their inverses 1350 and 1360, respectively, with a background appearance map 1370 as given by Equation 73.

The recursive expression in Equation 73 can be written more concisely by multiplying out the terms. In particular, expressing the composition in FIG. 13 as a sum of 3 groups of products:

$$x = \sum_{l=1}^{L} \left( \left( \prod_{i=l+1}^{L} T_i \overline{m}_i \right) * T_l m_l * T_l s_l \right) + \text{noise} \qquad \text{Equation 74}$$

The observed image is constructed by adding together the sprites in all layers, masking each sprite by the product of the inverse masks for the sprites in later layers. For notational simplicity, it is assumed that the background is modeled in layer 1; however, the background can be modeled in any desired layer.

Assuming that sensor noise is zero-mean Gaussian, the observation likelihood for the sprite appearances, sprite masks, and sprite transformations, $\{s_l, m_l, T_l\}$ is given by Equation 75:

$$p(x \mid \{s_l, m_l, T_l\}) = \mathcal{N}\left(x; \sum_{l=1}^{L} \left( \left( \prod_{i=l+1}^{L} T_i \overline{m}_i \right) * T_l m_l * T_l s_l \right), \beta \right) \qquad \text{Equation 75}$$

where $\beta$ is a vector containing the pixel noise variances, and $\mathcal{N}(\cdot)$ is the probability density function for the normal distribution.

4.3 Flexible Sprites:

As noted above, because the appearance of each sprite may vary from frame to frame, a probabilistic representation called a "flexible sprite" is used to model objects in the image frames. Flexible sprites may have different instantiations from frame to frame, but all of these instantiations are typical under the probability model that defines the flexible sprite. Further, to allow for multiple objects, a mixture of Gaussians is used for the prior. The prior distribution over the appearance and mask for a sprite class c is given by Equation 76 as:

$$p(s, m \mid c) = \mathcal{N}(s; \mu_c, \Phi_c) \mathcal{N}(m; \eta_c, \psi_c) \qquad \text{Equation 76}$$

where $\mu_c$ and $\eta_c$ are vectors containing the mean appearance map and mean mask for object c, and $\phi_c$ and $\psi_c$ are vectors containing the pixel variances in the appearance map and mask for object c. Note that in this section, for purposes of explanation and understanding, the notation introduced in Section 3.5 has been changed to avoid using too many subscripts and superscripts. Further, different letters have been introduced in this discussion for model means and variances of masks and appearances.

Assuming the sprite class, sprite transformation, sprite appearance map and sprite mask at layer l are chosen independently of the sprites in other layers, the joint distribution is given by Equation 77 as:

$$p(x \mid \{c_l, T_l, s_l, m_l\}) = \qquad \text{Equation 77}$$
$$\mathcal{N}\left(x; \sum_{l=1}^{L} \left( \left( \prod_{i=l+1}^{L} T_i \overline{m}_i \right) * T_l m_l * T_l s_l \right), \beta \right) \cdot$$
$$\prod_{l=1}^{L} (\mathcal{N}(s_l; \mu_{cl}, \phi_{cl}) \mathcal{N}(m_l; \eta_{cl}, \psi_{cl}) \pi_{cl} \rho_{T_l})$$

where $\pi_c$ is the prior probability p(c) of sprite class c, and $\rho_T$ is the prior probability of transformation T. The $\rho_T$'s may be learned, but in one embodiment, they are fixed to uniform values.

4.4 Inference and Learning:

Given the number of sprites C, the number of layers L, and the video sequence $x^{(1)} \ldots x^{(N)}$, probabilistic inference and learning are used to compute a single set of model parameters that represent the entire video sequence. These parameters include the prior probabilities of the sprite classes, $\pi_1, \ldots \pi_C$; the means and variances of the sprite appearance maps, $\mu_1, \ldots, \mu_C$ and $\phi_1, \ldots \phi_C$; the means and variances of the sprite masks, $\eta_1, \ldots \eta_C$ and $\psi_1, \ldots \psi_C$; and the observation noise variances $\beta$.

These parameters are initialized using the means and variances of the pixels in the video sequence. Then, a generalized expectation-maximization ("EM") algorithm is used to learn the flexible sprite models, so that the video or image sequence has high marginal probability under the model. As noted above, generalized expectation-maximization algorithms are well known to those skilled in the art.

In the expectation step (the "E-Step"), the model parameters are assumed to be correct, and for each input image, probabilistic inference is used to fill in the values of the unobserved variables, i.e., the sprite class, sprite transformation, sprite appearance and sprite mask at each layer. In the maximization step (the "M-Step"), the model parameters are adjusted to increase the joint probability of the observations and the filled in unobserved variables. These two steps are repeated until convergence.

In fact, for each input image, the E-Step fills in the unobserved variables with a distribution over plausible configurations (the posterior distribution), and not just over individual configurations. This is an important aspect of the EM algorithm. Initially, the parameters are a very poor representation of the data. So, any single configuration of the unobserved variables (e.g., the most probable configuration under the posterior) will very likely be the wrong configuration.

An exact EM algorithm uses the exact posterior in the E-Step and maximizes the joint probability with respect to the model parameters in the M-Step. The exact EM algorithm consistently increases the marginal probability of the data, performing maximum likelihood estimation. However, the joint probability cannot always be directly maximized. Consequently, a generalized expectation-maximization ("GEM") algorithm uses the exact posterior in the E-Step, but just partially maximizes the joint probability in the M-Step, e.g., using a nonlinear optimizer. The GEM algorithm also consistently increases the marginal probability of the data.

More generally, not only is an exact M-Step not possible, but computing the exact posterior is intractable. The generalized EM algorithm permits the use of an approximation to the exact posterior in the E-Step, and a partial optimization in the M-Step. The generalized EM algorithm consistently increases a lower bound on the marginal probability of the data.

4.4.1 Probabilistic Inference (The E-Step):

For a particular input image, the exact posterior is given by Bayes rule:

$$p(\{c_l, T_l, s_l, m_l\} \mid x) = \frac{p(x \mid \{c_l, T_l, s_l, m_l\})}{\sum \int p(x, \{c_l, T_l, s_l, m_l\})} \quad \text{Equation 78}$$

where the sum $\Sigma$ and integral $\int$ are over all unobserved discrete and continuous variables, $c_1, T_1, s_1, m_1, \ldots, c_L, T_L, s_L, m_L$.

Computing and storing this distribution directly is intractable. In particular, for each layer, there are CJ discrete configurations corresponding to combinations of the C sprite classes and the J transformations. Consequently, the total number of discrete configurations is $(CJ)^L$. Thus, for example, $C=3$, $J=76,800$ and $L=3$, there are a total of over 12,000,000,000,000,000 discrete configurations.

Further, even if the number of discrete configurations were tractable, for each discrete configuration, the distribution over the continuous variables, i.e., appearances and masks, is still intractable. Although the continuous variables are Gaussian a priori, the observations are given by products of these variables. Thus, the posterior over the appearances and masks is not Gaussian and does not have a tractable closed form.

Consequently, to resolve the problem of an intractable exact posterior, a factorized approximation, i.e., a "q-distribution" of the posterior is computed instead, as illustrated by Equation 79:

$$p(\{c_l, T_l, s_l, m_l\} \mid x) \approx \prod_{l=1}^{L} q(c_l, T_l) q(s_l) q(m_l) \quad \text{Equation 79}$$

where each of these q-distributions is an approximation to the corresponding marginal of the exact posterior distribution. For example, $q(c_l, T_l) \approx p(c_l, T_l | x)$.

To compute a good factorized approximation to the posterior, each q-distribution is parameterized and then the parameters of the q-distributions are jointly optimized to maximize the negative relative entropy (e.g., the "Kullback-Leibler divergence") between the two distributions:

$$D = \sum \int (\Pi_l q(c_l, T_l) q(s_l) q(m_l)) \ln \frac{p(\{c_l, T_l, s_l, m_l\} \mid x)}{\Pi_l q(c_l, T_l) q(s_l) q(m_l)} \quad \text{Equation 80}$$

This type of inference is conventionally called "variational inference," and the parameters of the q-distributions are called "variational parameters." $q(c_l, T_l)$ is a discrete distribution, with one variational parameter for each configuration of $c_l$ and $T_l$. So, for C classes, J transformations, and L layers, the posterior is represented by LCJ probabilities, instead of $(CJ)^L$ probabilities. Thus, again using the example of $C=3$, $J=76,800$ and $L=3$, there are a total of less than 700,000 discrete configurations, rather than in excess of 12,000,000,000,000,000 discrete configurations as with the intractable example illustrated above. Consequently, using this method, computational cost is significantly reduced. Gaussian approximations are used for $q(s_l)$ and $q(m_l)$, with variational parameters for the means and variances.

Further, maximizing or optimizing D directly is intractable, since $\ln p(\{c_l, T_l, s_l, m_l\} | x)$ does not have a simple form. Consequently, to simplify the expression, the marginal probability of the observation, $\ln p(x)$ is added to D, obtaining:

$$F = D \quad \text{Equation 81}$$
$$= \ln p(x)$$
$$= \sum \int (\Pi_l q(c_l, T_l) q(s_l) q(m_l))$$
$$\ln \frac{p(x, \{c_l, T_l, s_l, m_l\})}{\Pi_l q(c_l, T_l) q(s_l) q(m_l)}$$

Since $\ln p(x)$ does not depend on the variational parameters, maximizing F produces the same variational parameters as maximizing D. However, unlike optimizing D directly, maximizing F is tractable. From Equation 9, it is clear that $\ln p(x, \{c_l, T_l, s_l, m_l\})$ simplifies to a sum of "Mahalanobis distances" and F is given by expectations of these distances under Gaussian q-distributions. The part of F in the form $\Sigma \int q \ln(1/q)$ is the total entropy of the q-distributions, which is easy to compute for discrete distributions and Gaussian distributions. So, computing F reduces to simple algebra.

Note that the concept of the Mahalanobis distance is well known to those skilled in the art, and will not be discussed in detail herein. However, in general, unlike the basic Euclidian distance that treats each variable as equally important in calculating the distance, the Mahalanobis distance scales the contribution of individual variables to the distance value according to the variability of each variable. Consequently, the Mahalanobis distance can be thought of as a measure of the distance between each observation in a multidimensional cloud of points and the centroid of the cloud.

F is not quadratic in the variational parameters, but is instead L-linear, for L layers. For example, with a single foreground sprite and a single background sprite, F is bilinear in the variational parameters. A nonlinear optimizer is used to maximize F with respect to the variational parameters, and the resulting q-distributions are used for learning (as discussed in detail below) object classification, object tracking, video stabilization, filling in occluded objects, and object removal.

The optimization of F makes use of convolutions. Consequently, in one embodiment, fast Fourier transforms (FFTs) are used for computational efficiency. In fact, given 3 layers and 3 sprites, the system and method described herein is capable of processing one 320-pixel×240-pixel image frame per second using a typical PC-type computer. The use of FFTs in this context is described in further detail below in Section 5.0.

Once inference is complete, various useful tasks are readily performed. For example, in one embodiment where a sprite is to be removed from an image sequence, the object in layer k is automatically removed from an image by classifying and locating the objects in each layer using the modes of $q(c_l, T_l)$, $l=1, \ldots, L$. The modes of $q(s_l)$ and $q(m_l)$ are then used to recover the instantiated appearance maps and masks for each object in the current image. Finally, the image is reconstructed, while simply leaving layer k out of the reconstruction.

4.4.2 Learning Using the Generalized EM Algorithm:

As noted above, the exact posterior is intractable, so exact EM and GEM are intractable, and generalized EM is used to learn the model parameters from a video or other image sequence.

Since the negative relative entropy D from above is always negative, thus, in view of Equation 81:

$$F \leq \ln p(x) \qquad \text{Equation 82}$$

Consequently, for each video or image frame $x^{(n)}$, there is a bound, $F^{(n)} \leq \ln p(x^{(n)})$. Summing these bounds over the image frames gives a lower bound on the log probability of the entire video sequence. So, maximizing the bound for each frame with respect to the frame's variational parameters and maximizing the sum of bounds with respect to the model parameters maximizes a lower bound on the likelihood of the video sequence.

After the model parameters are initialized to the means and variances of the pixels in the video sequence, a generalized E-Step and a generalized M-Step are repeated until convergence. Specifically, for the generalized E-Step, F is increased with respect to one set of variational parameters for each video frame. Similarly, for the generalized M-Step, F is increased with respect to the model parameters.

Experimental results of this process are provided in Section 7, which discusses the results of a working embodiment of the generative imaging model described herein which is applied to several different image sequences in order to solve a number of imaging problems. In particular, as described in further detail in Section 7, multiple layers of multiple flexible sprites were used in processing several sequences of images.

It should be noted that while it is quite straightforward to implement, the expressions for using multiple layers of multiple flexible sprites contain a large amount linear algebra. Consequently, for purposes of clarity of discussion, the details of an implementation for computing a single flexible sprite are provided below in Section 4.5.

4.5 Computation of a Single Flexible Sprite:

To put the proceeding explanation of inference and learning into perspective, the following discussion provides details for a computing a model of a single sprite from a sequence of one or more input images. In addition, for purposes of explanation, the model in this discussion is further simplified by assuming that the variance in the background appearance is zero, and that the variance in the sprite appearance is zero. However, in the general case, variance in the sprite mask is modeled, which allows the sprite to change shape from frame to frame.

The joint distribution over the observation x, sprite mask m and transformation T is given by:

$$p(x,m,T) = \mathcal{N}(x; Tm*T\mu + \overline{Tm}*b\beta) \, \mathcal{N}(m;\eta,\psi)\rho_T \qquad \text{Equation 83}$$

where $\mu$ is the appearance map of the sprite.

Further, p(m, T|x) is approximated by:

$$p(m,T|x) \approx q(m)q(T) = \mathcal{N}(m;\gamma,\nu)\xi_T \qquad \text{Equation 84}$$

where and $\gamma$ and $\nu$ are vectors containing the mean and variance of the mask for the current frame, and $\xi_T$ is the posterior probability of transformation T for the current frame.

In addition, the variational bound is given by:

$$F = \sum_T \int_m q(m)q(T) \ln \frac{p(x,m,T)}{q(m)q(T)} \qquad \text{Equation 85}$$

$$= \sum_T \xi_T \ln(\rho_T/\xi_T) + \ln|2\pi e \nu| - \frac{1}{2}\ln|\beta|$$

$$- \frac{1}{2} \sum_T \xi_T \beta^{-T} \binom{(x - T\gamma * T\mu - T\overline{\gamma}*b)^2 +}{T\nu*(T\mu - b)^2}$$

$$- \frac{1}{2}\ln|2\pi\psi| - \frac{1}{2}\psi^{-T}((\gamma-\mu)^2 + \nu))$$

where "|·|" is the product of the elements in a vector, "$^T$" indicates vector transpose, "$^{-T}$" indicates element-wise inverse followed by vector transpose, and "$^2$" indicates element-wise squaring of a vector.

4.5.1 The E-Step:

Setting the derivatives of F with respect to and $\gamma$ to zero, the E-Step updates are obtained for the mask for the current frame as illustrated by Equation 86 and Equation 87:

$$\nu \leftarrow \left(\psi^{-1} + \sum_T \xi_T T^{-1}(\beta^{-1}*(T\mu-b)^2)\right)^{-1} \qquad \text{Equation 86}$$

and $$\gamma \leftarrow \nu * \left(\psi^{-1}\eta + \sum_T \xi_T T^{-1}(\beta^{-1}*(T\mu-b)*(x-b))\right) \qquad \text{Equation 87}$$

where $T^{-1}$ is the inverse transformation of T. The update for sets the mean of the mask for the current frame to a weighted combination of $\eta$ and the average value of $(T\mu-b)*(x-b)$ under the posterior. The first term keeps the current mask close to its mean over the training set, $\eta$, while the second term forces the mask to be large in regions where the background does not match the observed image. Parts of the object that deform quite a bit over the training data (such as swinging arms and legs) will lead to large values of the model mask variance $\psi$ in the corresponding regions (see the description of the M-Step below). In those regions, $\psi^{-1}$ is close to zero, and the second term dominates, i.e., the mask is allowed to adapt to the current frame more closely. Note that the inferred masks illustrated in FIG. 3 show how the inferred sprite mask can be used for tracking by simply providing the current position of the sprite represented by the sprite masks 350, 355, 360, and 365.

The update for $\nu$ sets the variance of the mask for the current frame to be high in regions where the transformed sprite appearance map looks similar to the background ($T\mu \approx b$) under all plausible transformations. The variance of the mask is lowest in regions where the transformed sprite appearance map looks different from the background under plausible transformations.

Next, setting the derivative of F with respect to $\xi$ to zero (and including a Lagrange multiplier to ensure that $\Sigma_T \xi_T = 1$), the E-Step updates are obtained for the posterior probability of transformation T:

$$\xi_T \leftarrow \delta \rho_T \exp\left[\frac{1}{2}\beta^{-T}\left(\begin{array}{c}(x - T\gamma * T\mu - T\overline{\gamma} * b)^2 + \\ T\nu * (T\mu - b)^2\end{array}\right)\right] \quad \text{Equation 88}$$

where $\delta$ is a scalar computed to ensure that $\Sigma_T \xi_T = 1$. This update makes the posterior probability $\xi_T$ high for those transformations where the composition of the transformed sprite and background match the observed image. Note, however, that the last term penalizes transformations under which the transformed sprite looks similar to the background.

For each frame $x^{(n)}$, these updates are iterated to obtain the variational parameters $\eta^{(n)}$, $\nu^{(n)}$ and $\xi^{(n)}$.

4.5.2 The M-Step:

Setting the derivative of F with respect to the model parameters to zero, the model parameter updates are obtained as illustrated by Equation 89 as follows:

$$\psi \leftarrow \frac{1}{N} \sum_n \left(\nu^{(n)} + (\gamma^{(n)} - \eta)^2\right), \quad \text{Equation 89}$$

$$\eta \leftarrow \frac{1}{N}\sum_n \gamma^{(n)},$$

$$\mu \leftarrow \left(\sum_n \sum_T \xi_T^{(n)}(\gamma^{(n)2} + \nu^{(n)})\right)^{-1} *$$

$$\left(\sum_n \sum_T \xi_T^{(n)} \cdot (\gamma^{(n)} * T^{-1}x^{(n)} - (\gamma^{(n)} * \overline{\gamma}^{(n)} - \nu^{(n)}) * T^{-1}b)\right).$$

$$b \leftarrow \left(\sum_n \sum_T \xi_T^{(n)}T(\overline{\gamma}^{(n)} + \nu^{(n)})\right)^{-1} *$$

$$\left(\sum_n \sum_T \xi_T^{(n)} \cdot (T\overline{\gamma}^{(n)} * (x^{(n)} - T\gamma^{(n)} * T\mu) + T\nu^{(n)} * T\mu)\right).$$

Further, the mask variance is set to the average of the inferred mask variance for each video frame, plus the deviation of the inferred mask from the mask parameter. The mask parameter is set to the average of the inferred masks over the training set. The update for the appearance map is made intuitive by considering how it accumulates input from each video frame. In regions of the frame where the inferred mask is close to 1 (so, $\overline{\gamma}^{(n)} \approx 0$) and there is little uncertainty in the inferred mask ($\nu^{(n)} \approx 0$), the update accumulates the observed image. For intermediate values of the mask, a fraction of the background is subtracted from the observed image before it is accumulated.

5.0 Accelerating Inference and Learning in Each Layer

As noted above, a generalized expectation-maximization algorithm is used to infer the variables for learning the generative models. However, conventional methods for evaluating GEM algorithms can be computational expensive, especially when dealing with large data sets. Consequently, the following discussion addresses methods for dramatically improving the speed of learning the generative models using generalized expectation-maximization techniques by applying a factorized variational approximation technique and inference using fast Fourier transforms.

As described below, a tremendous increase in the speed of such computations is achieved through the use of a variational technique for decoupling transformations, and a fast Fourier transform method for computing posterior probabilities. In particular, using the techniques described below for performing such computations, given N×N images, learning C clusters under N rotations, N scales, N x-translations and N y-translations requires only $(C+2 \log N)N^2$ scalar operations per iteration in each layer. In contrast, conventional methods for performing such operations require $CN^6$ operations to account for these transformations.

In general, unlike conventional schemes that use a single discrete variable that enumerates a discrete set of possible transformations that can occur in the input, the techniques described below breaks the transformation into a sequence of transformations where $T_k$ is a random variable for the transformation matrix at step k. Consequently, if $\mathcal{T}_k$ is the set of possible transformation matrices corresponding to the type of transformation at step k (e.g., image rotation), then $T_k \in \mathcal{T}_k$.

Figure 14A:
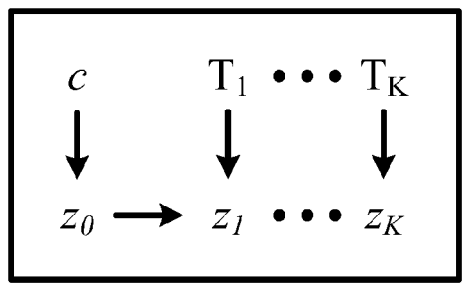
FIG. 14A illustrates a Bayesian network structure for a generative model for decomposing images as described herein.
Figure 14B:
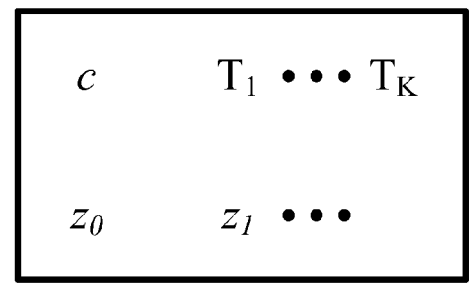
FIG. 14B illustrates the Bayesian network of FIG. 14A for a factorized variational approximation of a posterior distribution.
Figure 14C:
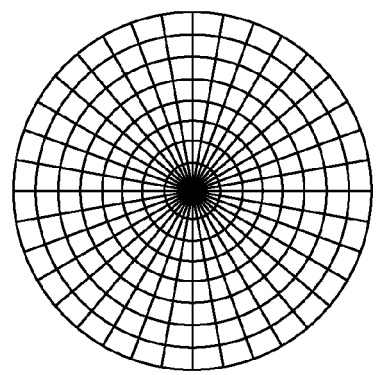
FIG. 14C illustrates a typical radial 2-D grid.

As illustrated by FIG. 14A, a Bayesian network for a generative model in a single layer, that draws an image $z_0$ from class c, applies a randomly drawn transformation matrix $T_1$ of type 1 (e.g., image rotation) to obtain $z_1$, and so on, until a randomly drawn transformation matrix $T_K$ of type K (e.g., image translation) is applied to obtain the observed image $z_K$. (This model is meant as a replacement for the transformation models of Section 3. For instance, in flexible sprites, the end image $z_K$ serves as the sprite s. As will be shown, this structure leads to more efficient inference when the transformations include combinations of scaling, rotation and translation.) FIG. 14B illustrates the Bayesian network for a factorized variational approximation to the posterior distribution, given $z_K$. Further, note that when an image is measured on a discrete, radial 2-D grid, as illustrated by FIG. 14C, a scale and rotation correspond to a shift in the radial and angular coordinates. Further, note that the masks in flexible layers are modeled using the same structure and parametric forms.

In particular, the generative model shown in FIG. 14A consists of picking a class c, drawing a vector of image pixel intensities $z_0$ from a Gaussian, picking the first transformation matrix $T_1$ from $\mathcal{T}_k$, applying this transformation to $z_0$ and adding Gaussian noise to obtain $z_1$, and repeating this process until the last transformation matrix $T_K$ is drawn from $\mathcal{T}_k$ and is applied to $z_{K-1}$ to obtain the observed data $z_K$. Consequently, the joint distribution can be given by Equation 90 as follows:

$$p(c, z_0, T_1, z_1, \ldots, T_K, z_K) = \quad \text{Equation 90}$$

$$p(c)p(z_0 \mid c) \prod_{k=1}^{K} p(T_k)p(z_k \mid z_{k-1}, T_k)$$

The probability of class $c \in \{1, \ldots, C\}$ is parameterized by $p(c) = \pi_c$ and the untransformed latent image has conditional density:

$$p(z_0 \mid c) = \mathcal{N}(z_0; \mu_c; \Phi_c) \quad \text{Equation 91}$$

where $\mathcal{N}(\cdot)$ is the normal distribution, $\mu_c$ is the mean image for class c and $\Phi_c$ is the diagonal noise covariance matrix for class c. Notice that the noise modeled by $\Phi_c$ gets transformed, so $\Phi_c$ can model noise sources that depend on the transformations, such as background clutter and object deformations in images.

The probability of transformation matrix $T_k$ at step k is $p(T_k) = \lambda_{k,T_k}$. Note that in one embodiment, this probability can be set to be uniform. At each step, a small amount of noise is assumed with a diagonal covariance matrix $\Psi$ added to the image, so that:

$$p(z_k \mid z_{k-1}, T_k) = \mathcal{N}(z_k; T_k z_{k-1}; \Psi) \quad \text{Equation 92}$$

$T_k$ operates on $z_{k-1}$ to produce a transformed image. In fact, $T_k$ can be viewed as a permutation matrix that rearranges the pixels in $z_{k-1}$. In one embodiment, it is assumed that $\Psi = \psi I$ where $\psi$ can be set to a constant, small value, such as 0.01.

In a conventional scheme, an exact EM algorithm for learning this model uses statistics for $\rho_c$, $\mu_c$, and $\Phi_c$, that are computed by averaging the derivatives of $\ln(\pi_c \mathcal{N}(z_0; \mu_c, \Phi_c))$ over the posterior distribution:

$$p(z_0 \mid z_K) = \quad \text{Equation 93}$$

$$\sum_{T_1} \ldots \sum_{T_K} p(z_0 \mid c, T_1, \ldots T_K, z_K)p(c, T_1, \ldots, T_K \mid z_K)$$

Since $z_0, \ldots, z_K$ are jointly Gaussian given c, and $T_1, \ldots, T_K$, $p(z_0 \mid c, T_1, \ldots T_K, z_K)$ is Gaussian, its mean and covariance are computed using linear algebra. $p(c, T_1, \ldots T_K \mid z_K)$ is also computed using linear algebra.

However, the problem with this conventional direct approach is that the number of scalar operations in Equation 93 is very large for large feature vectors and large sets of transformations. In particular, For N×N images, learning C clusters under N rotations, N scales, N x-translations and N y-translations leads to $N^4$ terms in the summation. Since there are $N^2$ pixels, each term is computed using $N^2$ scalar operations. Consequently, each iteration of EM takes $CN^6$ scalar operations per training case. Thus, given 10 classes and images of 256-pixels×256-pixels, the conventional direct approach takes $2.8 \times 10^{15}$ scalar operations per image for each iteration of EM. Consequently, such processing is very computational expensive, and does not led itself to real time, or near-real time image processing.

In contrast, the variational technique described below for decoupling transformations, in combination with a fast Fourier transform method for computing posterior probabilities can reduce the above number to $(C+2 \log N)N^2$ scalar operations. Therefore, the techniques described herein significantly reduce the computational complexity of the problem. For example, using the same example provided above, given 10 classes and images of 256-pixels×256-pixels in size, the techniques described below require only 2,752,512 scalar operations per image for each iteration of EM, rather than the $2.8 \times 10^{15}$ scalar operations per image for each iteration of EM using the conventional scheme.

5.1 Factorized Variational Approximation:

A variational approximation is used to simplify the computation of the required posterior in Equation 93. As shown in FIG. 14B, this variational approximation is a completely factorized approximation to the true posterior:

$$p(c, z_0, T_1, z_1, \ldots, T_K \mid z_K) \approx q(c, z_0, T_1, z_1, \ldots, T_K) = \quad \text{Equation 94}$$

$$q(c)q(z_0)\left(\prod_{k=1}^{K-1} q(T_k)q(z_k)\right)q(T_K)$$

The q-distributions are parameterized and these variational parameters are varied to make the approximation a good one. In addition, $p(c, z_0 \mid z_K) \approx q(c)q(z_K)$, so sufficient statistics can be readily determined from q(c) and $q(z_K)$. The variational parameters are $q(c) = \rho_c$, $q(T_k) = \gamma_{k T_k}$, and $q(z_k) = N(z_k; \eta_k, \Omega_k)$.

The generalized EM algorithm maximizes a lower bound on the log-likelihood of an observed image $z_K$:

$$\beta = \sum \int q(c, z_0, T_1, z_1, \ldots, T_K) \quad \text{Equation 95}$$

$$\ln \frac{p(c, z_0, T_1, z_1, \ldots, T_K, z_K)}{p(c, z_0, T_1, z_1, \ldots, T_K)} \leq \ln p(z_K)$$

In the expectation step (E-Step), the variational parameters are adjusted to maximize $\beta$ and in the maximization step (M-Step), the model parameters are adjusted to maximize $\beta$.

Assuming constant noise, $\Psi = \psi I$, the derivatives of $\beta$ with respect to the variational parameters produce the following E-Step updates:

$$\Omega_0 \leftarrow \left(\sum_c \rho_c \Phi_c^{-1} + \psi^{-1} I\right)^{-1} \quad \text{Equation 96}$$

$$\eta_0 \leftarrow \Omega_0 \left(\sum_c \rho_c \Phi_c^{-1} \mu_c + \psi^{-1} \sum_{T_1} \gamma_{1,T_1} T_1^{-1} \eta_1\right)$$

$$\rho_c \leftarrow \pi_c \exp\left(-\frac{1}{2} tr(\Omega_0 \Phi_c^{-1}) - \frac{1}{2}(\eta_0 - \mu_c)' \Phi_c^{-1}(\eta_0 - \mu_c)\right)$$

$$\Omega_k = \frac{1}{2} \psi I$$

$$\eta_k \leftarrow \frac{1}{2}\left(\sum_{T_k} \gamma_{k,T_k} T_k \eta_{k-1} + \sum_{T_k} \gamma_{k+1,T_1} T_{k+1}^{-1} \eta_{k+1}\right) \quad \text{Equation 97}$$

$$\gamma_{k,T_k} \leftarrow \lambda_{k,T_k} \exp\left(\begin{array}{c} \frac{1}{2} tr(\Omega_k \psi^{-1}) - \\ \frac{1}{2} \psi^{-1}(\eta_k - T_k \eta_{k-1})'(\eta_k - T_k \eta_{k-1}) \end{array}\right) \quad \text{Equation 98}$$

In one embodiment, each time the $\rho_c$'s are updated, they are normalized. Similarly, the $\gamma_{k,T_k}$'s are also normalized each time that they are updated. One or more iterations of the above updates are applied for each training case and the variational parameters are stored for use in the M-Step, and as the initial conditions for the next E-Step.

The derivatives of β with respect to the model parameters produce the following M-Step updates:

$$\pi_c \leftarrow \langle \rho_c \rangle$$

$$\mu_c \leftarrow \langle \rho_c \eta_0 \rangle$$

$$\Phi_c \leftarrow \langle \rho_c(\Omega_c + \text{diag}((\eta_0 - \mu_c)(\eta_0 - \mu_c)')) \rangle \qquad \text{Equation 99}$$

where $\langle \rangle$ indicates an average over the training set.

This factorized variational inference technique is quite greedy, in a computational sense, since at each step, the method approximates the posterior with one Gaussian. Consequently, the described methods work best for a small number of steps. In fact, in a tested embodiment of the generative model, only 2 steps were needed to provide good results.

5.2 Inference Using Fast Fourier Transforms:

The M-Step updates described above take very few computations, but the E-Step updates can be computationally burdensome. The dominant culprits are the computation of the distance of the form:

$$d_T = (g - Th)'(g - Th) \qquad \text{Equation 100}$$

in Equation 98, for all possible transformations T, and the computation of the form:

$$\sum_T \gamma_T Th \qquad \text{Equation 101}$$

in Equation 96 and Equation 97.

Because the variational approximation is more accurate when the transformations are broken into fewer steps, it is a good idea to pack as many transformations into each step as possible. Consequently, in a tested embodiment of the generative model, x-y translations are applied in one step, and rotations are applied in another step. However, the number of possible x-y translations in a 320-pixel×240-pixel image is 76,800. So, 76,800 $d_T$'s must be computed and the computation of each $d_T$ uses a vector norm of size 76,800.

However, if the data is defined on a coordinate system where the effect of a transformation is a shift, then the above quantities can be computed very quickly using fast Fourier transforms (FFTs). In particular, for images measured on rectangular grids, an x-y translation corresponds to a shift in the coordinate system. However, for images measured on a radial grid, such as the one shown in FIG. 11C, a scale and rotation also correspond to a shift in the coordinate system. Further, when updating the variational parameters, it is straightforward to convert them to the appropriate coordinate system (i.e., rectangular, or radial), apply the FFT method described below, and then convert them back.

Note that the notation used herein to describe the method for inference using FFTs is very different from conventional FFT-type notation. Specifically, each image is measured on a discrete grid and x is the x-y coordinate of a pixel in the image (x is a 2-vector). The images g and h in Equation 100 and Equation 101 are written as functions of x: g(x), h(x). In this representation, T is an integer 2-vector, corresponding to a shift in x. So, Equation 100 becomes:

$$d(T) = \sum_x (g(x) - h(x + T))^2 \qquad \text{Equation 102}$$
$$= \sum_x (g(x)^2 - 2g(x)h(x + T) + h(x + T)^2)$$

and Equation 101 becomes:

$$\sum_T \gamma(T) h(x + T) \qquad \text{Equation 103}$$

The common form is the correlation:

$$f(T) = \sum_T g(x) h(x + T) \qquad \text{Equation 104}$$

For an N×N grid, computing the correlation directly for all T takes $N^4$ scalar operations. The FFT can be used to compute the correlation in $N^2 \log N$ time. The FFT's G(ω) and H(ω) of g and h are computed in $N^2 \log N$ time. Then, the FFT F(ω) of f is computed in $N^2$ as follows:

$$F(f) = G(\omega) * H(\omega) \qquad \text{Equation 105}$$

where "*" denotes complex conjugate. Then the inverse FFT f(T) of F(f) is computed in $N^2 \log N$ time.

Using this method, the posterior and sufficient statistics for all $N^2$ shifts in an N×N grid can be computed in $N^2 \log N$ time. Further, using this method along with the variational technique, C classes, N scales, N rotations, N x-translations, and N y-translations can be accounted for using $(C+2 \log N)N^2$ scalar operations.

Consequently, the aforementioned factorized variational technique in combination with the aforementioned FFT-based inference technique describes how a tremendous speed-up in training a transformation-invariant generative model is achieved. In particular, this technique describes the use of a variational technique for decoupling transformations, and a fast Fourier transform method for computing posterior probabilities. For N×N images, learning C clusters under N rotations, N scales, N x-translations and N y-translations takes only $(C+2 \log N)N^2$ scalar operations per iteration. In contrast, as noted above the conventional scheme for making such computations required $CN^6$ operations to account for these transformations. Thus, the drastic reduction in the computational complexity of the problem allows for generative models and flexible sprites to be learned in real-time, or near-real time pixel intensities in for use in transformation-invariant image processing and analysis.

6.0 System Operation

The program modules described in Section 2.2 with reference to FIG. 2, and in view of the detailed description provided in Sections 3 through 6, are employed for learning generative models for sprites representing one or more layers of objects in an image sequence. This process is depicted in the flow diagram of FIG. 15. It should be noted that the boxes and interconnections between boxes that are represented by broken or dashed lines in FIG. 15 represent alternate embodiments of the present invention, and that any or all of these alternate embodiments, as described below, may be used in combination.

Figure 15:
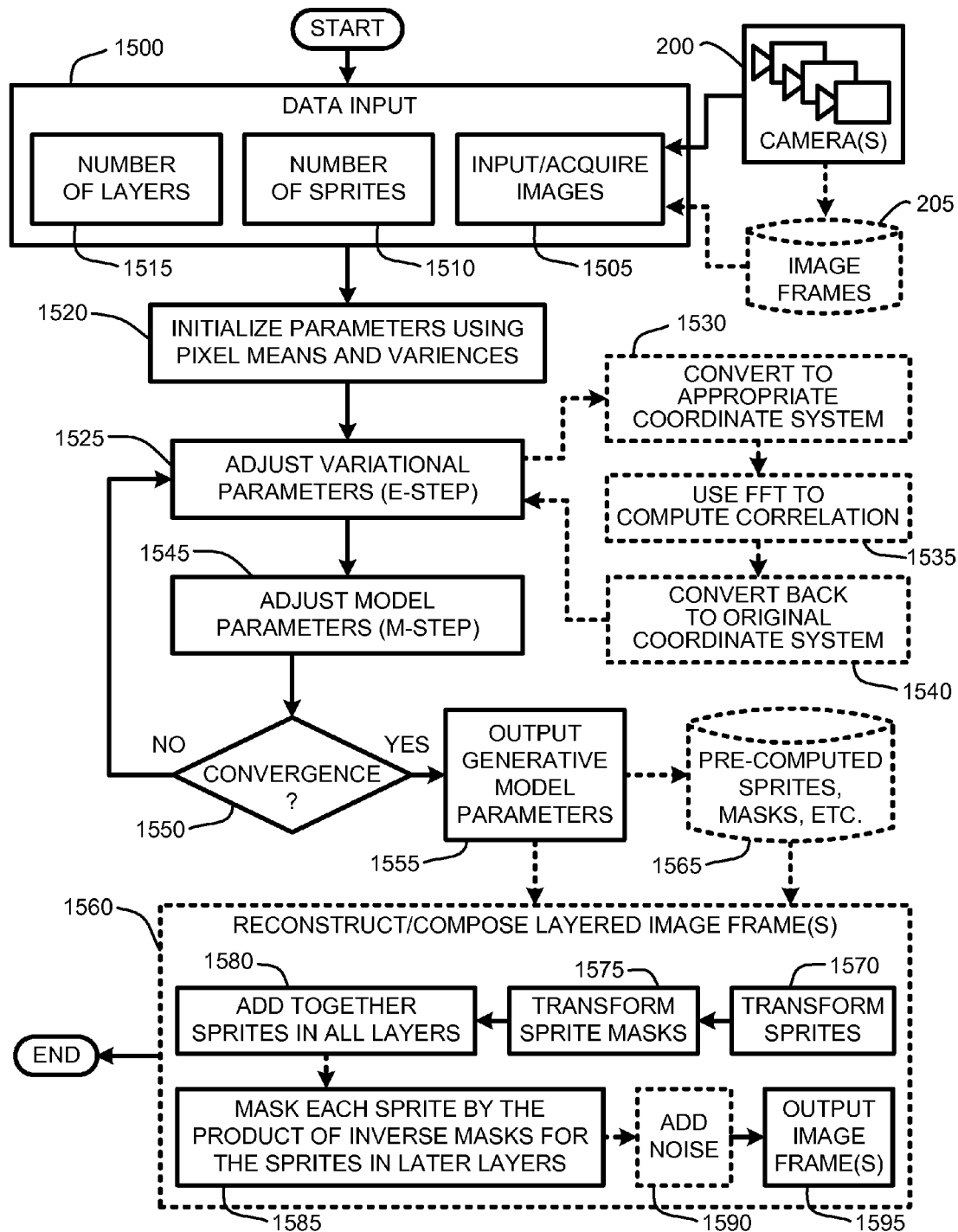
FIG. 15 illustrates an exemplary system flow diagram for automatically learning a generative model for decomposing image frames into one or more flexible sprites.

Referring now to FIG. 15 in combination with FIG. 2, the process can be generally described as a system and method for automatically learning generative models representing flexible sprites from a sequence of one or more images.

In general, as illustrated by FIG. 15, a system and method for learning generative models begins by inputting data 1500 for processing. In particular, a sequence of one or more image frames 205, from either a camera 200 or a file or database of image frames are input 1505 for processing. In addition, in one embodiment, the desired number of flexible sprites 1510 and the desired number of input layers 1515 are also input for processing. Further, as noted above, in one embodiment, an optimal number of flexible sprites 1510 and input layers 1515 are automatically inferred from the image data.

Given the image sequence 205, the number of sprites 1510, and the number of layers 1515, a set of model parameters that represent the entire image sequence is computed as a generative model of the image sequence. As described above, computation of the generative model is accomplished using a variational generalized expectation maximization process.

In particular, the first step after the initial data input 1500 involves initializing parameters 1520 that include prior probabilities of the sprite classes, means and variances of the sprite appearance maps, means and variances of the sprite masks, and observation noise variances. These parameters are either initialized 1520 randomly, or simply using pixel means and variances for each image frame.

Once these parameters have been initialized 1520 the generalized expectation-maximization process begins. In general, as described above, first, an expectation step ("E-Step") is used to adjust variational parameters 1525 in order to maximize the lower bound on the log-likelihood of an image frame. While brute force expectation-maximization methods may be applied here, in a tested embodiment, variational approximations and inference using fast Fourier transforms was used for increasing the speed of learning the generative models. Specifically, in adjusting the variational parameters for the E-Step, the parameters are first converted to an appropriate coordinate system 1530, if necessary, so that transforms can be accomplished using a simple shift operation. The coordinate systems are either rectangular, or polar, and depend upon the particular variable being analyzed.

In particular, as described above, given transforms of scale, rotation, and x-y translations for a particular sprite, translations are simply shift operations in a Cartesian coordinate system, while rotation and scale become shift operations in a log-polar coordinate system. Further, as described above, converting to a coordinate system appropriate for shift operations 1530 allows a FFT to be used for computing the correlation 1535 for all transforms. Next, the variational parameters are simply converted back into the original coordinate system 1540. The results of these steps, e.g., converting to an appropriate coordinate system 1530, computing the FFT's, and converting back to the original coordinate system 1535, allows for rapid inference of the variational parameters during the E-Step 1520 of the generalized expectation-maximization process described above.

Next, the model, the model parameters are adjusted in the maximization step ("M-Step") 1545. In particular, the M-Step serves to adjust model parameters 1545 in order to maximize the lower bound on the log-likelihood of the image frame.

At this point, a check for convergence 1550 between the E-Step 1520 and the M-Step 1545 is performed. If convergence has not yet been achieved, then the E-Step 1520 and the M-Step 1545 are repeated, using the previously computed values as inputs for each subsequent iteration, as described above, until convergence 1550 is achieved. Once convergence 1550 has been achieved, the learned parameters are output as a generative model 1555.

In one embodiment, the flexible sprites represented by the generative model are then either used for reconstruction or composition of layered image frames 1560 as described above, or stored 1565 for later use. The reconstruction or composition process 1560 is rather straightforward once the flexible sprites have been computed in the manner described above. In particular, the sprite appearance maps are first transformed 1570. Next, the sprite masks are transformed 1575. Given the transformed sprite appearance maps 1570 and transformed sprite masks, it is a simple matter to compute the rigid sprite (i.e., a particular instance of a flexible sprite, as noted above) for each image frame.

These rigid sprites computed for each layer are then added together 1580 into a composite layered image frame. However, because one or more of the sprites may occlude either other sprites, or a background sprite layer, each sprite is masked by the product of inverse masks for the sprites in subsequent layers 1585. Note also that as discussed above, any of the sprite masks may be fully or partially transparent.

In general, as described above, this inverse masking process 1585 basically serves to erase pixels that are occluded, or in the transparency case, to render particular pixels as either partially or fully transparent, thereby partially or completely showing occluded portions of sprites in lower layers. At this point, in one embodiment, noise is added 1590 to the layered image composition. Finally, the layered image composition is simply output as an image frame. These steps for reconstructing or composing layered image frames 1560 are repeated for each image frame.

In addition, as described above, in one embodiment, the process for reconstructing image frames, or generating composite image frames, makes use of previously computed flexible sprites. Such sprites, even if from an entirely separate image sequence are simply used in the same manner as the flexible sprites learned for an image sequence currently being processed. In this manner, composite image sequences representing objects from any number of original image sequences may be easily generated. For example, a flexible sprite representing a walking person learned from one image sequence can be added into another image sequence in any desired layer. The resulting composite image sequence will now include the walking person learned for another image sequence entirely. Clearly, any type or number of flexible sprites, whether learned from the current image sequence, or from any number of previous image sequences can be used to create a composite image having any number of layers. Further, a single flexible sprite can be included in multiple layers in a composite image sequence, such as with the example provided above, where a flexible sprite modeling a single flying bird is used to create an entire flock of flying birds in a composite image sequence.

The output image frames 1595 are then available for immediate playback, or storage for later playback or analysis, as desired.

7.0 Additional Embodiments

Using the techniques described above in a working example of the generative model described herein, it is possible to analyze a video or image sequence or even simply a collection of photographs and create a sprite decomposition of the images automatically. There are numerous applications that can benefit from such a representation, such as, for example, video coding and watermarking, video surveillance, and video/image manipulation tools. Further, with the proliferation of digital media among home users, such tools are becoming highly desirable, but unfortunately visual data, especially video, is currently very difficult to search, parse and edit. However, given the flexible sprite representation created by the generative model described herein, these and many other tasks are reduced to a few a mouse clicks, thereby providing an end user with a set of powerful and intuitive image processing tools. For example, the flexible sprites can be easily used to create video panoramas on dynamic scenes; stabilize video with respect to specific objects, or even remove objects; capture quality stills from video, make video textures, use sprites in presentations or on Internet web pages, etc.

The following paragraphs describe how a variety of different vision problems were solved using a tested embodiment of the generative model described herein. In general, the following examples, as illustrated by FIG. 9A through FIG. 9J, used a flexible layer model such as the model illustrated by FIG. 8A, as described above, with parameters initialized to random values. Depending upon the application, various combinations of the number of layers L, the number of classes C, and the dimensionality D of the subspace in which variable y is defined are used. Note that these parameters can also be optimized for, but in the experiments described below, these were chosen depending on the application.

Figure 9A:
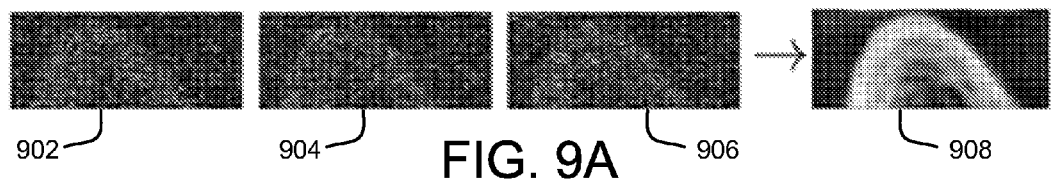
FIG. 9A illustrates electronics-induced distortion removed from conventional electron microscope images using a tested embodiment of the generative model described herein.

7.1 Removal of Electronics-Induced Distortions:

As illustrated by FIG. 9A, electronics-induced distortion was removed from conventional electron microscope images by setting L=1, C=1, and D=0. Specifically, given the three input images on the left 902, 904 and 906, the image on the right 908 was produced as a result of processing by the generative model given the aforementioned values for the layers, classes, and dimensionality, L, C, and D, respectively (see Section 3.6).

Figure 9B:
FIG. 9B illustrates removal of noise and background clutter from an image sequence using a tested embodiment of the generative model described herein.

7.2 Removal of Noise and Background Clutter, and Object Centering:

Further, as illustrated by FIG. 9B, noise and background clutter were removed from an image sequence while centering the objects identified as sprites, which in this case, are the upper bodies of two different individuals. Note that the original image sequences 910 are represented on the top row of FIG. 9B. In the next three rows, the inferred sprite appearances are shown for three different levels of observation noise ($\beta$ in Equation 77, or $\Phi^x$ in section 3.5). The second row from the top 912 illustrates the sprites having been centered after their means and variances have been automatically learned from the image sequence represented by the top row. The appearance of the sprite in each frame is inferred assuming a relatively small observation noise. Thus the sprite is centered, as the transformation is inferred correctly, but the noise (snow) is copied. The third row from the top 914 represents the inferred sprites assuming a higher level of the observation noise. Finally, the bottommost row 916 of FIG. 9B shows the sprites having been centered and the background clutter completely removed by assuming a very high level of observation noise, thus resulting in inference that copies the mean sprite appearances. In this case, the settings were L=1, C=2, and D=0. Note also that the optimal level of observation noise can also be estimated using the techniques described in Section 3.

Figure 9C:
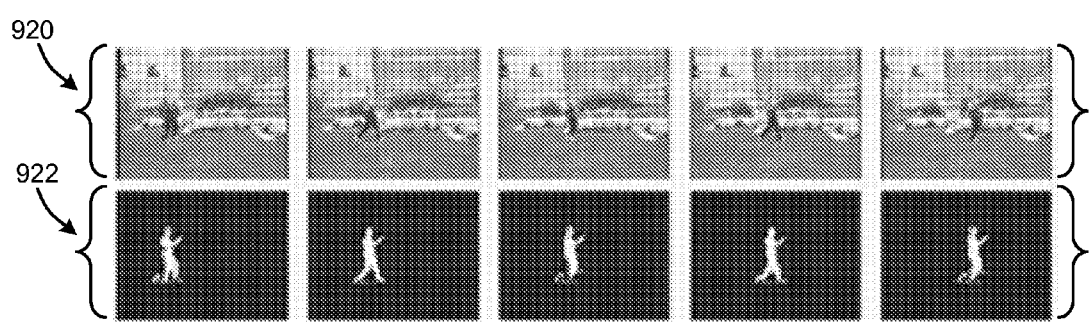
FIG. 9C illustrates tracking of dynamic objects such as a walking person using a tested embodiment of the generative model described herein.

7.3 Object Tracking:

As illustrated by FIG. 9C, dynamic objects such as a walking person can easily be tracked as a flexible sprite by the generative model. In particular, the upper row 920 of FIG. 9C provides an input image sequence illustrating a person walking across a field of view. The lower row 922 of FIG. 9C provides the automatically learned masks for the walking person. Simply outputting the position of the mask in each frame provides tracking of the person represented by the flexible sprite. In this case, the settings were L=2, (i.e., a person sprite layer and background sprite layer), C=2, and D=0. Note that it is the flexibility in the mask model which makes it possible to track a deforming object such as a walking person.

Figure 9D:
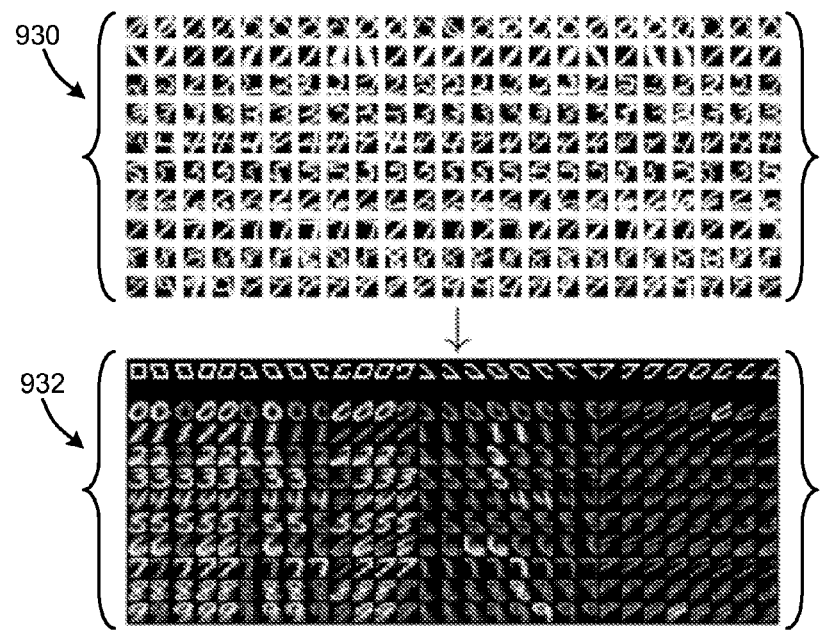
FIG. 9D illustrates learning slant-invariant linear subspace models of handwritten digits for digit recognition using a tested embodiment of the generative model described herein.

7.4 Character Recognition:

As illustrated by FIG. 9D, another use for the generative model is in learning slant-invariant linear subspace models of handwritten characters or digits for character or digit recognition. The upper rows of images 930 provide the input images, while the lower rows of images 932 provide the output sprites. In this case, the settings were L=1, (i.e., numbers, as there is no background with which to be concerned), C=10 (i.e., 10 classes of digits in the single layer), and a dimensionality D=10. Note that the leftmost column of the output provides untransformed digit sprites, while the columns to the right of that leftmost column show geometric transforms of the learned digit sprites as illustrated by the transformation map provided in the upper row of the output portion of FIG. 9D.

7.5 Object Removal and Insertion:

Each sprite has its own motion, appearance and mask, which can be changing over time. By inferring the appropriate values for a given frame, the generative model can recompose the video or image sequence without one or more sprites present in the original sequence. Similarly, the generative model can recompose the video or image sequence with the addition of one or more sprites not present in the original sequence.

Figure 9E:
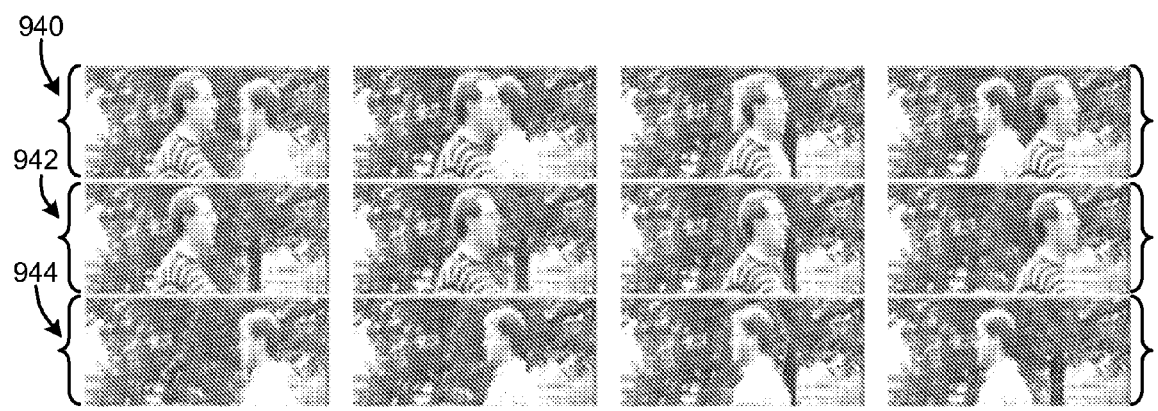
FIG. 9E illustrates object removal from either a foreground or background of an image sequence using a tested embodiment of the generative model described herein.

For example, the top row of frames in FIG. 9E shows frames 940 from an input video that was used to learn the flexible sprites 810, 845, and 850 shown in FIG. 8C. Then, the generative model used probabilistic inference to re-render the video frames, automatically removing various sprites, as shown in the middle and bottom rows of frames, 942 and 944, respectively, in FIG. 9E.

In particular, as illustrated by FIG. 9E, still another use for the generative model is in object removal, either foreground or background objects, by re-synthesizing a video or image sequence from the inferred parameters, and setting any appropriate masks to zero, i.e., fully transparent as described above. In particular, in this case, the settings were L=3, (i.e., sprites representing the upper bodies of two different persons and a background), C=3, and a dimensionality D=0.

The uppermost row 940 of FIG. 9E provides the input image sequence. The middle row 942 of FIG. 9E shows a regenerated sequence wherein a first person learned as a flexible sprite has been removed by making the corresponding sprite completely transparent.

Finally, the bottommost row 944 of FIG. 9E shows a regenerated sequence wherein a second person learned as a flexible sprite has been removed by making the corresponding sprite completely transparent. Note that the two people partially occlude each other in at least some of the frames provided in the input image sequence. However, the generative model successfully learned the sprites even with the occlusion, and thus, the regenerations of the original image sequence appears to be natural, regardless of which person sprite has been made transparent.

7.6 Automatic Camera/Object Stabilization:

Another use of the generative model involves camera stabilization. In general, with respect to image or sprite stabilization, after inferring the transformations $T_l$ for all sprites in a given frame, it is straightforward to apply the inverse transformation and align with the sprite of interest, thus stabilizing a specific object instead of the background. Since learning is unsupervised, in a tested embodiment of the generative model, a user is only required to point and click on an object of interest in order to stabilize that object.

7.7 Automatic Creation of Panoramic Images:

Generating panoramas from stills or short video shots is an area of much interest in the computer vision community. The generative model described herein is capable of properly inferring flexible sprites from complex dynamics, such as a camera dynamically moving around a general area while filming a scene. In a tested embodiment for generating panoramas, an image sequence containing large foreground and background motion, with the foreground object moving independently of the camera, interlacing, and motion blur artifacts was used in order to test the capabilities of the generative model for this task.

In order to "fill in" the background sprite model, the borders of the original sequence was padded with zeros, and a three-layer model was used where the front layer acts as a window that lets everything in the central region through. During learning, the generative model used the portion of the background that is inferred from each frame to improve the estimate of the background "panorama."

Figure 9F:
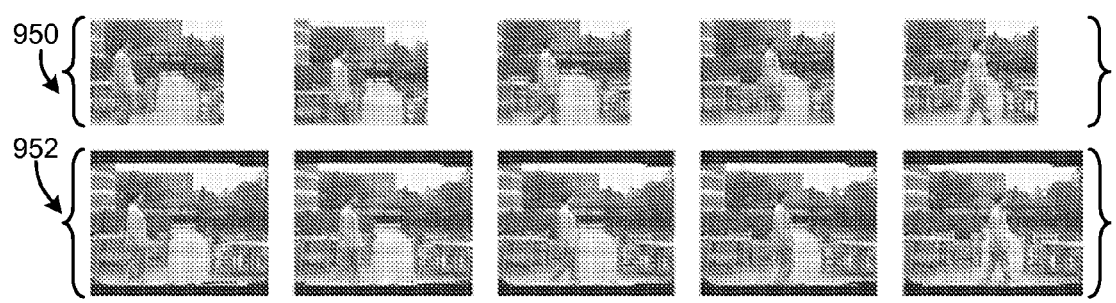
FIG. 9F illustrates camera stabilization and panorama estimation using a tested embodiment of the generative model described herein.

In particular, as illustrated by FIG. 9F, a panoramic version of a video or image sequence is built from a dynamic scene simply by adding into the model an additional layer modeling the imaging plane and its border. In this case, there is a single person against a background. However, the camera is moving across the background as the person moves through the sequence. In addition, the camera is moving slightly, but randomly, as the images are captured. The settings for the generative model were set as follows: L=3, (i.e., sprites representing the person walking through the scene, the background, and an additional layer modeling the imaging plane and its border), C=3, and a dimensionality D=0. Again, the topmost row 950 of FIG. 9F represents the input image sequence, while the bottom row 952 illustrates the reconstructed output sequence. Note that the because of the camera motion, the reconstructed background provides a panoramic view of the scene in each reconstructed frame, where the original frames were not panoramic.

Figure 9G:
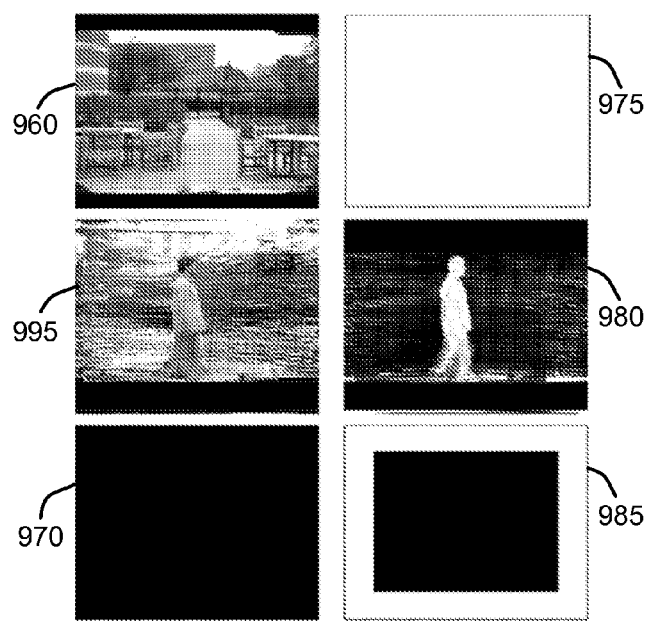
FIG. 9G illustrates sprites and sprite masks learned during the camera stabilization and panorama estimation illustrated by FIG. 9F.

Further, FIG. 9G shows the flexible sprites and masks learned from the video sequence 950 of FIG. 9F. As can be seen from both FIGS. 9F and 9G, the background sprite is a "panorama" that is larger than any of the input images. Specifically, FIG. 9G illustrates the learned appearance maps, 960, 995, and 970, and the learned masks, 975, 980, and 985, for the moving background, moving object, and stationary window, respectively for the video sequence 950 of FIG. 9F.

Figure 9H:
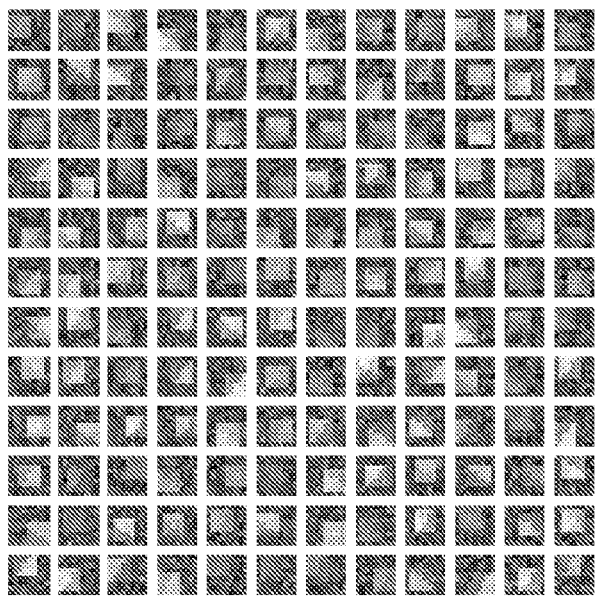
FIG. 9H-9J illustrates use of a generative model, as described herein, to automatically learn a 3-dimensional lighting representation of an object appearing at different positions.
Figure 9I:
Figure 9J:
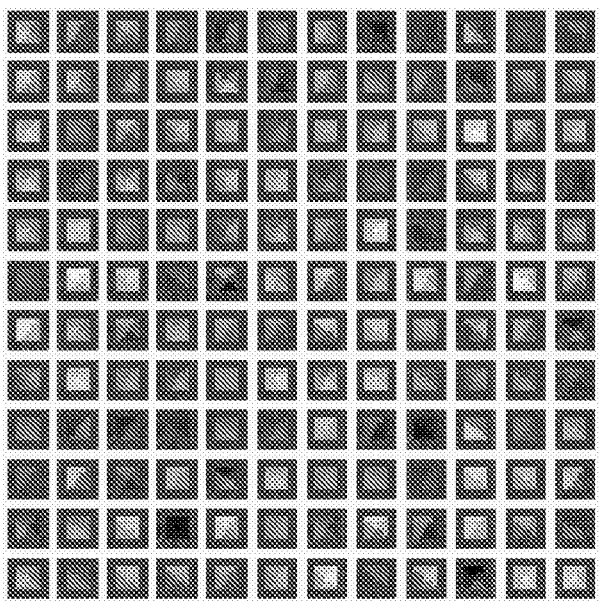

7.8 Learning Dimensional Lighting Representations of Objects:

In still another interesting use of the generative model, a 3-dimensional lighting representation of an object appearing at different positions was learned by providing a series of images of the object from different positions as illustrated by FIG. 9H through 9J. In this case, the settings for the generative model were set as follows: L=1, (i.e., a sprite representing the single object from different positions), C=1, and a dimensionality D=3 (corresponding to the three-dimensional lighting representation).

In particular, FIG. 9H illustrates contains examples of very noisy 9×9 pixel synthetic images of differently illuminated pyramids, observed from above. In addition to image noise and variability in the direction of the light source, a virtual camera is randomly shifted, simulating random jitter in the camera position. Using the generative model described herein, with L=1, C=1, and D=3, accomplishes joint removal of noise, inference of the direction of light (as the vector y in Section 3.6), normalization of all images, and learning parameters of the model. In this case, as illustrated by FIG. 9I, the model parameters include the mean, the three components that capture the orientation of the surface normals on the pyramid, and the sprite variability (or noise) V and observation noise IV.

Finally, to illustrate that the generative model successfully discovered the structure of the data, a number of generated images of the same size as the original input images illustrated by FIG. 9H are shown in FIG. 9J after the model parameters have been learned. In the generated images of FIG. 9J, the observation noise is set to zero, and all transformations are set so as to center the shape in the middle of the image. The generated images look like pyramids observed from above given various illumination directions.

7.9 Reflections as Layers:

As described above, the masks, m, can model partial transparency. Consequently, the flexible layer model is able to capture glass or other surface reflections as additive layers as illustrated by FIG. 10.

In particular, FIG. 10 illustrates automatic removal of a glass reflection in an image of a painting. The original data contained 50 frames of video filmed by a moving cameraman. The cameraman's reflection was barely visible in the frames of the video, but it was sufficient to make each frame an imperfect image of the painting. The left FIG. 1010 contains an original image frame from the sequence, while the other two, 1020 and 1030, contain the reconstructed layers.

In particular, the center image 1020 is a reconstructed layer wherein a layer representing the reflection and shadows of the moving cameraman has been set to fully transparent thereby showing only the reconstructed painting. Similarly, the rightmost image 1030 is a reconstructed layer wherein the layer representing the painting has been set to fully transparent, thereby showing only the reflection and shadows of the moving cameraman.

7.10 Illuminated Layers:

As noted above, illumination can also be nicely modeled using the generative model described herein. In particular, any desired illumination effects can be achieved by substituting the appearance model $p(s_l)$ with the uniform illumination model $p(s_l, r_l, a_l)$ in Equation 44 (see Section 3.4 above). In this model, $r_l$ represents a Gaussian intrinsic appearance of the object in a particular layer l, not affected by the illumination change, while scalar $a_l$ denotes the uniform illumination in each particular layer l. The sprite appearance is deterministic: $s_l = a_l r_l$, i.e., the variances $\Phi^s$ are set to zero, since there are enough other variance parameters to make the model sufficiently flexible.

In a tested embodiment, the model was trained on an image sequence using the generalized EM algorithm as before to learn the mean intrinsic appearances $\mu_l^r$, variances $\Phi_l^r$, and illumination means and variances $\mu_l^a$, $\sigma_l^{a^2}$. Note that in a tested embodiment, as illustrated by FIG. 11, a training sequence of 50 image frames (four of which are shown, 1110, 1120, 1130 and 1140) was found to provide good results. The sequence was filmed while the illumination on the person shown in FIG. 11 was significantly changing due to the raising and lowering of a side window blinds. Since the background was largely lit from the back, the blind movements did not significantly affect the overall illumination conditions in the background. The inferred lighting conditions (the optimal variational parameters $\eta_{1,n}^a, \eta_{2,n}^a$ for n=1, . . . , 50 illustrate that the algorithm was able to capture that effect. To enhance the sequence in terms of noise and illumination variability, all that was needed was to force the illumination factors $a_f=1$ and regenerate the sequence using the inferred variational parameters $\eta_{l,n}^r$ and $q(T_l)$.

Note that as illustrated by FIG. 11, throughout the 50-frame video sequence, four of which are shown in the left column, 1110, 1120, 1130 and 1140, the background and foreground had different illumination conditions as a result of the side blinds being open and closed. Further, note that the corresponding reconstructed output images, 1115, 1125, 1135 and 1145, respectively, are provided in the column on the right in FIG. 11. Note that the illumination of the persons face in the reconstructed output images, 1115, 1125, 1135 and 1145, is more uniform. In particular, the right column shows illumination-normalized image frames, 1115, 1125, 1135 and 1145, created by composing the sequence directly from inferred intrinsic appearances, i.e., by setting the illumination factors $a_1=a_2=1$ for all frames.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically creating a panoramic view of a scene, comprising using a computing device to perform steps for:
   receiving a video sequence of a scene captured from a moving camera;
   zero padding borders of each image frame of the video sequence to increase extents of each image frame;
   setting a preferred number sprites to be identified within the zero padded video sequence;
   setting a preferred number of layers into which each frame of the zero padded video sequence is to be decomposed, said layers including at least a background layer and a front layer, said front layer passing the entire contents of each zero padded image frame to be probabilistically considered for contributions to the background layer via a generative model;
   using the generative model to automatically decompose the zero padded video sequence into the preferred number of sprites and the preferred number of layers, said layers including the background layer; and
   wherein the background layer decomposed from the zero padded video sequence provides a static panoramic view of the scene relative to the original image frames of the video sequence.

2. The method of claim 1 further comprising constructing a composite panoramic image by compositing one or more of the decomposed sprites into the background layer.

3. The method of claim 1 wherein one or more of the decomposed sprites are "flexible sprites", wherein each flexible sprite represents a corresponding moving object having a geometry that is dynamically changeable from frame to frame of the zero padded video sequence, such that each flexible sprite provides a masked sequence of images of a corresponding moving object extracted from the zero padded video sequence.

4. The method of claim 3 further comprising constructing a composite output image sequence by compositing one or more of the flexible sprites into a new sequence of image frames constructed by repeating the static panoramic view of the scene.

5. The method of claim 1 wherein setting the preferred number sprites comprises automatically determining an optimal number of sprites from the zero padded video sequence.

6. The method of claim 1 wherein setting the preferred number of layers comprises automatically determining an optimal number of layers from the zero padded video sequence.

7. The method of claim 1 wherein automatically decomposing the zero padded video sequence into the preferred number of sprites and the preferred number of layers comprises performing a probabilistic variational expectation-maximization analysis of the zero padded video sequence.

8. The method of claim 1 wherein the generative model is automatically constructed to represent the entire zero padded video sequence, and wherein the generative model is formed using a set of automatically determined model parameters comprising:
   a prior probability of at least one sprite class;
   means and variances of sprite appearance maps; and
   means and variances of sprite masks.

9. A computer-implemented process for constructing a panoramic view of a scene background from an image sequence captured from a moving camera, comprising using a computing device to:
   receive an image sequence of a scene captured from a moving camera;
   zero pad borders of each image frame of the image sequence to increase extents of each image frame, and wherein increasing the amount of zero padding will increase extents of a background layer;
   set a preferred number of layers into which each frame of the image sequence is to be decomposed, said layers including at least the background layer and a front layer, said front layer passing the entire contents of each zero padded image frame to be probabilistically considered for contributions to the background layer via a generative model; and
   use the generative model to automatically decompose the zero padded image sequence into the preferred number of layers, said layers including the background layer, said background layer providing a static panoramic view of the scene relative to the frames of the original image sequence.

10. The computer-implemented process of claim 9 further comprising setting a preferred number of zero or more objects to be identified within the image sequence, and wherein the generative model further decomposes the zero padded image sequence into the preferred number of objects.

11. The computer-implemented process of claim 10 further comprising constructing a composite panoramic image by compositing one or more of the decomposed objects into the background layer.

12. The computer-implemented process of claim 10 wherein one or more of the decomposed objects are "flexible sprites", wherein each flexible sprite represents a corresponding moving object having a geometry that is dynamically changeable from frame to frame of the zero padded image sequence, such that each flexible sprite provides a masked sequence of images of a corresponding moving object extracted from the zero padded image sequence.

13. The computer-implemented process of claim 12 further comprising constructing a composite output image sequence by compositing one or more of the flexible sprites into a new sequence of image frames constructed by repeating the static panoramic view of the scene represented by the background layer.

14. The computer-implemented process of claim 9 wherein setting the preferred number of layers comprises automatically determining an optimal number of layers from the zero padded image sequence.

15. The computer-implemented process of claim 9 wherein automatically decomposing the zero padded video sequence into the preferred number of layers comprises using the generative model for performing a probabilistic variational expectation-maximization analysis of the zero padded image sequence.

16. A computer-readable storage device having computer executable instructions stored thereon for automatically constructing a panoramic view of a scene background from an image sequence, comprising computer executable instructions for:
receiving a video sequence of a scene captured from a moving camera;
zero padding borders of each image frame of the video sequence to increase extents of each image frame;
setting a preferred number sprites to be identified within the zero padded video sequence;
setting a preferred number of layers into which each frame of the zero padded video sequence is to be decomposed, said layers including at least a background layer and a front layer, said front layer passing the entire contents of each zero padded image frame to be probabilistically considered for contributions to the background layer via a probabilistic generative model;
using the generative model to automatically decompose the zero padded video sequence into the preferred number of sprites and the preferred number of layers, said layers including the background layer; and
wherein the background layer decomposed from the zero padded video sequence provides a static panoramic view of the scene relative to the original image frames of the video sequence.

17. The computer-readable storage device of claim 16 further comprising instructions for constructing a composite panoramic image by compositing one or more of the decomposed sprites into the background layer.

18. The computer-readable storage device of claim 16 wherein one or more of the decomposed sprites are "flexible sprites", wherein each flexible sprite represents a corresponding moving object having a geometry that is dynamically changeable from frame to frame of the zero padded video sequence, such that each flexible sprite provides a masked sequence of images of a corresponding moving object extracted from the zero padded video sequence.

19. The computer-readable storage device of claim 18 further comprising instructions for constructing a composite output image sequence by compositing one or more of the flexible sprites into a new sequence of image frames constructed by repeating the static panoramic view of the scene represented by the background layer.

20. The computer-readable storage device of claim 16 wherein automatically decomposing the zero padded video sequence into the preferred number of sprites and the preferred number of layers is accomplished by performing a probabilistic variational expectation-maximization analysis of the zero padded video sequence to determine optimal numbers of layers and sprites.

* * * * *